United States Patent
Maeda et al.

(10) Patent No.: US 8,749,733 B2
(45) Date of Patent: Jun. 10, 2014

(54) LIQUID CRYSTAL DISPLAY DEVICE

(75) Inventors: Tsuyoshi Maeda, Yamanashi (JP); Toyokazu Ogasawara, Kanagawa (JP)

(73) Assignee: Sony Corporation, Tokyo (JP)

( * ) Notice: Subject to any disclaimer, the term of this patent is extended or adjusted under 35 U.S.C. 154(b) by 425 days.

(21) Appl. No.: 12/767,046

(22) Filed: Apr. 26, 2010

(65) Prior Publication Data

US 2010/0296033 A1 Nov. 25, 2010

(30) Foreign Application Priority Data

May 13, 2009 (JP) .............................. P2009-116863

(51) Int. Cl.
*G02F 1/1335* (2006.01)
(52) U.S. Cl.
USPC ................................ 349/97; 349/96; 349/117
(58) Field of Classification Search
USPC ...................... 349/96–98, 117–119
See application file for complete search history.

(56) References Cited

U.S. PATENT DOCUMENTS

| | | | |
|---|---|---|---|
| 6,791,645 B2* | 9/2004 | Yano et al. | 349/118 |
| 2003/0151704 A1* | 8/2003 | Kawamoto et al. | 349/96 |
| 2007/0263139 A1* | 11/2007 | Hwang et al. | 349/96 |
| 2008/0198303 A1* | 8/2008 | Taguchi | 349/96 |
| 2009/0153783 A1* | 6/2009 | Umemoto | 349/96 |

FOREIGN PATENT DOCUMENTS

JP 2861982 12/1998

* cited by examiner

*Primary Examiner* — Bumsuk Won
*Assistant Examiner* — Charles Chang
(74) *Attorney, Agent, or Firm* — Finnegan, Henderson, Farabow, Garrett & Dunner, LLP

(57) ABSTRACT

A liquid crystal display device, without light leakage in a black display mode, is provided. The liquid crystal display (LCD) device includes a LCD panel, a light source, and an optical filter between the LCD and the light source. When the LCD panel is in the black display mode without the optical filter, leakage light leaking from the LCD panel in an oblique direction shows a hue having a local minimum value in a wavelength range from 450 nm to 550 nm. Normal incident light entering into the LCD in a normal direction shows a hue same as that of light just emitted from the light source, and oblique incident light entering into the LCD panel in an oblique direction shows a hue having a local maximum value in a wavelength range from 400 nm to less than 550 nm.

7 Claims, 64 Drawing Sheets

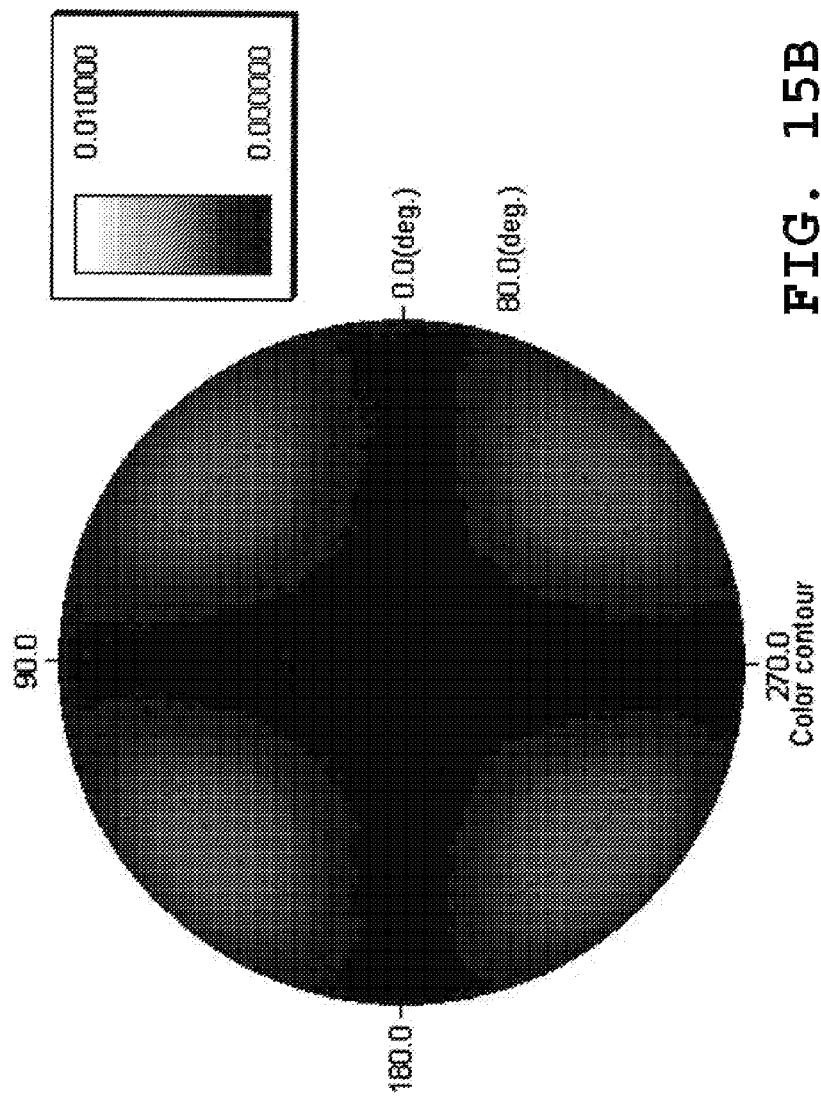

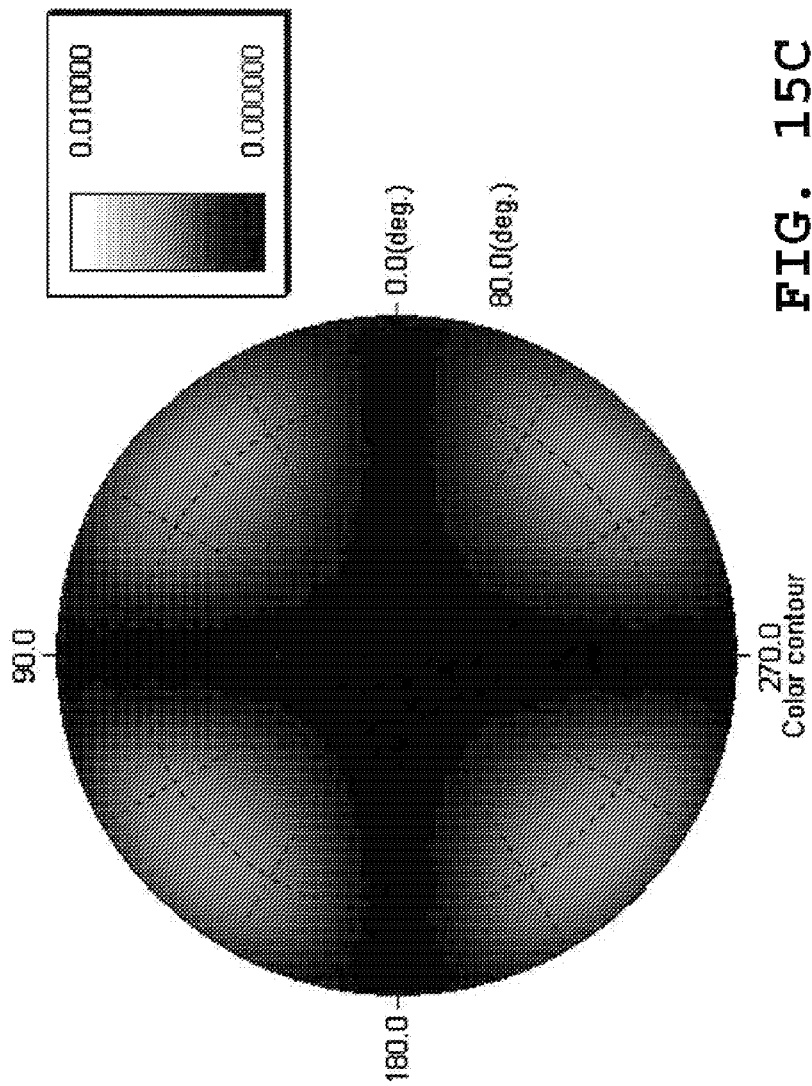

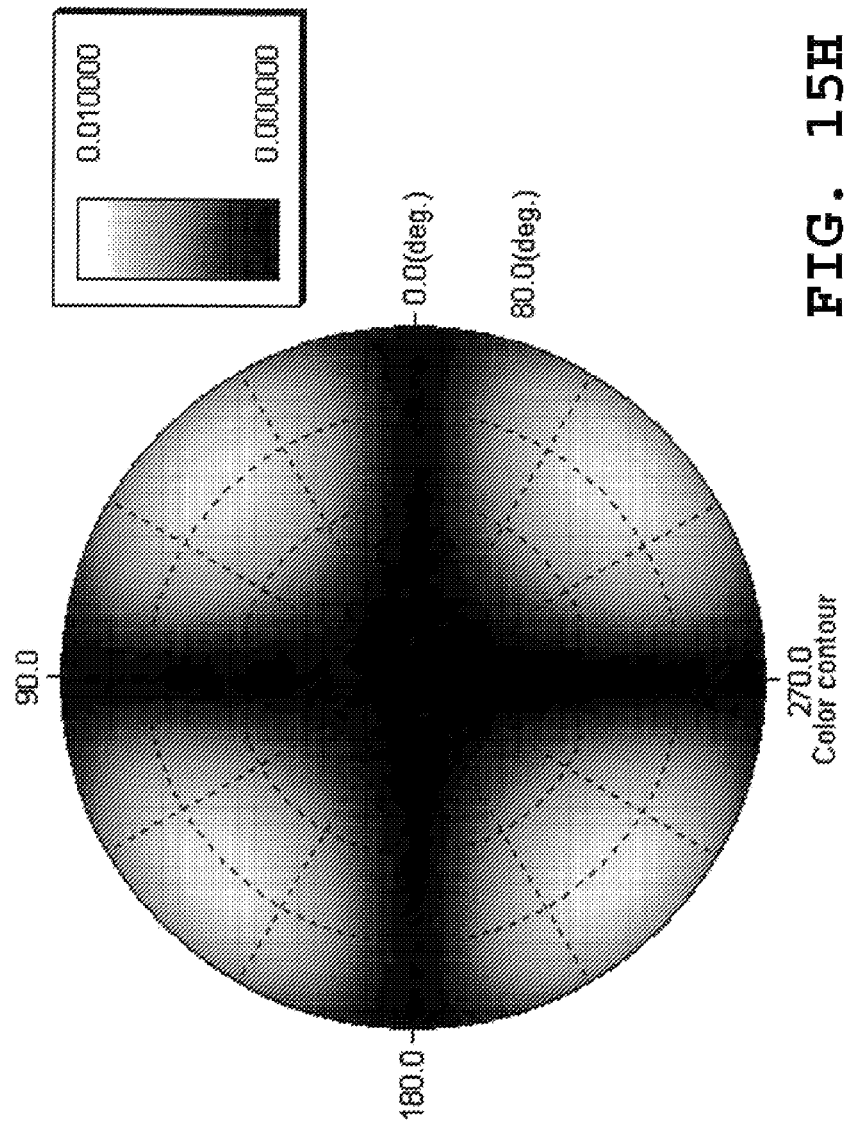

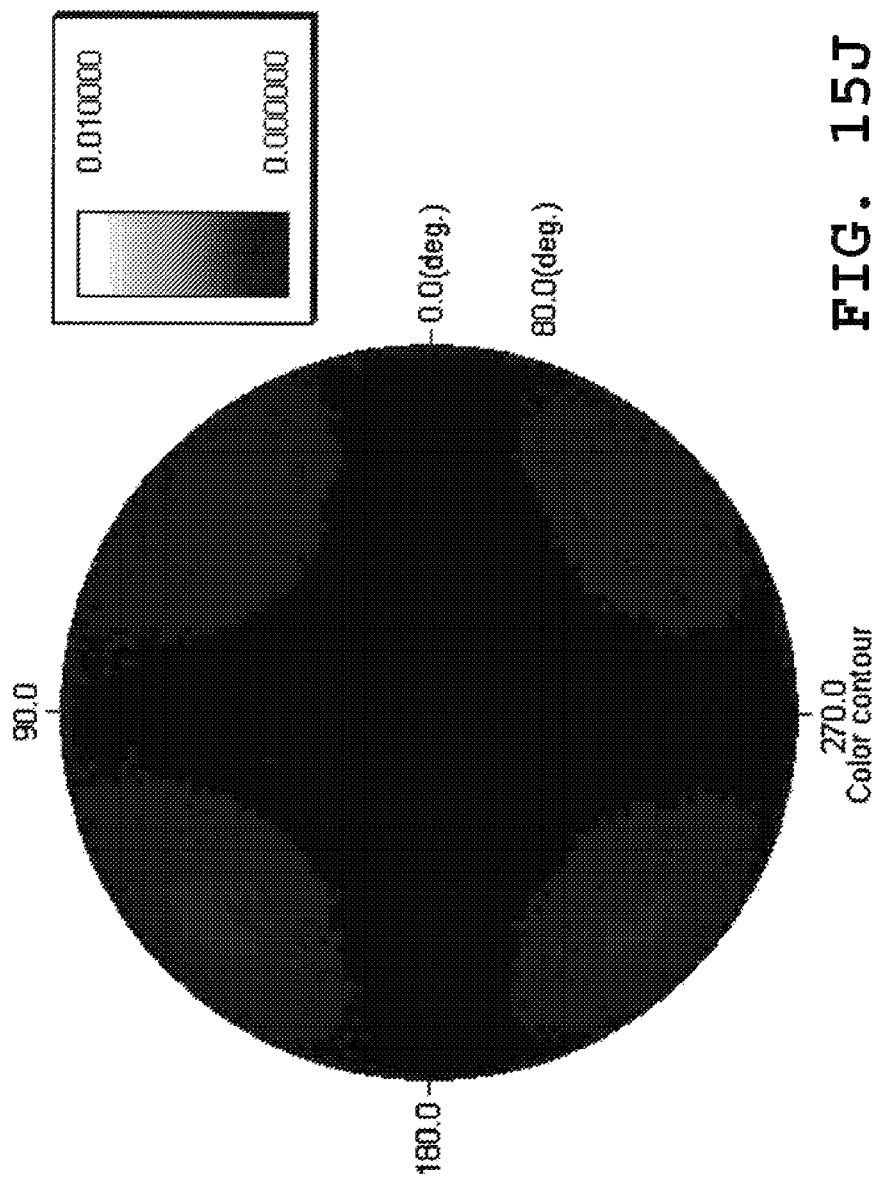

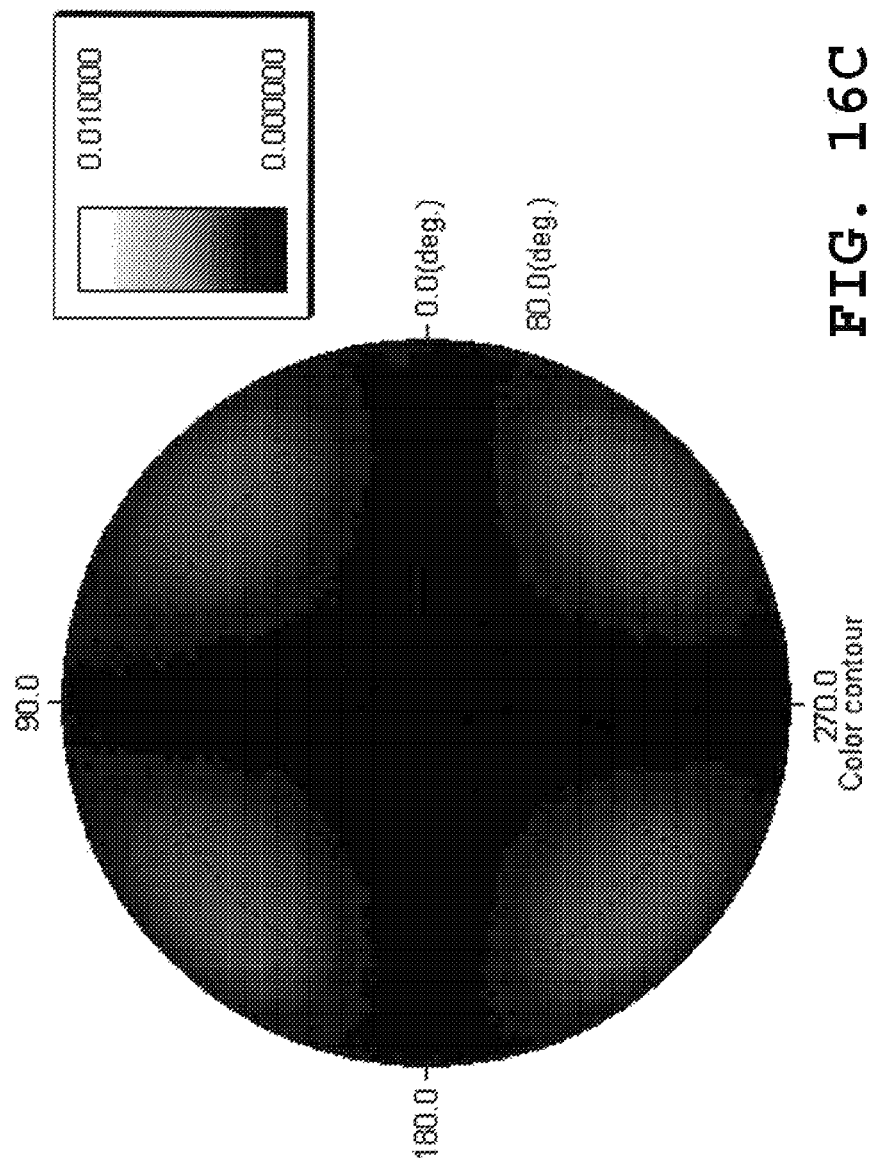

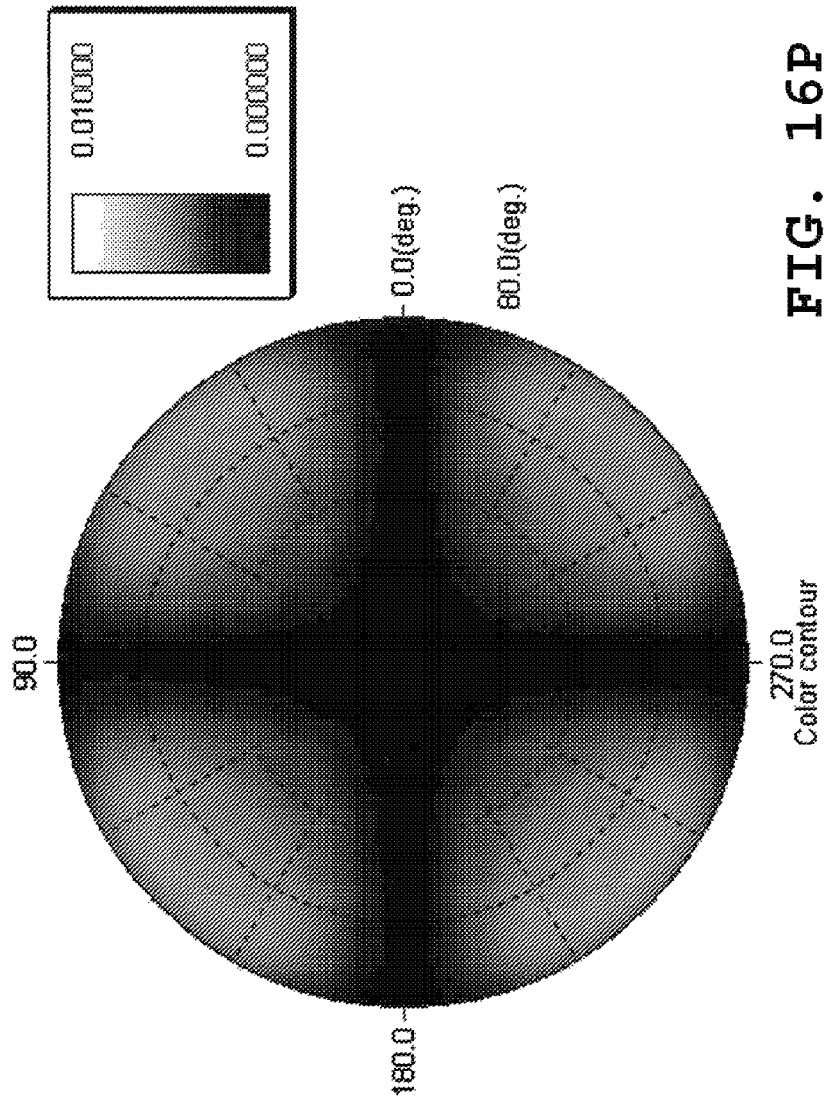

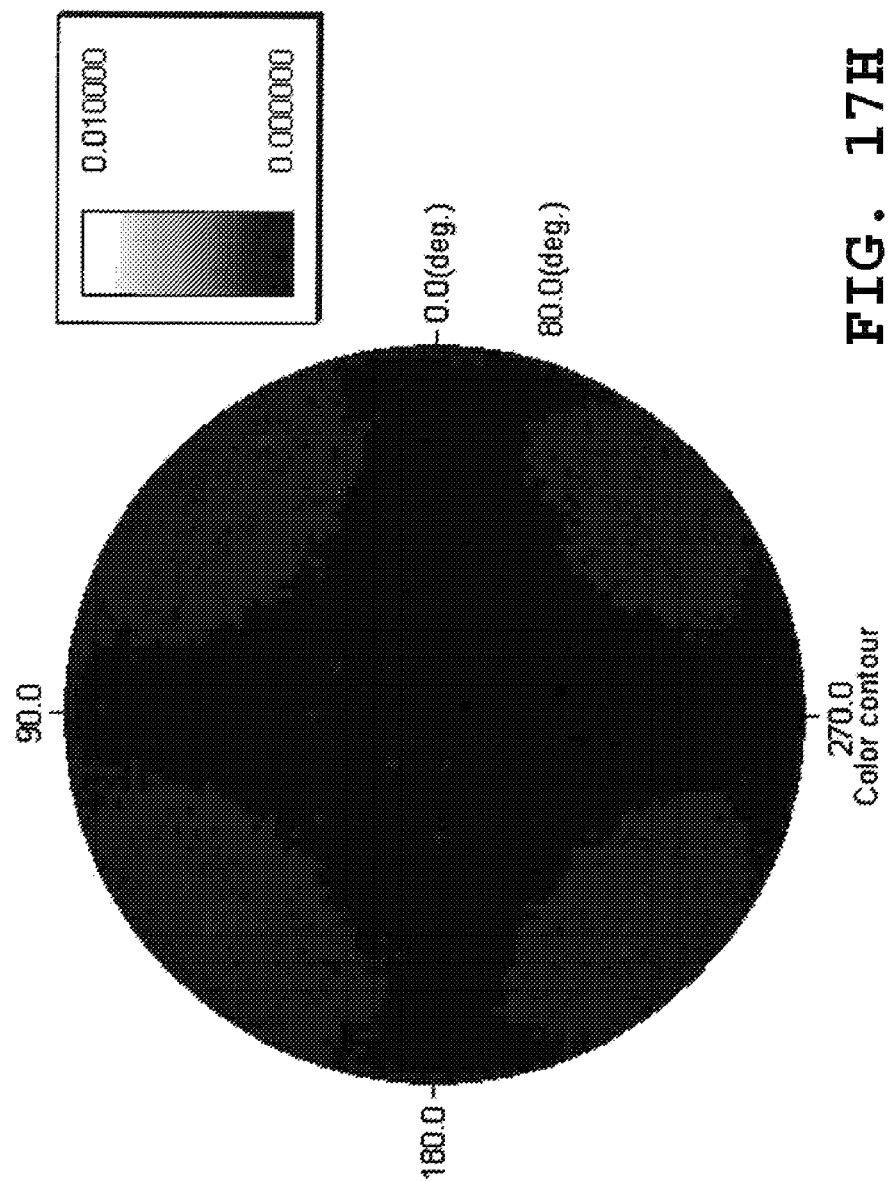

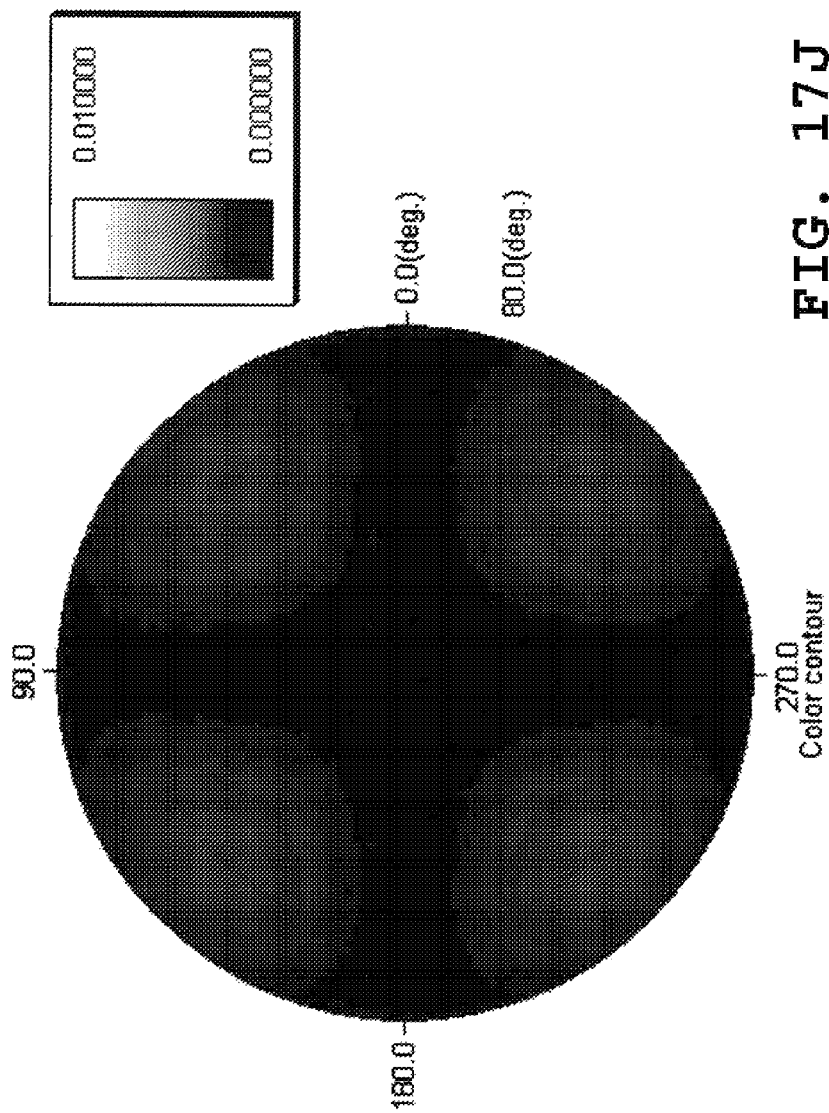

LIQUID CRYSTAL LAYER: $\Delta nd=0.32\mu m@590nm$

R0=70nm
Rth=120nm

LIQUID CRYSTAL DISPLAY DEVICE

BACKGROUND OF THE INVENTION

1. Field of the Invention

The present invention relates to a liquid crystal display device modulating light for picture display.

2. Description of Related Art

Recently, a liquid crystal display device is mainly used as a display monitor of a television, a notebook computer, a car navigation device or the like. The liquid crystal display device is classified into various modes (types) depending on arrangement of liquid crystal molecules between panel substrates of the device. For example, a TN (Twisted Nematic) mode and an IPS (In-Plane Switching) mode are listed. In addition, an OCB (Optically Compensatory Bend) mode and a VA (Vertically Aligned) mode are listed. In particular, a VA-mode liquid crystal display device is now noticed because high contrast is easily achieved thereby.

The VA-mode liquid crystal display device has a liquid crystal display panel 100 and a light source 101, for example, as illustrated in FIG. 23. The liquid crystal display panel 100 has a vertically-aligned liquid crystal layer 130 enclosed between a drive substrate 110 and a counter substrate 120 having a color filter 121 with pixel electrodes 111 and counter electrodes 122, and a pair of vertical alignment films 112 and 123 in between. A pair of polarizing plates 102 and 103 are disposed outside the drive substrate 110 and the counter substrate 120, respectively such that transmission axes of the polarizing plates 102 and 103 are perpendicular to each other. The liquid crystal display device modulates light (white light) from the light source 101 by the liquid crystal display panel 100 for picture display.

However, when such liquid crystal display device is in white display, the following difficulty occurs: a hue seen from a visual point in a vertical direction (Z-axis direction) to a substrate surface (XY plane) is different from a hue seen from a visual point in a direction (an oblique direction) oblique to the vertical direction. In detail, a hue of light L101 is white in white display, the light entering in a vertical direction from the light source 101 to the liquid crystal display panel 100, and being emitted in the vertical direction. In contrast, a hue of light L102 is yellowish white, the light entering in an oblique direction from the light source 101 to the liquid crystal display panel 100, and being emitted in approximately the same direction as the oblique direction. The reason why the light color is seen to be yellowish in this way is considered to be because light entered in an oblique direction to a substrate surface is changed in hue mainly in the liquid crystal layer 130 and then emitted in the oblique direction.

To solve the difficulty, a technique is known, where a dichromatic-dye-containing sheet is provided between a liquid crystal display panel and a light source (see Japanese Patent No. 2861982). The dichromatic-dye-containing sheet is formed by using approximately rod-like dichromatic dye, a liquid-crystalline substance such as polymeric liquid crystal or liquid crystal molecules, and ultraviolet curing resin such that long axis directions of the dichromatic dye are arranged (aligned) at a predetermined angle to a substrate surface of the liquid crystal display panel. In such a liquid crystal display device, while a hue of light entering in a vertical direction to a substrate surface of the liquid crystal display panel is substantially not changed, a hue of light entering in an oblique direction to the substrate surface is changed so as to compensate change in hue caused by a liquid crystal layer. Consequently, a difference hardly occurs between a hue seen from a visual point in a vertical direction to a substrate surface and a hue seen from a visual point in a direction oblique to the vertical direction.

SUMMARY OF THE INVENTION

Recently, a view angle is desired to be widened with increase in size of a liquid crystal display device. To achieve a wide view angle, it is basically important to suppress change in hue depending on viewing angles as above. In addition, it is important to suppress light leakage in black display. Such light leakage causes black display to be somewhat whitish as seen in an oblique direction. The light leakage in black display is caused by slight light leakage in an oblique direction from a liquid crystal display panel.

However, Japanese Patent No. 2861982 does not disclose suppression of light leakage in black display. Therefore, it has been hard to achieve a wide view angle by suppressing light leakage in black display while suppressing change in hue depending on viewing angles.

It is desirable to provide a liquid crystal display device, in which light leakage in black display is suppressed, and change in hue depending on viewing angles is suppressed, and consequently a wide view angle may be achieved.

According to an embodiment of the invention, there is provided a liquid crystal display device including: a light source; a liquid crystal display panel having a liquid crystal layer and a pair of polarizing plates, and modulating light from the light source for picture display; and an optical filter provided between the light source and the liquid crystal display panel. When the liquid crystal display panel is in a black display mode without using the optical filter, leakage light leaking from the liquid crystal display panel in an oblique direction to a display surface shows a hue having a local minimum value in a wavelength range from 450 nm to 550 nm both inclusive, and normal incident light entering into the liquid crystal display panel in a normal direction through the optical filter shows a hue same as that of light before passing through the optical filter, and oblique incident light entering into the liquid crystal display panel in an oblique direction through the optical filter shows a hue having a local maximum value in a wavelength range from 400 nm to less than 550 nm. A word "hue" refers to, for example, chromaticity expressed by the CIE chromaticity diagram. Words "the same hues" mean hues being visually the same in a visible light range, and thus are not limited to hues being quantitatively the same. Moreover, the "visible light range (visible light wavelengths)" refers to a wavelength range from in the order of 380 nm to 750 nm.

In the liquid crystal display device according to the embodiment of the invention, while normal incident light entering into the liquid crystal display panel in a normal direction through the optical filter shows a hue same as that of light before passing through the optical filter, oblique incident light entering into the liquid crystal display panel in an oblique direction through the optical filter shows a hue having a local maximum value (peak) in the wavelength range from 400 nm to less than 550 nm, a somewhat bluish hue. The oblique incident light is generally changed in hue within the liquid crystal display panel depending on an incident angle of the light, and emitted in substantially the same direction.

In the case of white display, the oblique incident light has a bluish hue as above, which suppresses a phenomenon that light emitted through the liquid crystal display panel becomes yellowish. As a result, a difference hardly occurs between hues from visual points in vertical and oblique directions to a panel surface.

In the case of black display, light leakage in an oblique direction to the liquid crystal display panel is suppressed. The reason for this is as follows. In the liquid crystal display panel, when black display is performed without disposing the optical filter, leakage light in an oblique direction to a display surface has the hue having a local minimum value in the wavelength range from 450 nm to 550 nm both inclusive, for example, a somewhat reddish or yellowish hue. That is, the liquid crystal display panel acts as a kind of band-cut filter. In contrast, when the optical filter is disposed on an incident surface side of the liquid crystal display panel, oblique incident light to the panel contains a large quantity of light in a wavelength range from 400 nm to 550 nm both inclusive rather than light in another wavelength range. Therefore, when black display is performed with the optical filter being disposed, light in the wavelength range from 400 to 550 nm both inclusive being a major part of a spectrum of the oblique incident light is effectively cut by the liquid crystal display panel, resulting in suppressing light leakage in the oblique direction.

According to the liquid crystal display device of the embodiment of the invention, since the device combines the liquid crystal display panel and the optical filter, change in hue depending on viewing angles and light leakage in black display are suppressed compared with a case where the device does not combine those, so that a wide view angle may be achieved.

Other and further objects, features and advantages of the invention will appear more fully from the following description.

DETAILED DESCRIPTION OF THE PREFERRED EMBODIMENTS

Hereinafter, preferred embodiments of the invention will be described in detail with reference to drawings. Description will be made in the following sequence.

1. First embodiment (example of VA-mode liquid crystal display device)
2. Second embodiment (example of liquid crystal display device using another color correction filter)
3. Modification (example of liquid crystal display device using still another color correction filter)

1. First Embodiment

Figure 1:
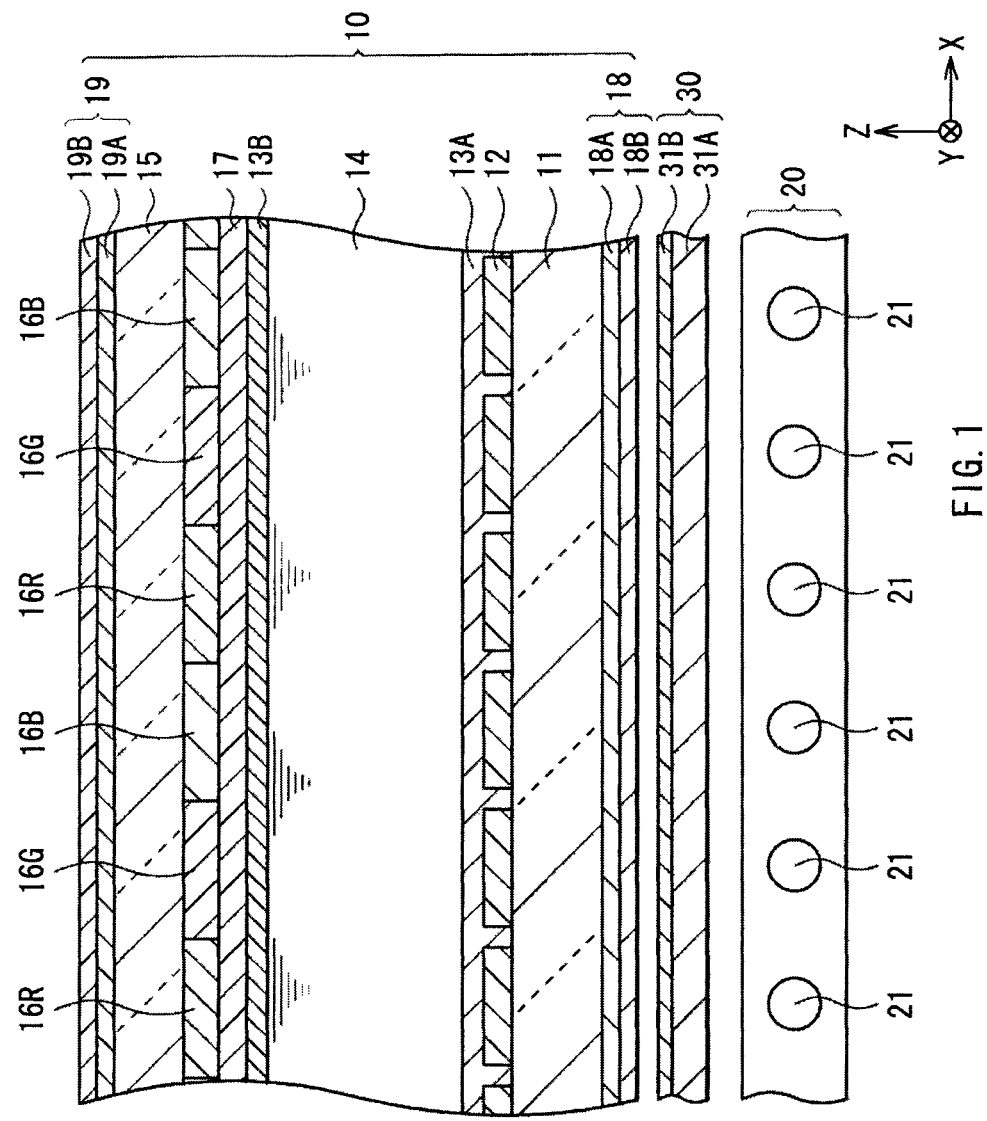
FIG. 1 is a schematic diagram illustrating a sectional configuration of a liquid crystal display device according to a first embodiment of the invention.
Figure 2A:
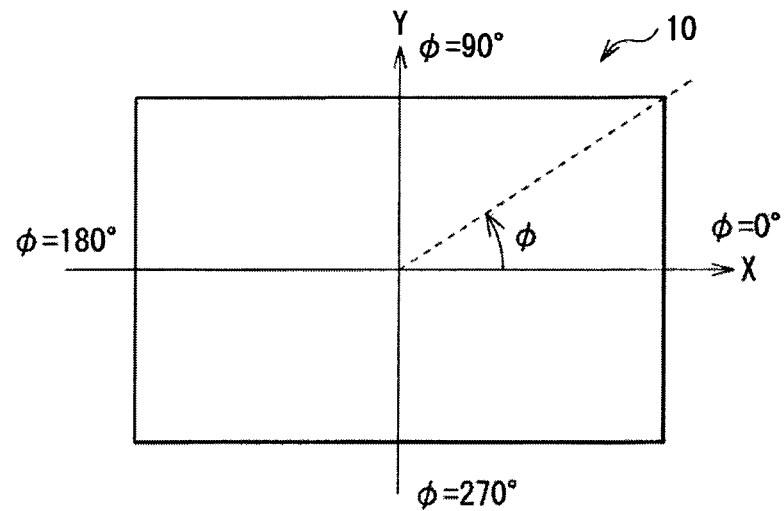
FIGS. 2A and 2B are schematic diagrams for illustrating an azimuth angle and a polar angle in the liquid crystal display device illustrated in FIG. 1.
Figure 2B:
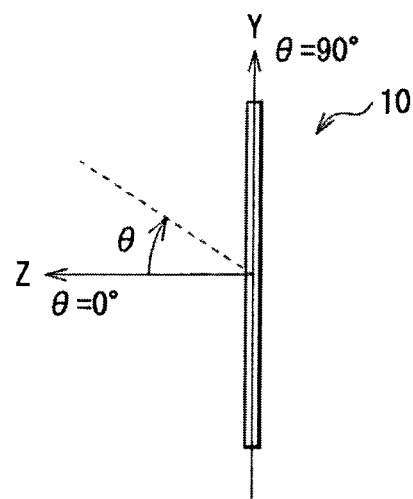
Figure 3:
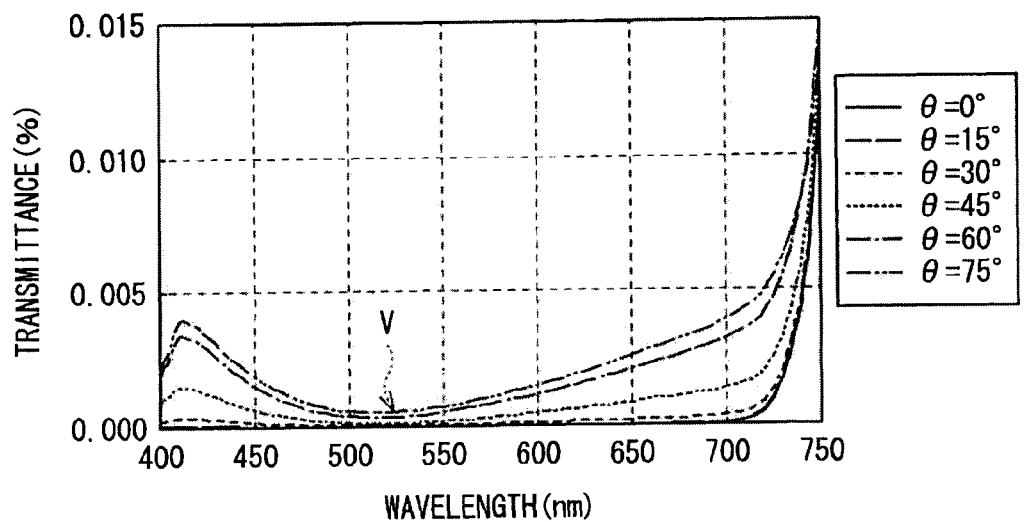
FIG. 3 is a schematic diagram for illustrating spectra of leakage light in black display of a liquid crystal display panel illustrated in FIG. 1.
Figure 4:
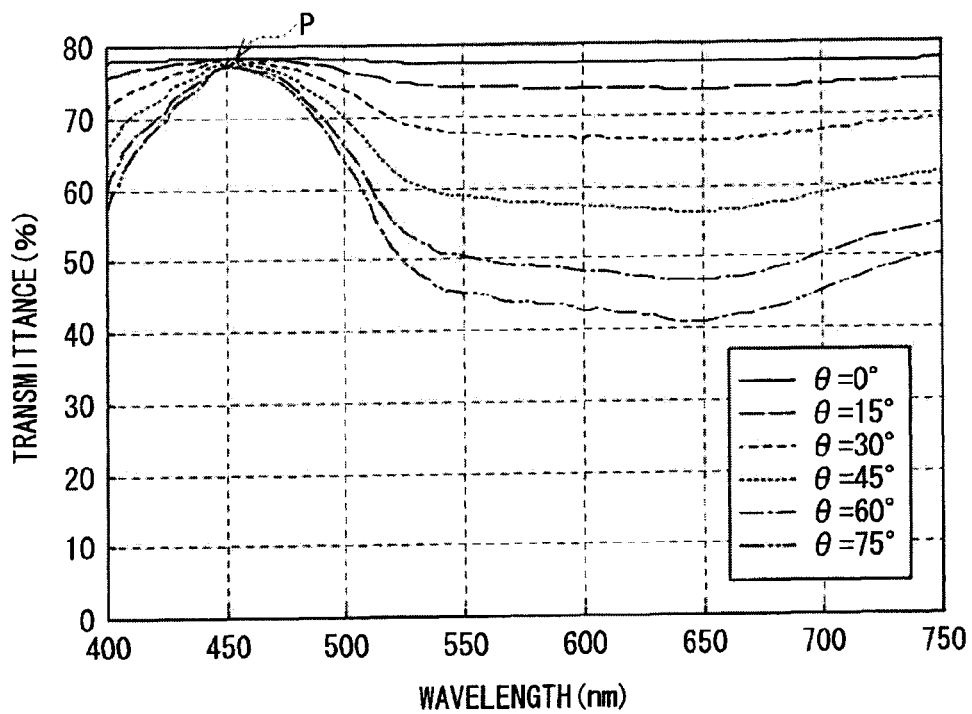
FIG. 4 is a schematic diagram for illustrating transmission spectra of a color correction filter illustrated in FIG. 1.
Figure 5:
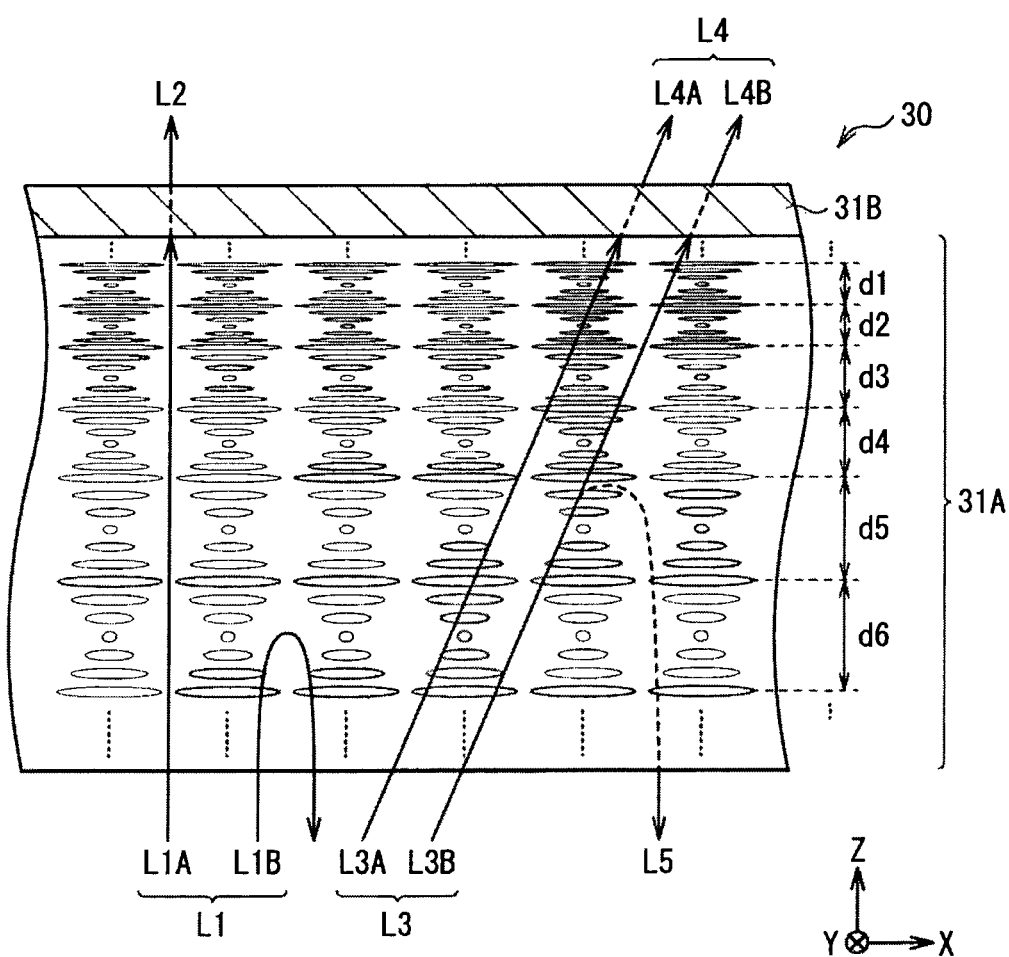
FIG. 5 is a sectional schematic diagram illustrating part of the color correction filter illustrated in FIG. 1 in an enlarged manner.

Example of VA-Mode Liquid Crystal Display Device
Configuration of Liquid Crystal Display Device FIG. 1 schematically illustrates a sectional configuration of a liquid crystal display device according to a first embodiment of the invention, and FIGS. 2A and 2B illustrate an azimuth angle direction and a polar angle direction of the liquid crystal display device respectively. FIG. 3 illustrates spectra of leakage light in black display of a liquid crystal display panel illustrated in FIG. 1, FIG. 4 illustrates transmission spectra of a color correction filter illustrated in FIG. 1, and FIG. 5 illustrates a sectional configuration of part of the color correction filter illustrated in FIG. 1 in an enlarged manner. The liquid crystal display device has a liquid crystal display panel 10, a backlight unit 20, and a color correction filter 30 provided between the panel 10 and the backlight unit 20. The liquid crystal display device is, for example, an active-matrix display device performing picture display for each pixel based on a picture signal transmitted from a data driver according to a drive signal supplied from a not-illustrated gate driver.

Liquid Crystal Display Panel

The liquid crystal display panel 10 has a plurality of pixels arranged in a matrix pattern, for example, pixels for red (R) display, pixels for green (G) display, and pixels for blue (B) display. The liquid crystal display panel 10 has a liquid crystal layer 14 between a TFT (Thin Film Transistor) substrate 11 and a counter substrate 15. Pixel electrodes 12 formed for each pixel and an alignment film 13A are provided in this order from the TFT substrate 11 side between the TFT substrate 11 and the liquid crystal layer 14. An alignment film 13B, counter electrodes 17, and color filters 16R, 16G and 16B formed for each pixel are provided in this order from a liquid crystal layer 14 side between the counter substrate 15 and the liquid crystal layer 14. Polarizing plates 18 and 19 are disposed on a bottom of the TFT substrate 11 and on a top of the counter substrate 15, respectively.

As illustrated in FIG. 2A, an X-axis direction is assumed to be a direction of an azimuth angle φ=0° or 180°, and a Y-axis direction is assumed to be a direction of an azimuth angle φ=90° or 270° in an in-plane direction of the liquid crystal display panel 10. As illustrated in FIG. 2B, a Z-axis direction representing a vertical direction to a display surface of the liquid crystal display panel 10 is assumed to be a direction of a polar angle θ=0°, and an XY plane is assumed to be corresponding to a direction of a polar angle θ=90°. Hereinafter, various directions are described as necessary by using the polar angle θ and the azimuth angle φ with a panel surface of the liquid crystal display panel 10 as a reference.

Each of the TFT substrate 11 and the counter substrate 15 includes a transparent substrate such as glass substrate. TFT switching elements (not illustrated) for driving pixels, each element having a gate, a source, and a drain, are formed on a transparent substrate configuring the TFT substrate 11. In addition, various lines (not illustrated) such as gate lines and data lines to be connected to the TFT switching elements are formed on the transparent substrate.

Each pixel electrode 12 or each counter electrode 17 includes a transparent electrode such as an ITO (Indium-Tin-Oxide) electrode. Each of the electrodes has a not-illustrated slit (cutout portion) or projection, so that liquid crystal molecules within the liquid crystal layer 14 are obliquely applied with an electric field, inducing multi-domain in each pixel.

The liquid crystal layer 14 may include, for example, a liquid crystal material such as nematic liquid crystal, smectic liquid crystal, or cholesteric liquid crystal. Here, the liquid crystal layer is assumed to include vertically-aligned liquid crystal where a director (in a long axis direction) of liquid crystal modules is perpendicular to a substrate surface in a state where no voltage is applied between electrodes. The liquid crystal layer 14 is in a black display mode (normally black) in a state of being not applied with voltage. The alignment films 13A and 13B control an alignment condition of the liquid crystal layer 14 when the liquid crystal layer is enclosed between the TFT substrate 11 and the counter substrate 15. In the embodiment, each alignment film is a vertically-aligned alignment film including, for example, a resin material such as polyimide.

The color filters 16R, 16G and 16B are formed for each pixel adjacently to the counter substrate 15. The color filters 16R, 16G and 16B are, for example, pigment-dispersed color filters, and transmit light in wavelength ranges of red, green and blue, and absorb light in another wavelength range, respectively.

The polarizing plates 18 and 19 transmit polarized-light vibrating in a particular direction while absorbing polarized-light vibrating in a direction perpendicular to the particular direction, and adjust respective phases of the transmitted polarized-light. The polarizing plate 18 has a phase difference layer 18A and a polarization layer 18B in order from the TFT substrate 11 side, and the polarizing plate 19 has a phase difference layer 19A and a polarization layer 19B in order from a counter substrate 15 side.

The phase difference layers 18A and 19A include, for example, a bidirectional phase-difference film each. In the bidirectional phase-difference film, a refractive index ($n_x$) in one direction (X-axis direction) in an in-plane direction, a refractive index ($n_y$) in a direction (Y-axis direction) orthogonal to the X-axis direction in the in-plane direction, and a refractive index ($n_z$) in a thickness direction (Z-axis direction) of the film satisfy a relationship of $n_x > n_y > n_z$. In this case, a phase difference $R_{th}$ in the thickness direction (retardation), and a phase difference $R_o$ in the in-plane direction of the phase difference layers 18A and 19A are calculated according to the following formulas (1) and (2), respectively.

$$R_{th} = [(n_x + n_y)/2 - n_z] * d \quad (1)$$

$$R_o = (n_x - n_y) * d \quad (2)$$

(d: thickness of a phase difference layer)

The polarization layers 18B and 19B have a transmission axis and an absorption axis each. In the polarizing plates 18 and 19, the polarization layers 18B and 19B are disposed such that the transmission axes or the absorption axes of the polarization layers are orthogonal to each other. The polarization layer 18B is formed as a polarizer, and the polarization layer 19B is formed as an analyzer. Here, the transmission axis of each layer is assumed to extend parallel to an X or Y axis direction in each of the polarizing plates 18 and 19.

In the liquid crystal display panel 10, when the panel 10 is into a black display without using a color correction filter 30 described later, leakage light, leaking in an oblique direction (polar angle direction) to a display surface (XY plane), has a hue having a minimum value (valley) in a wavelength range from 450 nm to 550 nm both inclusive. That is, the leakage light has a spectrum having a valley (valley wavelength V) in the wavelength range from 450 nm to 550 nm both inclusive. In a typical liquid crystal display panel, a spectrum of leakage light in black display has a single valley in a wavelength range from 450 nm to 700 nm both inclusive. That is, light intensity at the valley wavelength V corresponds to a minimum value within the wavelength range from 450 nm to 700 nm both inclusive. As illustrated in FIG. 3, in black display of a single liquid crystal display panel 10, a valley wavelength V of a spectrum of leakage light is set in the wavelength range from 450 to 550 nm, so that the leakage light has, for example, a slightly reddish or yellowish hue such as an approximately purple or red-base hue. By setting in this way, in the case of the single liquid crystal display panel 10, the quantity of leakage light (light leakage amount) is reduced compared with a case where the minimum value (valley wavelength V) of leakage light exists outside the above wavelength range, leading to suppression of light leakage in black display. In detail, since light of a wavelength 550 nm has spectral luminous efficiency close to the maximum spectral luminous efficiency, when the valley wavelength V exists near the wavelength 550 nm, the quantity of leakage light is decreased. When the valley wavelength V is in a range longer than 550 nm, the leakage light tends to be bluish. While such a bluish hue is generally preferred by a viewer, light intensity at the valley wavelength V is increased compared with a case where the valley wavelength V is in a range equal to or shorter than 550 nm, leading to increase in total quantity of leakage light. In contrast, when the valley wavelength V is in a range shorter than 450 nm, the quantity of leakage light is increased, and furthermore, even in color display other than black display, change in hue tends to occur depending on view angles. FIG. 3 illustrates an example of transmission spectra of the single liquid crystal display panel 10 in black display. In FIG. 3, when the polar angle θ is 0°, 15°, 30°, 45°, 60° or 75° in a direction of an azimuth angle φ=45°, transmission spectra of the liquid crystal display panel 10 are illustrated in respective polar angle θ directions.

In particular, when the liquid crystal display panel 10 is into a black display mode without using the color correction filter 30, leakage light leaking in an oblique direction to the display surface has a hue having the minimum value in a wavelength range from 475 nm to 550 nm both inclusive. This may effectively suppress leakage of light near the wavelength of 550 nm being highest in spectral luminous efficiency, therefore light leakage in black display may be more suppressed.

The valley wavelength V of leakage light in black display of the single liquid crystal display panel 10 is set in the wavelength range from 450 nm to 550 nm both inclusive, for example, by adjusting phase differences ($R_O$ and $R_{th}$) of each of the phase difference layers 18A and 19A, and a phase difference of the liquid crystal layer 14 (birefringence Δn of the liquid crystal layer 14*thickness d of the liquid crystal layer 14).

Backlight Unit

The backlight unit 20 supplies white light being display light to the liquid crystal display panel 10, and has a light source 21. For the backlight unit 20, for example, an edge light unit using a light guide plate or a direct backlight unit is used. As the light source 21, for example, CCFL (Cold Cathode Fluorescent Lamp) and FFL (Flat Fluorescent Lamp) are listed. In addition, an LED (Light Emitting Diode) and an EL (Electro Luminescence) are listed. The backlight unit 20 may additionally have a reflecting plate or a light diffusion sheet for diffusing light returned from the light source 21 side or the liquid crystal display panel 10 side, and reusing the light as display light.

Color Correction Filter

In the color correction filter 30 (optical filter), transmitted light in a vertical direction to a panel surface has the same hue as that of light from the light source 21, and transmitted light in an oblique direction has a hue having a local maximum value (peak wavelength P) in a wavelength range from 400 nm to less than 550 nm. That is, among light emitted from the light source 21 and transmitted by the color correction filter 30, light transmitted in the vertical direction to the panel surface has a hue of white, and light transmitted in the oblique direction has a bluish hue (blue base hue). Thus, even if light entered in an oblique direction to the liquid crystal display panel 10 is changed in hue mainly to be yellowish in the liquid crystal layer 14, since oblique incident light entering in an oblique direction is bluish, the light is emitted in an oblique direction from the panel 10 while such change in hue is compensated. As a result, a hue of the light is corrected such that a hue seen from a visual point in the vertical direction to the liquid crystal display panel 10 is approximately the same as that from a visual point in the oblique direction. FIG. 4 illustrates an example of transmission spectra of the color correction filter 30. In FIG. 4, when the polar angle θ is 0°, 15°, 30°, 45°, 60° or 75° in a direction of an azimuth angle φ=45°, transmission spectra of the color correction filter 30 are illustrated in respective polar angle θ directions.

Preferably, the color correction filter 30 may continuously change a hue such that transmitted light having a larger angle in a polar angle direction has a larger quantity of blue light. Thus, change in hue depending on viewing angles is more suppressed. Moreover, the color correction filter 30 is preferably set such that oblique incident light, which enters in an oblique direction to the liquid crystal display panel 10 through the color correction filter 30, has a hue having a maximum value in a wavelength range from 475 nm to less than 550 nm. Thus, since leakage of light near the wavelength 550 nm, which is highest in spectral luminous efficiency in black display, may be effectively suppressed, light leakage may be more suppressed.

Such a color correction filter 30 has a cholesteric liquid crystal polymer layer 31A on a light source 21 side, and a quarter-wavelength layer 31B on the liquid crystal display panel 10 side. In the cholesteric liquid crystal polymer layer 31A, a cholesteric liquid crystal polymer has a helical structure with a vertical direction to a panel surface as an axis. Such a helical structure has one of clockwise and counter-clockwise helix directions, and helix pitches d1 to dn corresponding to respective wavelengths of visible light. Thus, among circularly polarized light entering into the cholesteric liquid crystal polymer layer 31A, circularly polarized light, which is in the same direction as the helix direction of the cholesteric liquid crystal, and the same wavelength as each of the helix pitches d1 to dn, is reflected, and circularly polarized light in a direction opposite to the helix direction is transmitted. The quarter-wavelength layer 31B, which converts circularly polarized light into linearly polarized light, is disposed such that a polarization direction of light emitted from the color correction filter 30 is the same as a direction of a transmission axis of the polarizing plate 18. That is, the color correction filter 30 acts as a reflection polarizer.

Here, the color correction filter 30 is described with reference to FIG. 5. When light from the light source 21 is classified into clockwise circularly-polarized light and counter-clockwise circularly-polarized light, the color correction filter 30 transmits or reflects light from the light source 21 in the following way.

Among light L1 from the light source 21 entering in a vertical direction to an in-plane direction (=XY plane) of the color correction filter 30, circularly polarized light L1A in a direction opposite to the helix direction of the cholesteric liquid crystal polymer is transmitted by the cholesteric liquid crystal polymer layer 31A, and circularly polarized light L1B in the same direction as the helix direction of the cholesteric liquid crystal polymer is reflected to a light source 21 side. The light L1A transmitted by the cholesteric liquid crystal polymer layer 31A is transmitted by the quarter-wavelength layer 31B, and emitted in a vertical direction as linearly polarized light having the same hue as that of light from the light source 21 (light L2).

Among light L3 from the light source 21 entering in an oblique direction to the in-plane direction of the color correction filter 30, circularly polarized light L3A in a direction opposite to the helix direction of the cholesteric liquid crystal polymer is transmitted by the cholesteric liquid crystal polymer layer 31A. The transmitted, circularly polarized light L3A enters into the quarter-wavelength layer 31B, and is emitted in a direction approximately equal to an incident direction as linearly polarized light having the same hue as that of light from the light source 21 (light L4A). In contrast, among the light L3, circularly polarized light L3B in the same direction as the helix direction of the cholesteric liquid crystal polymer enters into the cholesteric liquid crystal polymer layer 31A, then light in the wavelength range from 400 nm to less than 550 nm (blue light) is relatively largely transmitted, and light in another wavelength range is reflected to a light source 21 side (light L5). For the circularly polarized light L3B, the cholesteric liquid crystal polymer layer 31A acts as a negative, uniaxial phase difference layer having an optical axis in a thickness direction of the layer. Therefore, the light L3B transmitted by the cholesteric liquid crystal polymer layer 31A enters into the quarter-wavelength layer 31B as elliptically polarized light, and is emitted in a direction approximately equal to an incident direction as elliptically polarized light (light L4B). As a result, among light transmitted by the color correction filter 30, light L4 in the oblique direction contains a relatively large quantity of blue light, and thus has a hue having a local maximum value in the wavelength range from 400 nm to less than 550 nm.

The light (light L1B and L5) reflected by the cholesteric liquid crystal polymer layer 31A is recycled by the light source 21, the reflecting plate, and the light diffusion filter in the backlight unit 20.

In the color correction filter 30, a light diffusion layer is preferably provided on a liquid crystal display panel 10 side of the cholesteric liquid crystal polymer layer 31A. Thus, a hue may be more continuously changed in correspondence to an angle in a polar angle direction of light entering into the liquid crystal display panel 10, and change in hue depending on viewing angles is thus more suppressed. In the color correction filter 30, the light diffusion layer is particularly preferably provided between the cholesteric liquid crystal polymer layer 31A and the quarter-wavelength layer 31B. Thus, change in hue depending on viewing angles is more suppressed, and the color correction filter 30 may sufficiently act as the reflection polarizer.

Method of Manufacturing Liquid Crystal Display Device

The liquid crystal display device may be manufactured, for example, in the following way.

First, for example, the liquid crystal display panel 10 is produced. Initially, the pixel electrodes 12 are formed on a surface of the TFT substrate 11, for example, in a matrix pattern. In contrast, for example, the RGB color filters 16R, 16G and 16B are patterned on a surface of the counter substrate 15, and then the counter electrodes 17 are formed. Then, the alignment films 13A and 13B are formed so as to cover respective surfaces of the pixel electrodes 12 and the counter electrodes 17 by coating a vertical alignment agent or printing and firing a vertical alignment film.

Next, spacers for ensuring a cell gap, for example, plastic beads are dispersed onto a surface (having the alignment film 13A or 13B formed thereon) of one of the TFT substrate 11 and the counter substrate 15. In addition to this, a seal portion is printed with an epoxy adhesive or the like by, for example, a screen printing method onto a surface of one of the TFT substrate 11 and the counter substrate 15. Then, the TFT substrate 11 and the counter substrate 15 are attached to each other with the spacers and the seal portion in between so that the alignment films 13A and 13B are opposed to each other, and a liquid crystal material is injected. Then, the seal portion is cured by heating or the like, thereby the liquid crystal layer 14 is enclosed between the TFT substrate 11 and the counter substrate 15. Finally, the polarizing plate 18 having the phase difference layer 18A and the polarization layer 18B and the polarizing plate 19 having the phase difference layer 19A and the polarization layer 19B are attached to a bottom of the TFT substrate 11 and a top of the counter substrate 15, respectively, thereby the liquid crystal display panel 10 is completed.

Next, the light diffusion layer is formed on a quarter-wavelength film being the quarter-wavelength layer 31B as necessary, and then the cholesteric liquid crystal polymer layer 31A is formed, so that the color correction filter 30 is produced. The cholesteric liquid crystal polymer layer 31A is formed by using a mixed material including a cholesteric liquid crystal monomer to be a cholesteric liquid crystal polymer, solvent, and a polymerization initiator as necessary. The mixed material is coated on one surface side of the quarter-wavelength film, and then polymerized by heating or ultraviolet irradiation so that a helical structure of the cholesteric liquid crystal polymer has a predetermined helical direction and predetermined pitches.

Finally, the liquid crystal display panel 10 and the color correction filter 30 produced in the above way, and the backlight unit 20 having the light source 21 are used to dispose the color correction filter 30 between the liquid crystal display panel 10. The color correction filter 30 is disposed such that the polarizing plate 18 is opposed to a surface on a quarter-wavelength layer 31B side of the color correction filter 30. Thus, the liquid crystal display device illustrated in FIG. 1 is completed.

In the liquid crystal display device, among light from the light source 21 of the backlight unit 20, light transmitted by the color correction filter 30 enters into the polarizing plate 18, and then only a particular polarization component is transmitted by the polarization layer 18B, and enters into a liquid crystal layer 14 side. In the liquid crystal layer 14, light is modulated by a voltage applied between each pixel electrode 12 and each counter electrode 17 based on image data. Light transmitted by the liquid crystal layer 14 is extracted as red light, green light and blue light by the color filters 16R, 16G and 16B for each of pixels, and then only a particular polarization component of each color light is transmitted by the polarization layer 19B for image display.

Figure 23:
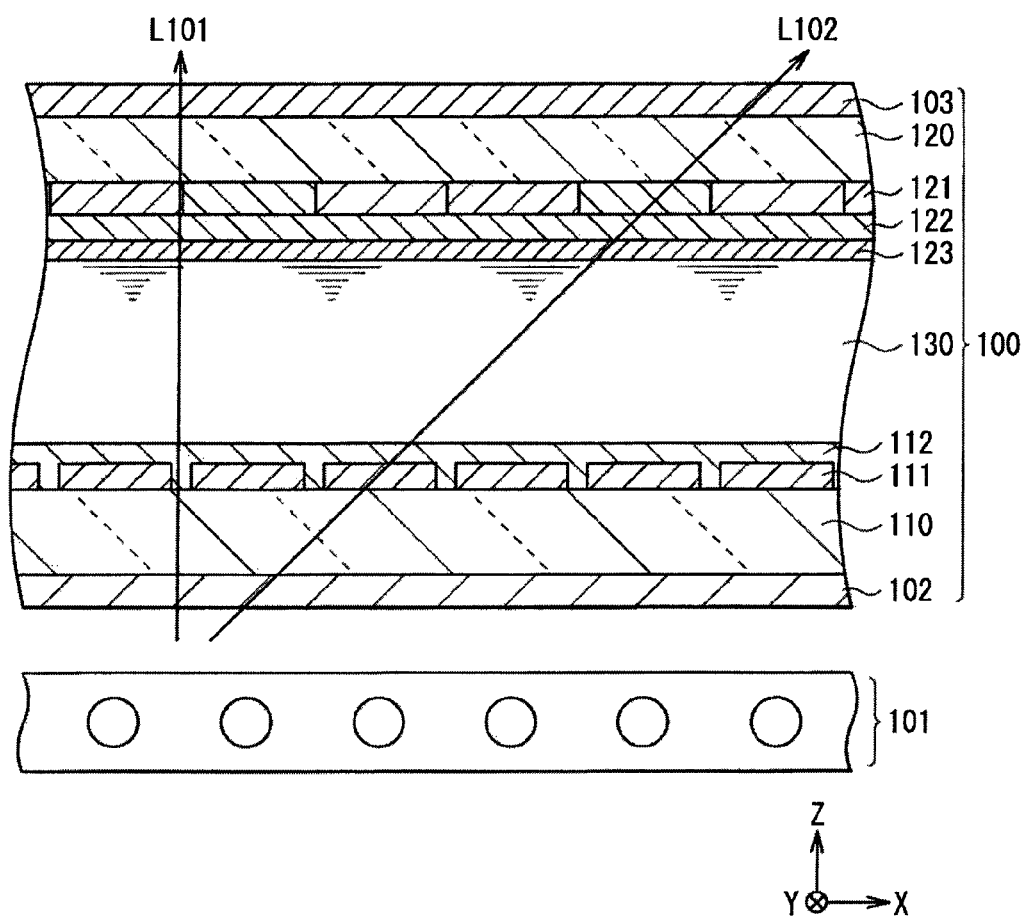
FIG. 23 is a diagram for illustrating a configuration of a liquid crystal display device in the past.
Figure 24:
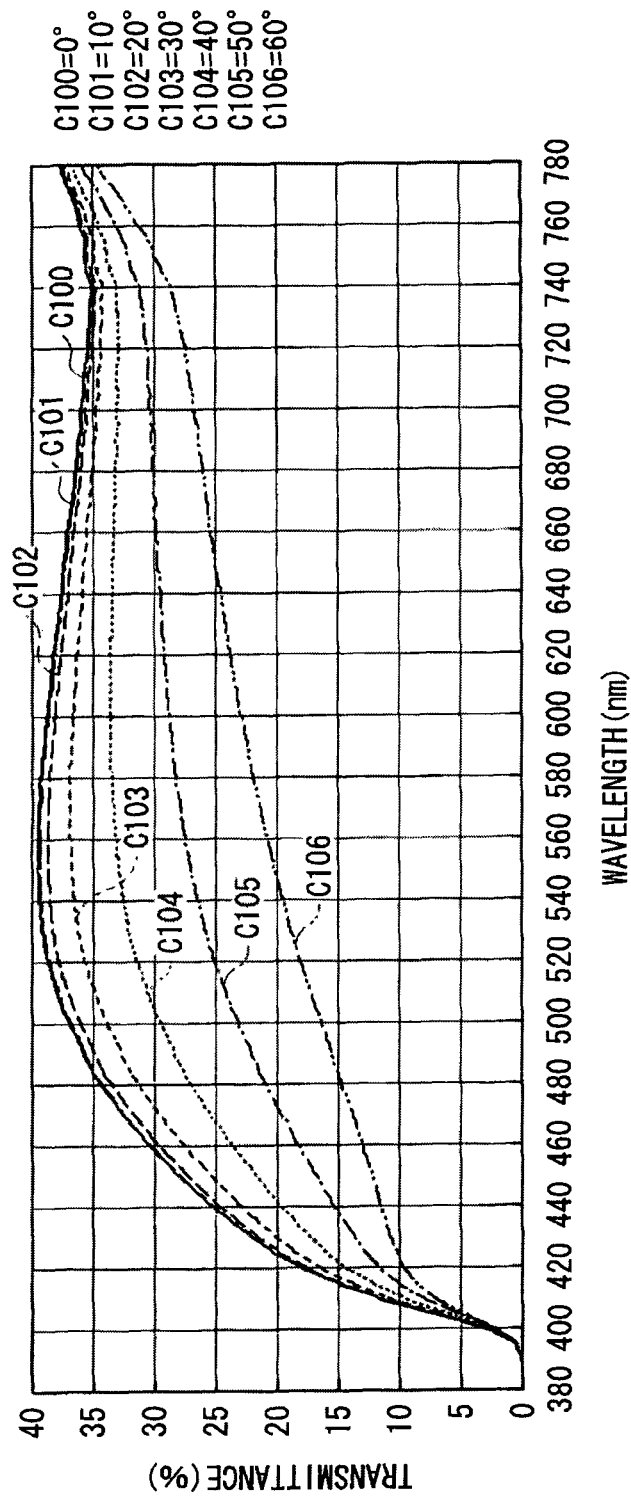
FIG. 24 is a characteristic diagram for illustrating a relationship of a viewing angle to a hue of the liquid crystal display device in the past.

In the liquid crystal display device in the past, when white display is performed, all light from the light source 101 enter as white light regardless of an incident angle to the liquid crystal display panel 100 as illustrated in FIG. 23. Among light entering into the liquid crystal display panel 100, incident light L101 in a vertical direction is transmitted in only a particular polarization component by the polarizing plates 102 and 103, and modulated by the liquid crystal layer 130, and thus emitted as white light in the same direction (vertical direction) as that of the incident light L101. In contrast, among the light entering into the liquid crystal display panel 100, oblique incident light L102 entering in an oblique direction is transmitted in only a particular polarization component by the polarizing plates 102 and 103, and modulated by the liquid crystal layer 130. Since the oblique incident light L102 is changed in hue to be slightly yellowish mainly in the liquid crystal layer 130, the oblique incident light L102 is emitted as yellowish white light in approximately the same direction as that of the oblique incident light L102. Therefore, when the liquid display panel 100 is in a white display mode, while a hue is seen as white from a visual point in a vertical direction, a hue is seen to be slightly yellowish from a visual point in an oblique direction. When a visual point is gradually inclined from a vertical direction in an azimuth of 45° ($\phi=45°$, 135°, 225° and 315°) with one of transmission axes of a pair of polarizing plates 102 and 103 as a reference, such a difference in hue being seen conspicuously appears as illustrated in FIG. 24. FIG. 24 illustrates spectra in respective polar angle θ directions of a VA-mode liquid-crystal display device in the past in white display in the case that the polar angle θ is 0°, 10°, 20°, 30°, 40°, 50° or 60° in a direction of an azimuth angle φ=45° of a display surface.

On the other hand, in the embodiment, oblique incident light entering in an oblique direction to the liquid crystal display panel 10 is beforehand changed in hue by the color correction filter 30 so that a degree of change in hue in the liquid crystal layer 14 is cancelled in accordance with an incident angle of the light. Specifically, in the cholesteric liquid crystal polymer layer 31A, a helical pitch and the like of the cholesteric liquid crystal polymer are set such that light emitted in an oblique direction has a hue having a local maximum value in the wavelength range from 400 nm to less than 550 nm as described before. Thus, a relatively large quantity of blue light is transmitted depending on an emitting angle of emitted light from the color correction filter 30. In addition, among light entering into the liquid crystal display panel 10, light having a larger angle (polar angle θ) against a vertical direction to a panel surface is more strongly changed in hue (into a deeper blue-base hue). Thus, even if oblique incident light to the liquid crystal display panel 10 is changed to be yellowish in the liquid crystal layer 14, since a hue of the oblique incident light is beforehand changed into a blue-base hue depending on a degree of such yellow change, the degree of change in hue is cancelled. Accordingly, even if the liquid crystal panel 10 is in white display, a hue seen in an oblique direction is substantially white. Among incident light to the liquid crystal display panel 10, incident light in a vertical direction is transmitted by the color correction filter 30 with a hue being the same as that of light from the light source, therefore the light enters as white light to the liquid crystal display panel 10.

When the liquid crystal display device in the past is into a black display mode, among incident light to the liquid crystal display panel 100, part of oblique incident light is emitted as leakage light in approximately the same direction. When a visual point is gradually inclined from a vertical direction to the panel surface in an azimuth of 45° with one of transmission axes of the pair of polarizing plates 102 and 103 as a reference, leakage light in black display is also conspicuously found. In the past, while phase difference in the polarizing plates 102 and 103, or phase difference in the liquid crystal layer 130 has been adjusted to suppress the quantity of leakage light, leakage light is still not eliminated. Therefore, a hue of leakage light in black display is set to be blue preferred by a viewer.

On the other hand, in the embodiment, when the liquid crystal display panel 10 is into a black display mode without disposing the color correction filter 30, leakage light leaking in an oblique direction has a hue having a minimum value in a wavelength range from 450 nm to 550 nm both inclusive, for example, a slightly reddish or yellowish hue. That is, when the liquid crystal display panel 10 is into a black display mode, the panel acts as a kind of band cut filter in a polar angle direction. In contrast, when the color correction filter 30 is disposed on an incidence side of the liquid crystal display panel 10, oblique incident light to the liquid crystal display panel 10 contains a relatively large quantity of light in a wavelength range from 400 nm to less than 550 nm. Therefore, when the panel 10 is in black display with the color correction filter 30 being disposed, light in the wavelength range from 400 nm to 550 nm both inclusive being a major part of a spectrum of the oblique incident light is effectively cut by the liquid crystal panel 10, as a result, light leakage in the oblique direction is suppressed. In addition, in the liquid crystal display panel 10, when a single liquid crystal display panel is into a black display mode, the quantity of light leakage in black display is reduced compared with a case where leakage light leaking in the oblique direction has a hue having a minimum value in a wavelength range other than the above, for example, a case where the leakage light has a blue hue. Accordingly, the liquid crystal display panel 10 is used in conjunction with the color correction filter 30, thereby the quantity of light leakage in black display is more reduced. Furthermore, a hue seen in a polar direction in black display is into a bluish hue by the color correction filter 30, the bluish hue being preferred by a viewer.

That is, according to the liquid crystal display device of the embodiment, the color correction filter 30 having the above configuration is provided between the liquid crystal display panel 10 having the above configuration and the backlight unit 20. Thus, change in hue depending on viewing angles of pictures being displayed is suppressed, and besides, light leakage in black display is suppressed, and consequently a wide view angle may be achieved.

Moreover, in the embodiment, the color correction filter 30 has the cholesteric liquid crystal polymer layer 31A and the quarter-wavelength layer 31B. Thus, since the color correction filter 30 acts as a reflection polarizer, use efficiency of light emitted from the light source 21 may be improved compared with a case where the filter 30 is not used.

In the embodiment, it is preferable that when the liquid crystal display panel 10 is into a black display mode without using the color correction filter 30, leakage light leaking in an oblique direction has the hue having the minimum value in the wavelength range from 475 nm to 550 nm both inclusive, and oblique incident light entering in an oblique direction to the liquid crystal panel 10 has a hue having the local maximum value in the wavelength range from 475 nm to less than 550 nm Thus, since leakage of light near the wavelength of 550 nm being highest in spectral luminous efficiency is effectively suppressed, light leakage in black display may be more suppressed.

While the liquid crystal display device has been described with a case where the polarizing plates 18 and 19 have the biaxial phase difference layers 18A and 19A, respectively, this is not limitative. For example, the polarizing plates 18 and 19 may have uniaxial phase difference layers 18A and 19A, respectively.

Furthermore, while the color correction filter 30 is separately provided between the liquid crystal display panel 10 and the backlight unit 20 in the above liquid crystal display device, this is not limitative. For example, the color correction filter 30 may be provided on a white-light emission side of the backlight unit 20 in an integrated manner so as to be into a backlight unit with an optical filter having the same configuration as that of the color correction filter 30. Alternatively, the color correction filter 30 may be provided on an outer side of the polarizing plate 18 of the liquid crystal display panel 10 so as to be into a liquid crystal display panel with an optical filter having the same configuration as that of the color correction filter 30. In each case, the same advantages as those in the embodiment are obtained.

2. Second Embodiment

Example of Liquid Crystal Display Device Using Another Color Correction Filter

Figure 6A:
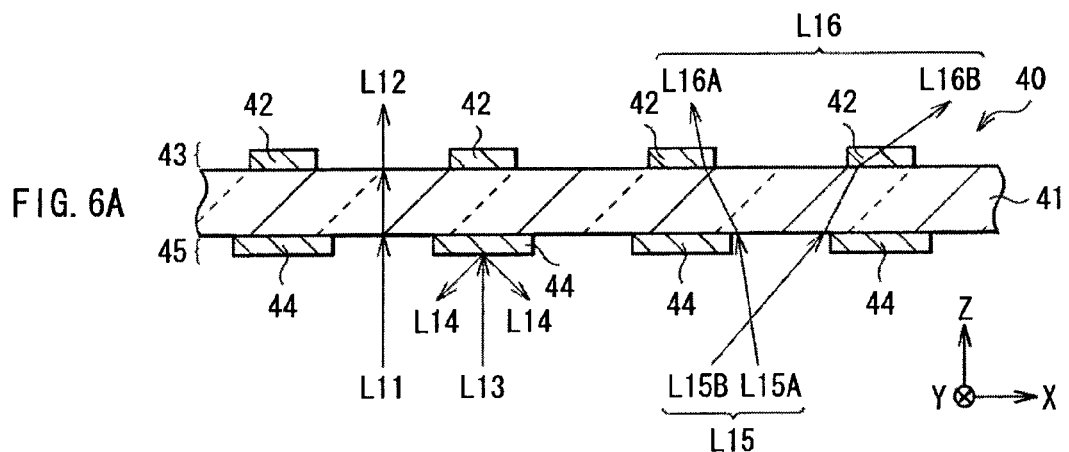
FIGS. 6A and 6B are schematic diagrams illustrating a sectional configuration and a planar configuration of a color correction filter according to a second embodiment of the invention, respectively.
Figure 6B:
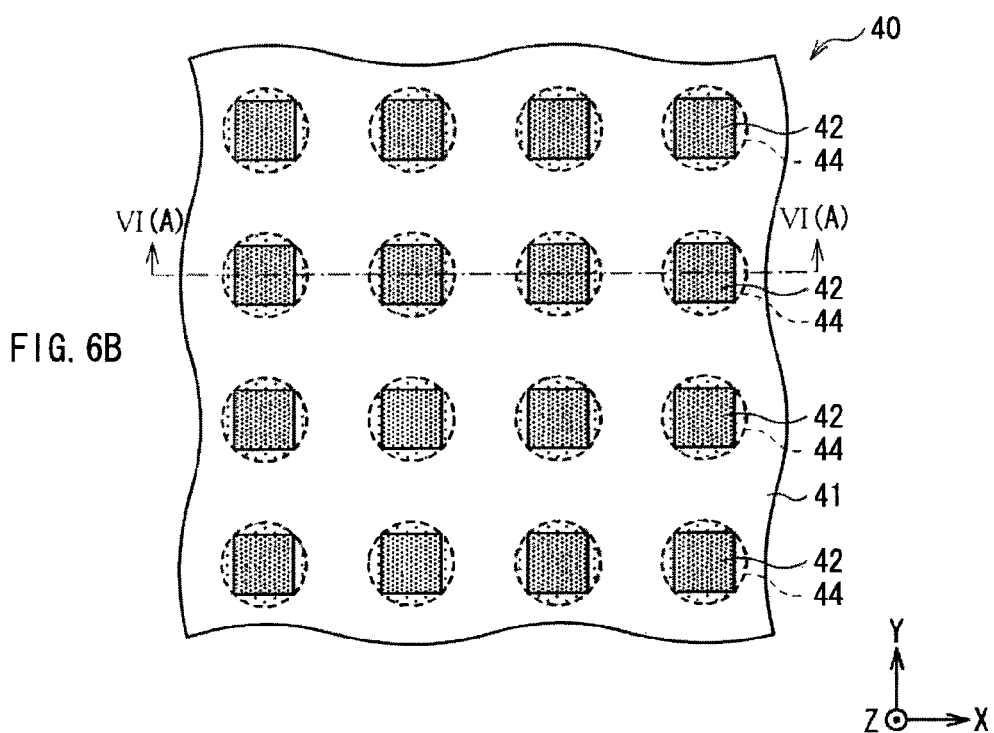

FIGS. 6A and 6B illustrate a color correction filter 40 mounted in a liquid crystal display device according to a second embodiment, where FIG. 6A illustrates a sectional configuration along a line VI(A)-VI(A) of FIG. 6B, and FIG. 6B illustrates a planar configuration as seen from a liquid crystal display panel 10 side.

The embodiment has the same configuration as that in the first embodiment except that the color correction filter 40 described later is used in place of the color correction filter 30 having the cholesteric liquid crystal polymer layer 31A and the quarter-wavelength layer 31B.

Color Correction Filter

The color correction filter 40 has a coloring layer 43 configured of a plurality of rectangular island portions (unit coloring layers 42) discretely provided on a surface on a liquid crystal display panel 10 side of a transparent base 41 having a pair of surfaces. In addition, the color correction filter 40 has a reflective layer 45 configured of a plurality of circular island portions (unit reflective layers 44) provided on a surface on a light source 21 side of the base 41 in correspondence to the unit coloring layers 42. The color correction filter 40 changes a hue of light entering in an oblique direction to a panel surface among light entering into the liquid crystal display panel 10 without changing a hue of light entering in a vertical direction. Thus, a hue of the light is corrected such that a hue seen from a visual point in the vertical direction to the liquid crystal display panel 10 is approximately the same as a hue seen from a visual point in the oblique direction thereto. The word "discretely" means a state where the unit coloring layers 42 are dispersed over the whole surface opposed to the liquid crystal display panel 10, but does not mean excluding a state where the unit coloring layers 42 are partially connected to one another.

Light from the light source 21 transmitted or reflected by the color correction filter 40 may be classified into light in a vertical direction and light in an oblique direction as illustrated in FIG. 6A. Among the light in the vertical direction, light L11 entering into an exposed surface of the base 41 is transmitted by the base 41, and such transmitted light L12 enters into the liquid crystal display panel 10. Among the light in the vertical direction, light L13 entering into a unit reflective layer 44 is reflected or reflected/scattered by the unit reflective layer 44 and thus becomes light L14 returning to a light source 21 side. In contrast, among the light in the oblique direction, light L15 entering into the exposed surface of the base 41 is transmitted by the base 41, and then enters into a unit coloring layer 42, and is emitted as light L16 being changed in hue. Among the light L15 in the oblique direction, light L15A having a large angle against a panel surface (having a small angle against a vertical direction) is short in optical path during passing through the unit coloring layer 42, and emitted as light L16A being relatively low in hue change degree. Among the light L15 in the oblique direction, light L15B having a small angle against the panel surface (having a large angle against the vertical direction) is long in optical path during passing through the unit coloring layer 42, and outputted as light L16B being relatively high in hue change degree. The light L12 and light L16 (L16A and L16B) transmitted by the color correction filter 40 in this way enter into the liquid crystal display panel 10.

The base 41, which is a substrate of the color correction filter 40, is substantially transparent in a visible light range, and includes a material having approximately no birefringence. Here, "substantially transparent" means a state where light transmittance is uniform over the whole visible light range, and incident light is not scattered. If light is scattered in the base 41, a path of light, the light entering in the oblique direction to the exposed surface of the base 41, and being to pass through the unit coloring layer 42 as described before, may be obstructed, as a result, desired hue correction operation is hardly achieved. A material of the base 41 includes, for example, a plastic material such as acrylic resin, a triacetyl-cellulose (TAC) film, or a film containing a norbornene series compound. In particular, the base 41 preferably includes a cycloolefin polymer. Thus, since heat resistance of the base 41 is improved, distortion due to heat from the light source 21 hardly occurs. Accordingly, even if the color correction filter is driven for a long time, desired hue correction operation is highly maintained. While thickness of the base 41 may be optionally set, the thickness may be, for example, about 1 mm.

Each of the unit coloring layers 42 configuring the coloring layer 43 is optionally shaped as seen from a liquid crystal display panel 10 side. That is, while each unit coloring layer 42 has a square shape in FIGS. 6A and 6B, this is not limitative, and, for example, the unit coloring layer 42 may have a rectangular shape, or another polygonal shape such as pentagonal or hexagonal shape. In particular, the unit coloring layer 42 preferably has a tetragonal shape, and particularly preferably has a square shape. In the liquid crystal display panel 10, a degree of change in hue of light, the light being emitted in an azimuth of 45° from a transmission axes of the polarizing plates 18 and 19, is large among oblique light emitted in an oblique direction, and apexes of a square may be disposed along the azimuth, leading to higher color correction operation. In this case, the apexes of a square are preferably contacted to a border line of a circular unit reflective layer 44. Thus, high color correction operation may be achieved. That is, a difference between width of the unit coloring layer 42 and width of the unit reflective layer 44 is preferably minimized in the polar angle direction.

Each unit coloring layer 42 has a spectrum of light transmitted by the unit coloring layer 42 having a peak in a wavelength range from 400 nm to less than 550 nm, and relatively transmits a wavelength of blue. Therefore, each unit coloring layer 42 is preferably colored by, for example, dye having a maximum absorption wavelength in a band of more than 550 nm and less than 780 nm, and having a blue base hue strongly absorbing light on a long wavelength side in a visible light range. If dye, which strongly absorbs light of a wavelength 550 nm near the maximum spectral luminous efficiency, is used, sufficient luminance is hardly obtained. In addition, if dye having a maximum absorption wavelength of 780 nm or more is used, light in a visual light range is hard to be effectively absorbed. In particular, the maximum absorption wavelength is preferably 580 nm or more so as to efficiently absorb yellow or orange light (yellowish color light). Thus, in the case of white display, a difference is reduced between a hue seen from a visual point in a vertical direction to a panel surface and a hue seen from a visual point in an oblique direction. That is, change in hue depending on viewing angles is suppressed.

Such dye may include, for example, colors or pigments, and specifically includes xanthenes-based compounds, squarylium-based compounds, cyanine-based compounds, oxonol-based compounds, azo-based compounds, pyrromethene-based compounds, and porphyrin-based compounds. One of such materials may be singly used, or several of the materials may be mixedly used.

Thickness of the unit coloring layer 42 may be optionally set, and, for example, set to about 2 µm. Width of the unit coloring layer 42 and a distance between the unit coloring layers 42 may be determined depending on a coloring degree of the unit coloring layer 42, an optical characteristic (refractive index or the like) of each component, an optical characteristic (refractive index or the like) of the base 41, and a mounting condition of the color correction filter 40.

The unit reflective layers 44 configuring the reflective layer 45 are provided on a surface on a light source 21 side of the base 41 in a manner of being opposed to the unit coloring layers 42, respectively, and scatter and reflect light entered into each unit reflective layer 44 among light from the light source 21 side. For example, the reflective layer 45 may be formed by using white paint for white reflection, or using a metal material for mirror reflection.

Thickness of the unit reflective layer 44 may be optionally set, and, for example, set to about 2 μm. Width of the unit reflective layer 44 and a distance between the unit reflective layers 44 may be determined depending on an optical characteristic (refractive index or the like) of each component, an optical characteristic (refractive index or the like) of the base 41, and a mounting condition of the color correction filter 40.

In the color correction filter 40, total area of the coloring layer 43 in an effective display region is preferably smaller than area of the exposed surface of the base 41 on which the coloring layer 43 is not formed. In addition, total area of the reflective layer 45 in an effective display region is preferably smaller than area of the exposed surface of the base 41 on which the reflective layer 45 is not formed. Thus, the quantity of light in a vertical direction to the panel surface tends to be sufficiently ensured, leading to sufficient front luminance. Here, the effective display region means a region on the color correction filter 40, in which pictures on the liquid crystal display panel 10 are actually displayed. Area of each of the exposed surface of the base 41, the coloring layer 43 and the reflective layer 45 means area of each of those in the effective display region in the case that a display surface of the liquid crystal display panel 10 is seen in a vertical direction. Therefore, area of the exposed surface of the base 41 on one surface side of the color correction filter 40 preferably occupies 50% or more of the effective display region. Sufficient front luminance may be ensured thereby.

Area of the unit coloring layer 42 as seen in a vertical direction to the panel surface is preferably smaller than area of the unit reflective layer 44. Thus, since a hue of light transmitted in the vertical direction from a light source 21 side is hardly changed, a desired hue is seen from a visual point in the vertical direction to a display surface.

The color correction filter 40 is produced, for example, by a printing method or a method using a mask pattern. Specifically, the coloring layer 43 is formed by the printing method or the method using a mask pattern so as to be into a predetermined pattern on one surface of the base 41 having a pair of surfaces. Similarly, the unit reflective layers 44 are formed on the other surface of the base 41 in a manner of being opposed to the unit coloring layers 42.

The color correction filter 40 is preferably set such that oblique incident light, which is transmitted by the color correction filter 40, and enters in an oblique direction to the liquid crystal display panel 10, has a hue having a local maximum value in a wavelength range from 475 nm to less than 550 nm. That is, each unit coloring layer 42 preferably transmits light having a spectrum having a peak in the wavelength range from 475 nm to less than 550 nm. Thus, since leakage of light near a wavelength of 550 nm being highest in spectral luminous efficiency is effectively suppressed, light leakage in black display may be more suppressed.

In the liquid crystal display device according to the embodiment, the color correction filter 40 is provided between the liquid crystal display panel 10 having the above configuration and the backlight unit 20. The color correction filter 40 has the coloring layer 43 including the unit coloring layers 42 discretely provided on the surface on the liquid crystal display panel 10 side of the base 41, and has the reflective layer 45 including the unit reflective layers 44 provided on the surface on the light source 21 side of the base 41 in correspondence to the unit coloring layers 42. Among light entering into the liquid crystal display panel 10 through the color correction filter 40, vertical light entering in a vertical direction has the same hue as that of light from the light source 21, and oblique incident light entering in an oblique direction has a hue having a local maximum value in a wavelength range from 400 nm to less than 550 nm. Thus, change in hue depending on viewing angles of pictures to be displayed is suppressed, and light leakage in black display is suppressed, and consequently a wide view angle may be achieved. Even in this case, when the liquid crystal display panel 10 is into a black display mode without using the color correction filter 40, leakage light leaking in an oblique direction preferably has a hue having a minimum value in a wavelength range from 475 nm to 550 nm both inclusive. In addition, oblique incident light entering in an oblique direction to the liquid crystal display panel 10 through the color correction filter 40 preferably has a hue having a local maximum value in the wavelength range from 475 nm to less than 550 nm. This may effectively suppress leakage of light near a wavelength of 550 nm being highest in spectral luminous efficiency, and consequently light leakage in black display may be more suppressed.

Other operation and effects of the liquid crystal display device according to the embodiment are the same as those in the first embodiment.

While the embodiment has been described with a case where the liquid crystal display device has the liquid crystal display panel 10, the backlight unit 20, and the color correction filter 40, the device may include other components. For example, a scattering member, by which light emitted from the color correction filter 40 is scattered before entering into the liquid crystal display panel 10, may be provided between the liquid crystal panel 10 and the color correction filter 40. Thus, change in hue depending on viewing angles may be more suppressed. The scattering member includes, for example, a light scattering sheet. Preferably, the scattering member does not strongly scatter light, namely, relatively weakly scatters light. If light is strongly scattered, light changed in hue by the color correction filter 40 may enter in a vertical direction to the liquid crystal display panel 10, so that a hue of light emitted in the vertical direction from the liquid crystal panel 10 may be changed. Alternatively, even if a surface on a light source 21 side of the polarizing plate 18 is roughened by anti-glare treatment or the like instead of additionally providing the scattering member, the same advantage as in the case of providing the scattering member is obtained.

Figure 7:
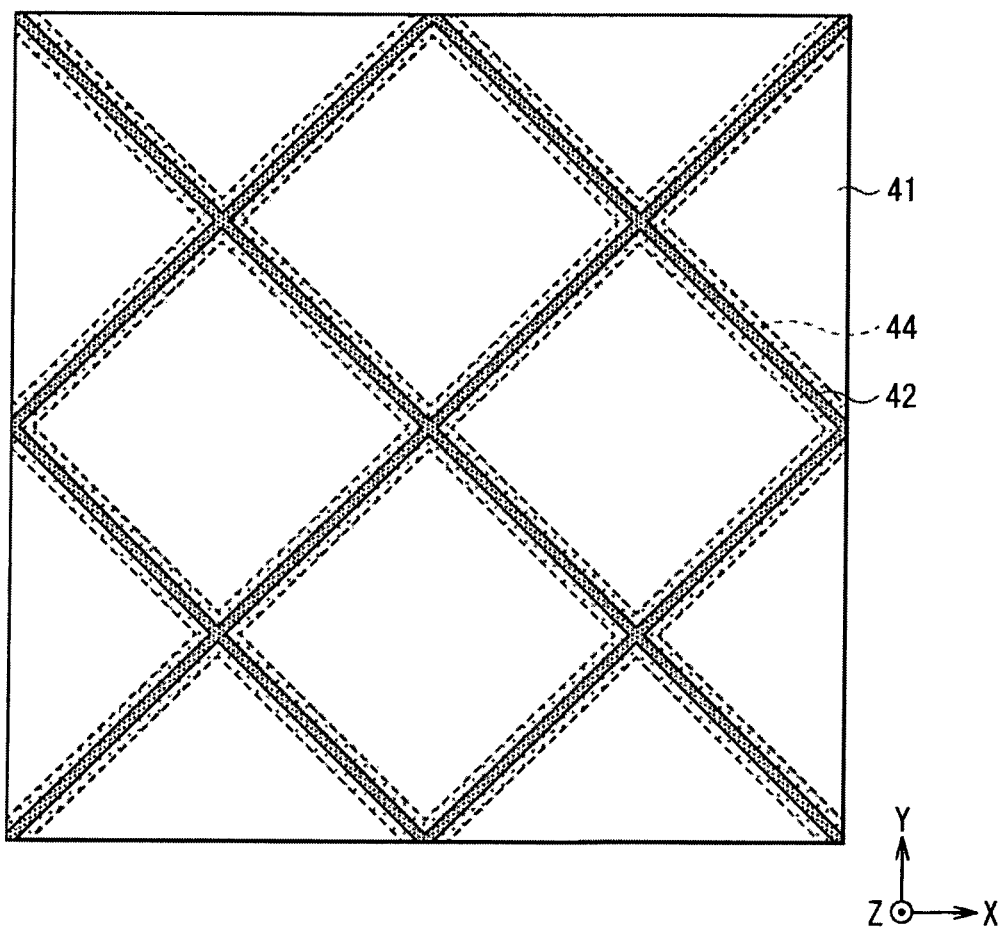
FIG. 7 is a schematic diagram illustrating a planar configuration of a modification of the color correction filter illustrated in FIGS. 6A and 6B.
Figure 8:
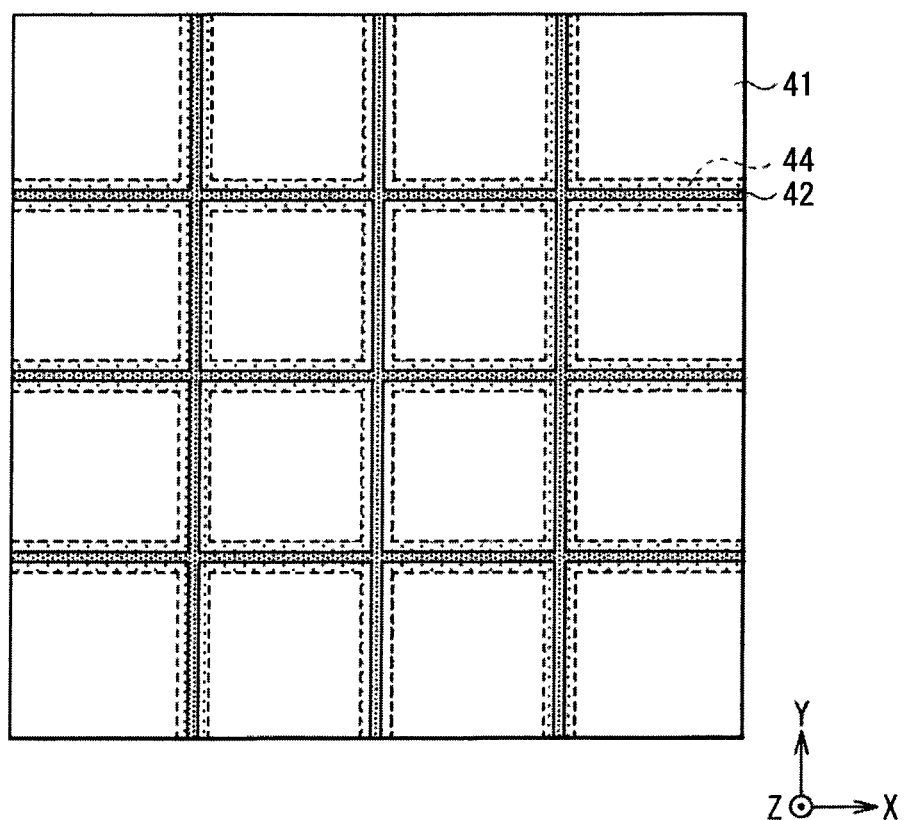
FIG. 8 is a schematic diagram illustrating a planar configuration of another modification of the color correction filter illustrated in FIGS. 6A and 6B.
Figure 9:
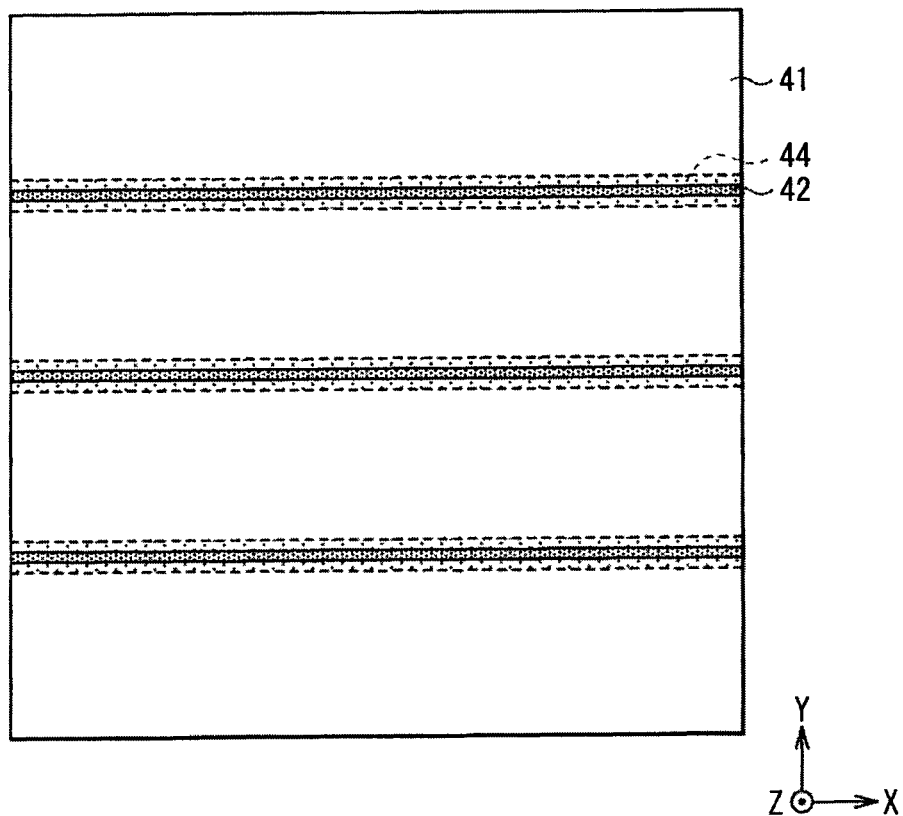
FIG. 9 is a schematic diagram illustrating a planar configuration of still another modification of the color correction filter illustrated in FIGS. 6A and 6B.

In the color correction filter 40 illustrated in FIGS. 6A and 6B, the unit coloring layer 42 has a rectangular shape, and the unit reflective layer 44 has a circular shape. However, each unit coloring layer 42 and unit reflective layer 44 may not necessarily have such a shape. Each unit coloring layer 42 and each unit reflective layer 44 may have the same shape, a circular shape or a rectangular shape. In the color correction filter 40 illustrated in FIG. 6B, the unit coloring layers 42 and the unit reflective layers 44 are provided in an independent island pattern on a surface on the liquid crystal display panel 10 side of the base 41 and a surface on the light source 21 side thereof. However, this is not restrictive. For example, the coloring layer 43 and the reflective layer 45 may be provided to have a shape in a combination of linear unit coloring layers 42 and linear unit reflective layers 44. For example, the unit coloring layers 42 and unit reflective layers 44 may be provided in a lattice pattern as illustrated in FIGS. 7 and 8, or may be provided in a banded pattern as illustrated in FIG. 9. Even if the coloring layer 43 and the reflective layer 45 have the shape of a combination of the linear unit coloring layers 42 and the linear unit reflective layers 44 in this way, the same advantages as in the case of using the color correction filter 30 are obtained.

Even in each of the color correction filters 40 illustrated in FIGS. 7 to 9, total area of the coloring layer 43 in an effective display region is preferably smaller than area of a region of the base 41 on which the coloring layer 43 is not formed as in the color correction filter 40 described in the above embodiment. In addition, total area of the reflective layer 45 in an effective display region is preferably smaller than area of a region of the base 41 on which the reflective layer 45 is not formed. Moreover, area of an exposed surface (a region in which the coloring layer 43 or the reflective layer 45 is not formed) on one surface side of the base 41 of the color correction filter 40 preferably occupies 50% or more of the effective display region. Furthermore, area of each unit coloring layer 42 is preferably smaller than area of each unit reflective layer 44 as seen in a vertical direction to a panel surface. Any of these is because of the same reason as above.

Furthermore, while the embodiment has been described with the VA-mode liquid crystal display device, this is not limitative. For example, in a TN-mode liquid crystal display device, a polarizing plate is typically disposed such that a transmission axis of the polarizing plate extends in a direction of 45° (substantially diagonal direction) from each side of a rectangular display surface. Therefore, when each unit coloring layer 42 and each unit reflective layer 44 are disposed such that color correction is efficiently performed in an oblique direction of an azimuth of 45° from a transmission axis of the polarizing plate, a higher advantage may be obtained. Specifically, when the TN-mode liquid crystal display device is applied with the color correction filter 40 illustrated in FIGS. 6A and 6B, apexes of the unit coloring layer 42 formed into a square shape are disposed along the azimuth of 45° from a transmission axis of a polarizing plate. Even in this case, when a difference between width of the unit coloring layer 42 and width of the unit reflective layer 44 is minimized in the azimuth of 45° from a transmission axis of a polarizing plate, a higher advantage may be obtained.

3. Modification

Figure 10:
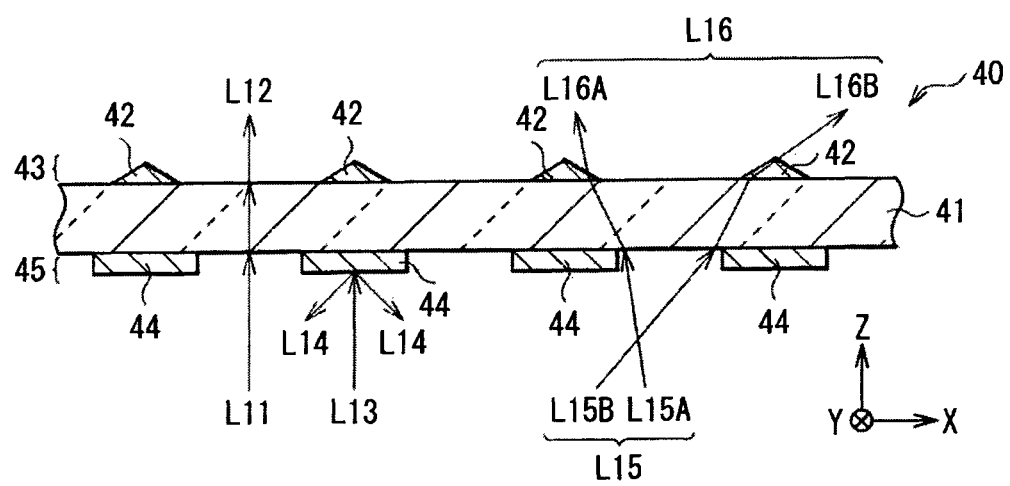
FIG. 10 is a schematic diagram illustrating a sectional configuration of still another modification of the color correction filter illustrated in FIGS. 6A and 6B.
Figure 11:
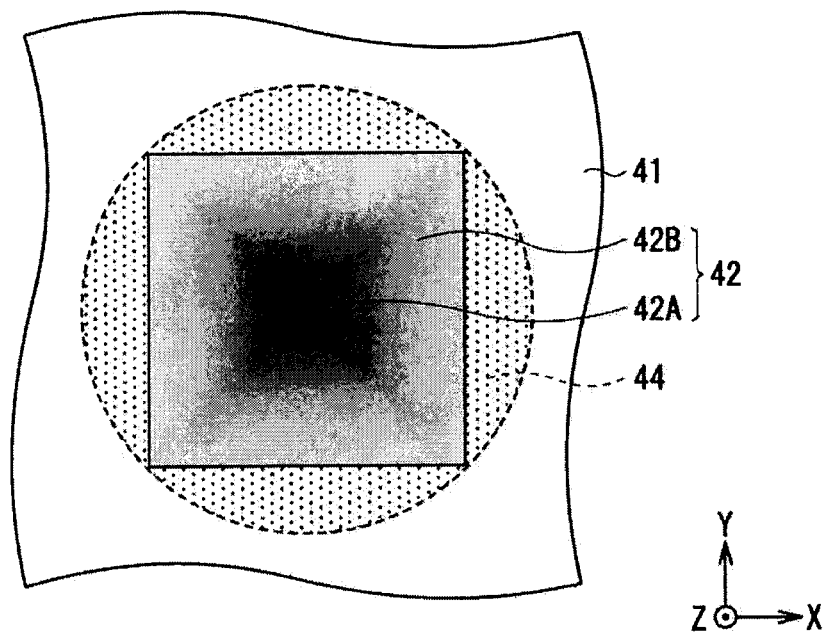
FIG. 11 is a schematic diagram illustrating a planar configuration of another modification of the color correction filter illustrated in FIG. 10.

Example of Liquid Crystal Display Device Using Still Another Color Correction Filter FIG. 10 illustrates a modification of the color correction filter 40, and FIG. 11 illustrates part of a planar configuration of the color correction filter 40 illustrated in FIG. 10 in an enlarged manner. FIG. 10 is corresponding to the sectional configuration illustrated in FIG. 6A.

The color correction filter 40 of the modification has the same configuration as that of the color correction filter 40 according to the second embodiment except that each unit coloring layer 42 has shading distribution of coloring.

Color Correction Filter

As illustrated in FIGS. 10 and 11, each unit coloring layer 42 is dark in central portion 42A, and colored gradually lighter from the central portion 42A to the periphery 42B. Thus, a predetermined wavelength is absorbed from light entering from the base 41 side so that the light is changed in hue depending on a degree of coloring (shading distribution) in the unit coloring layer 42, and then emitted. The shading distribution of coloring from the central portion 42A to the periphery 42B of the unit coloring layer 42 may vary in an approximately non-step manner as illustrated in FIG. 11, or may vary stepwise. In particular, the unit coloring layer 42 preferably has shading distribution that is likely to cancel a difference between a hue of vertical light vertically emitted from the liquid crystal display panel 10 and a hue of oblique light obliquely emitted from the liquid crystal panel 10.

In the case of the color correction filter 40 according to the modification, light L11 and light L13 entering in a vertical direction from the light source 21 become transmitted light L12 and light L14 returned to the light source 21 side, respectively as in the case of the above-described color correction filter 40. In contrast, among light entering in an oblique direction, light L15 entering into an exposed surface of the base 41 is transmitted by the base 41 and then enters into the unit coloring layer 42, and thus emitted as light L16 being changed in hue. Here, each unit coloring layer 42 is colored dark in the central portion 42A, and colored light in the periphery 42B. Thus, among the oblique light L15, light L15A having a large angle against a panel surface is transmitted by only the periphery 42B, and thus emitted as light L16A being relatively small in degree of change in hue. Among the oblique light L15, light L15B having a small angle against the panel surface is easily transmitted by both the central portion 42A and the periphery 42B, and thus emitted as light L16B being relatively large in degree of change in hue. The light L12 and the light L16 (L16A and L16B) transmitted by the color correction filter 40 in this way enters into the liquid crystal display panel 10.

In the liquid crystal display device according to the modification, the color correction filter 40 is provided between the liquid crystal display panel 10 having the above configuration and the backlight unit 20. Each of the unit coloring layers 42 configuring the coloring layer 43 of the color correction filter 40 is colored to have shading distribution where the central portion 42A is dark, and the periphery 42B is light, so that the unit coloring layer 42 transmits a relatively large quantity of blue light, and changes a hue of oblique incident light to a blue base hue. Thus, in the case of the color correction filter 40, among light entering into the liquid crystal display panel 10, vertical light incident in a vertical direction has the same hue as that of light from the light source 21, and oblique incident light entering in an oblique direction has a hue having a local maximum value in the wavelength range from 400 nm to less than 550 nm. Thus, change in hue depending on viewing angles of pictures to be displayed is suppressed, and light leakage in black display is suppressed, and consequently a wide view angle may be achieved.

In this case, since the unit coloring layer 42 has a shading portion, change in hue depending on viewing angles of pictures to be displayed may be more suppressed compared with a case of using the color correction filter 40 with the unit coloring layers 42 having no shading portion each.

Other operation and effects of the liquid crystal display device according to the modification are the same as those in the first and second embodiments.

Figure 12:
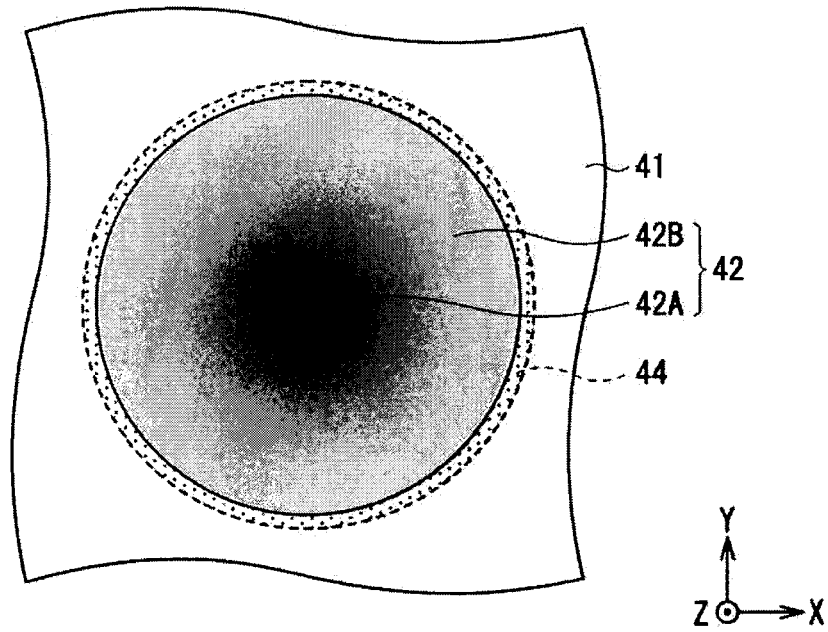
FIG. 12 is a schematic diagram illustrating a planar configuration of still another modification of the color correction filter illustrated in FIG. 10.
Figure 13:
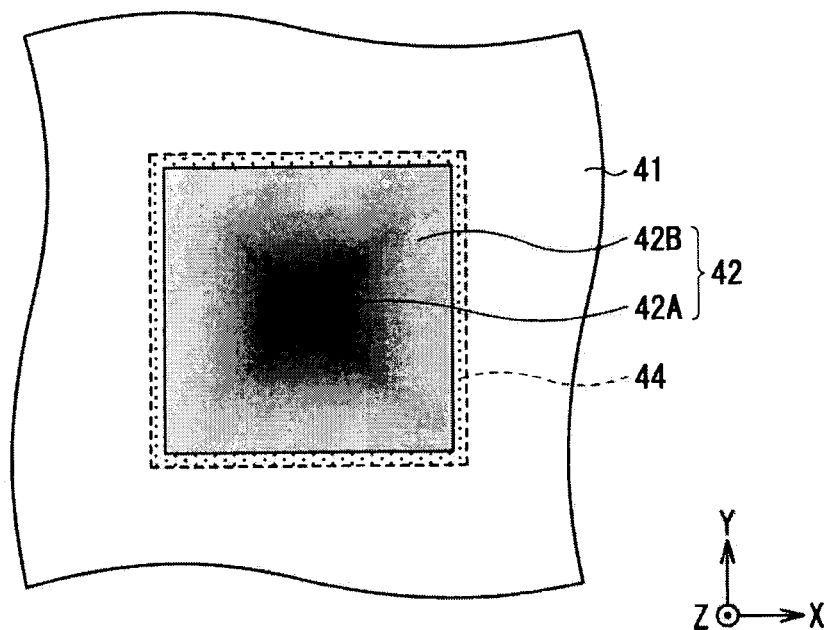
FIG. 13 is a schematic diagram illustrating a planar configuration of still another modification of the color correction filter illustrated in FIG. 10.
Figure 14:
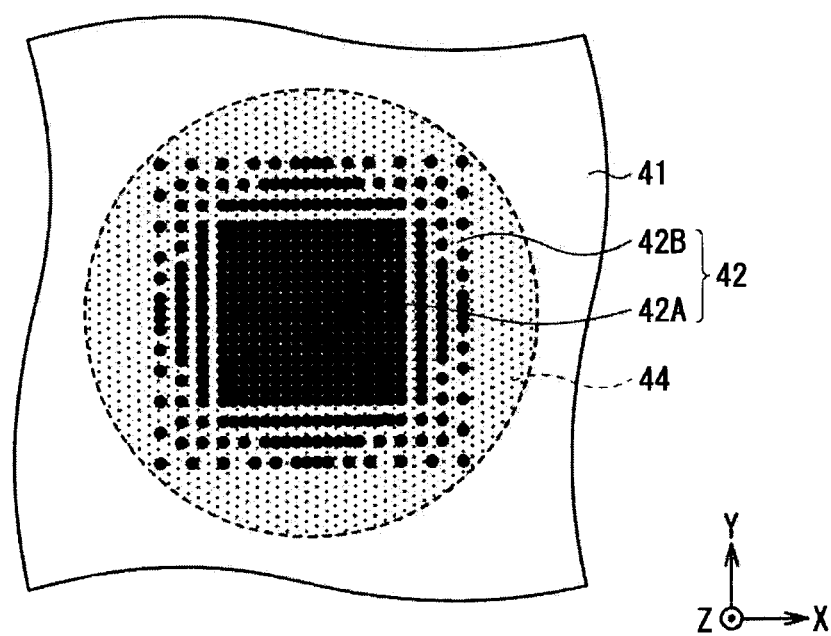
FIG. 14 is a schematic diagram illustrating a planar configuration of still another modification of the color correction filter illustrated in FIG. 10.
Figure 15A:
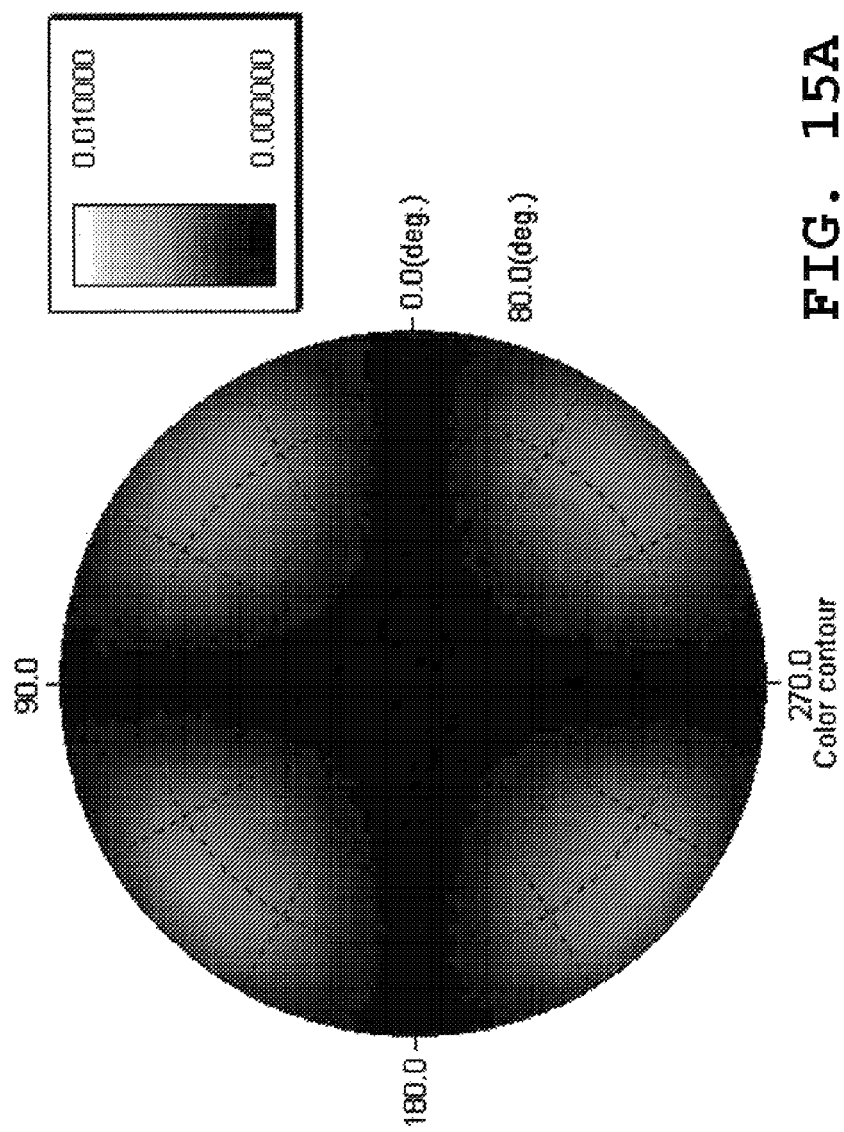
FIGS. 15A-15P are characteristic diagrams illustrating a hue in a polar angle direction in black display of each of liquid crystal display panels of experimental examples 1-1 to 1-16.
Figure 15D:
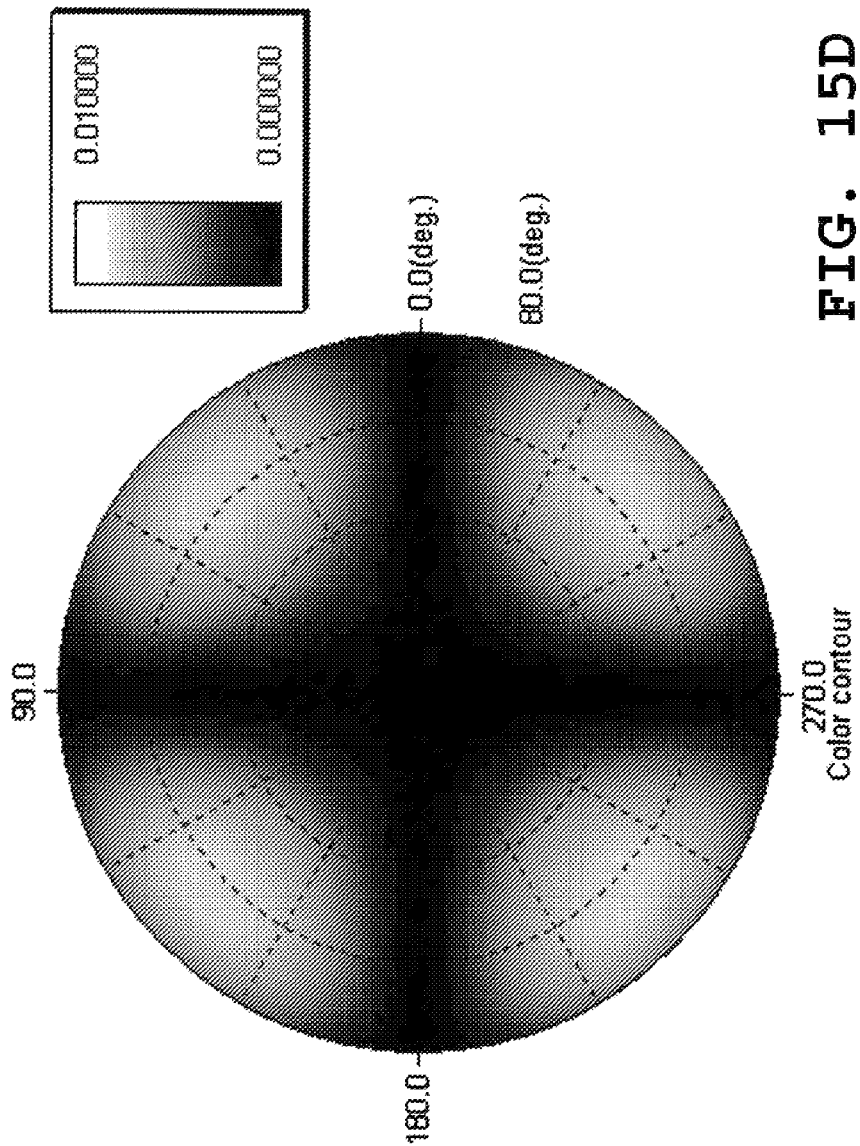
Figure 15E:
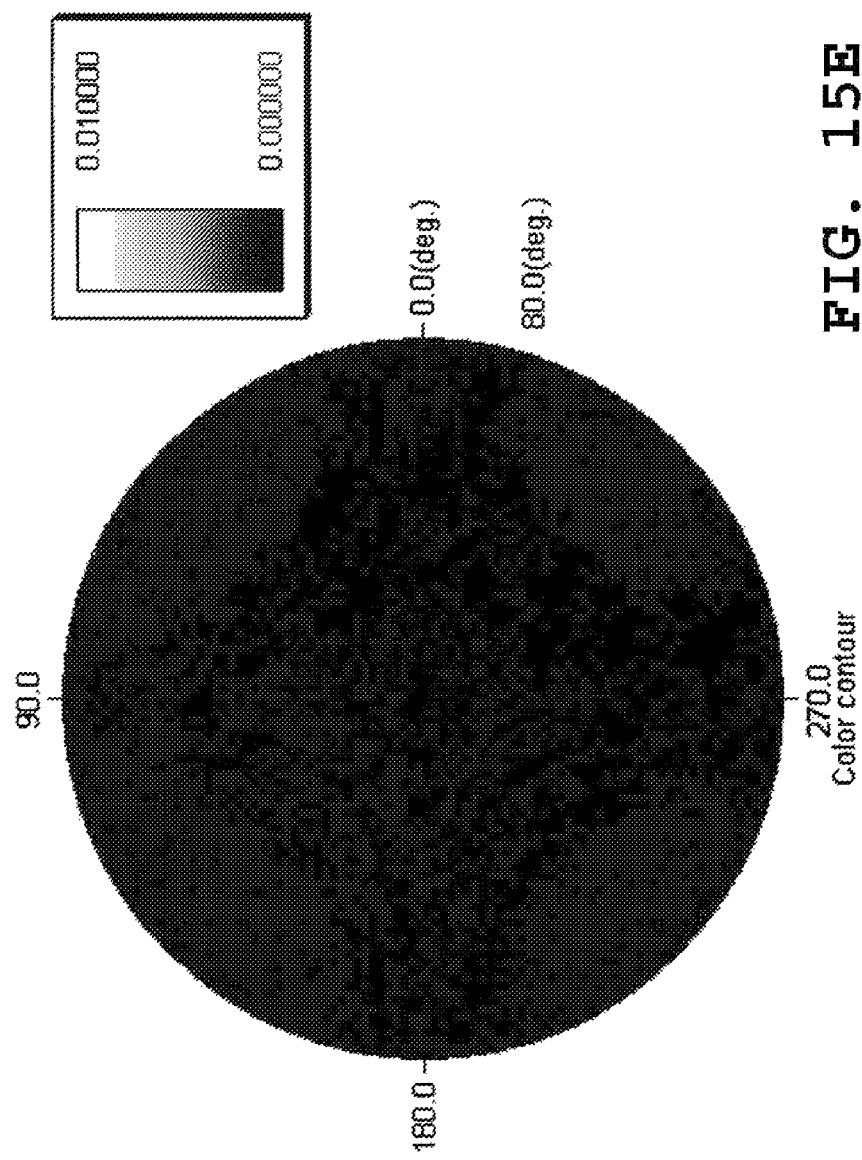
Figure 15F:
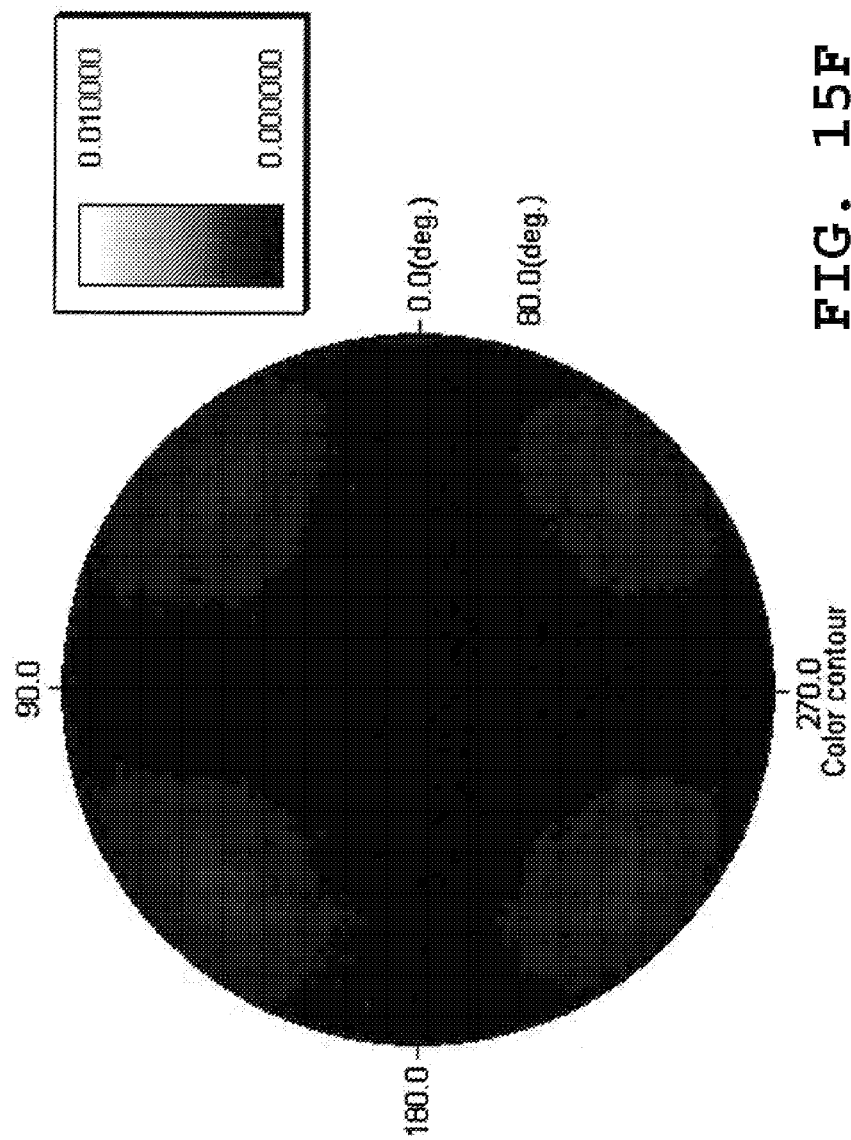
Figure 15G:
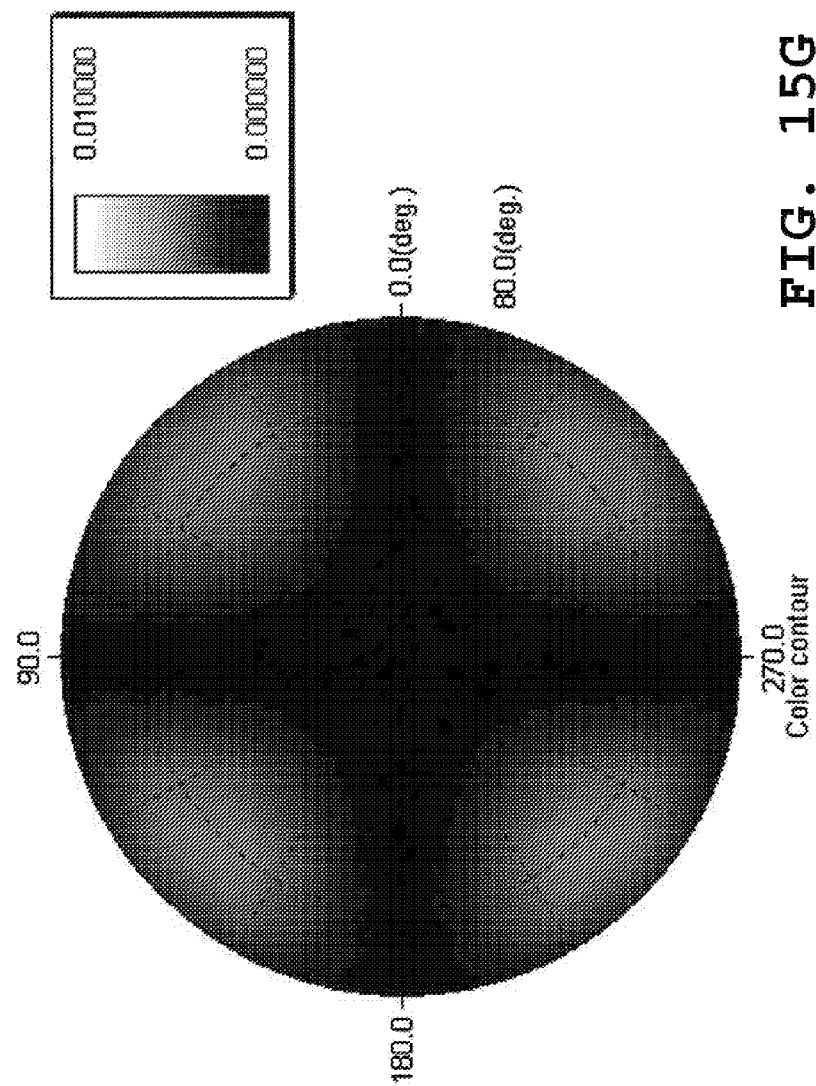
Figure 15I:
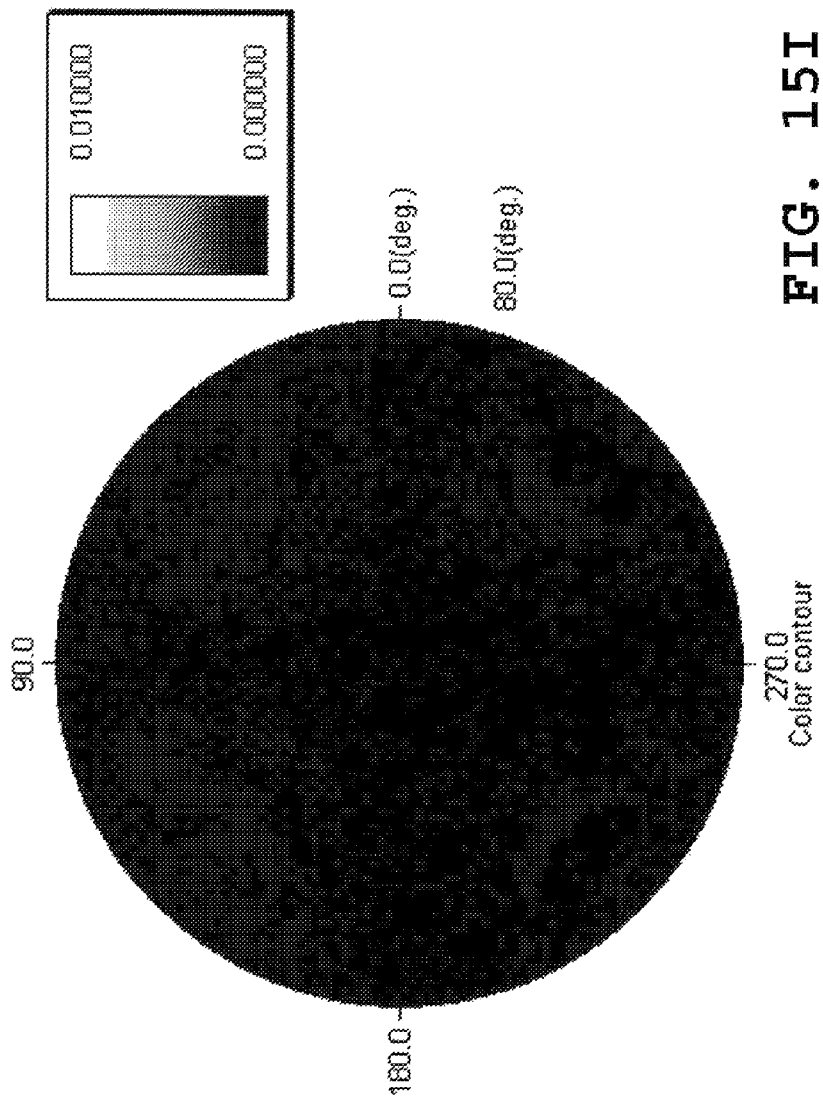
Figure 15K:
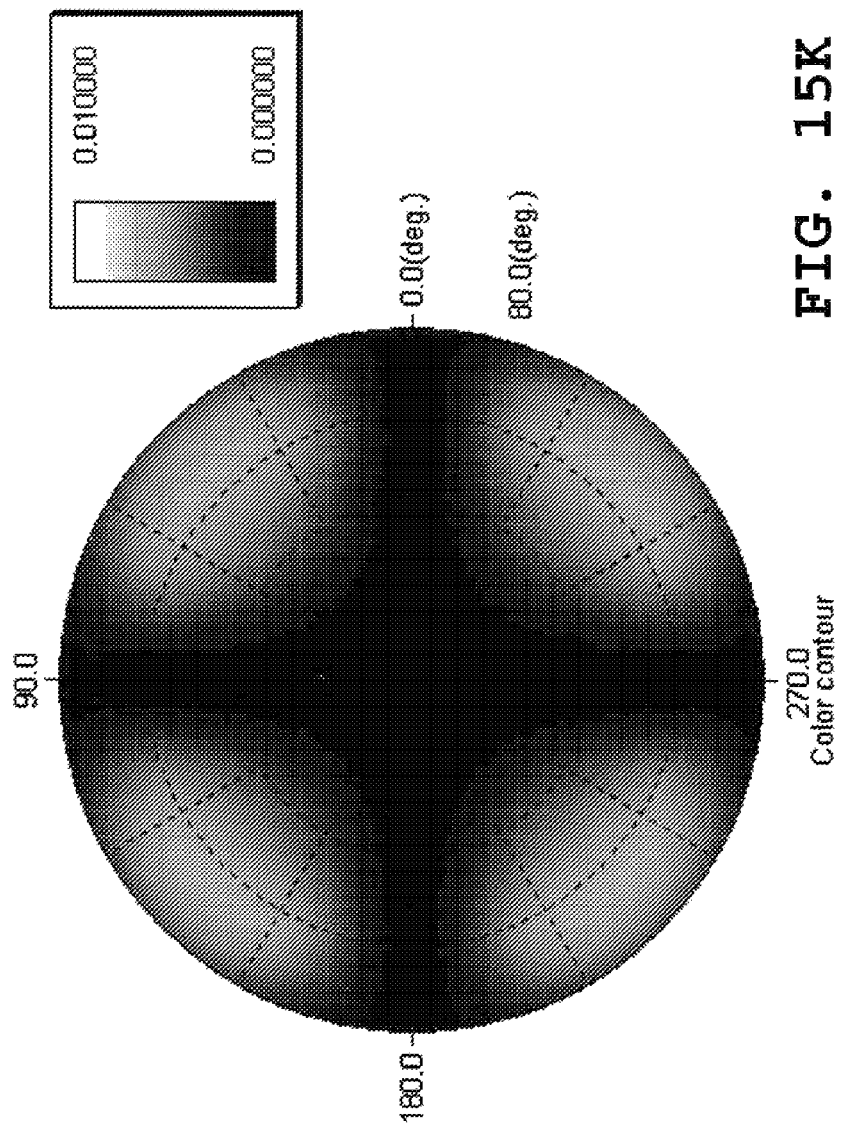
Figure 15L:
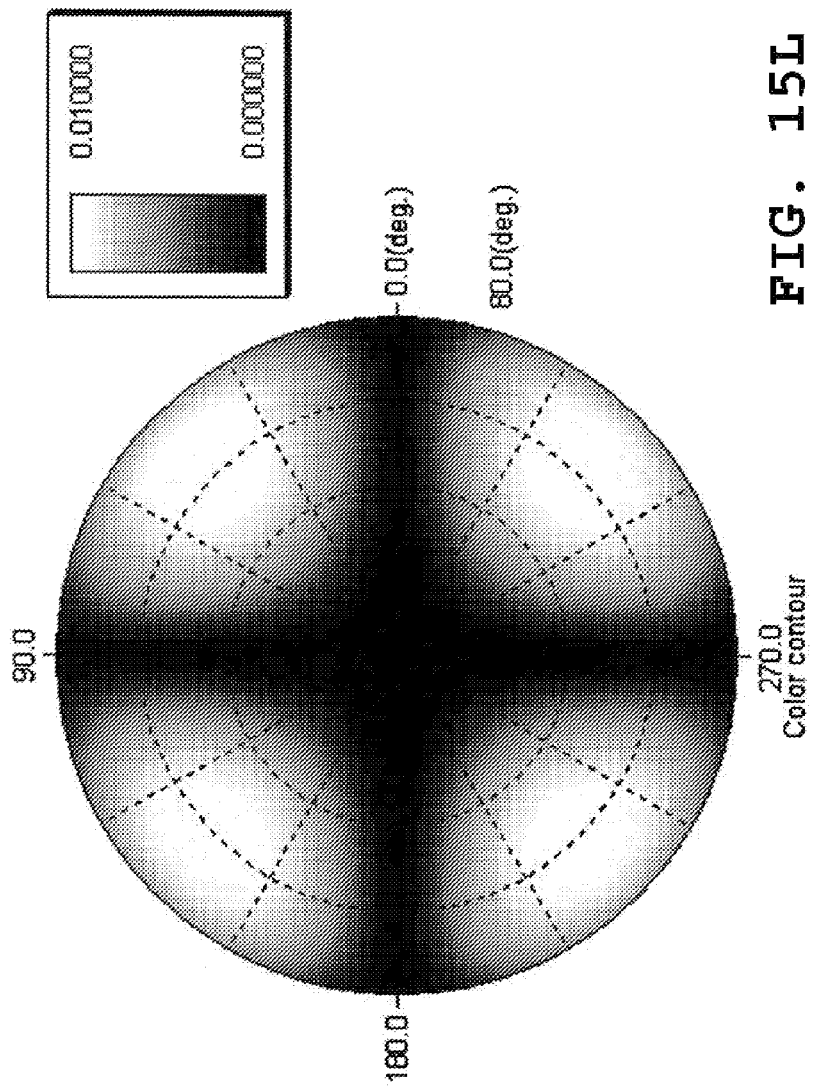
Figure 15M:
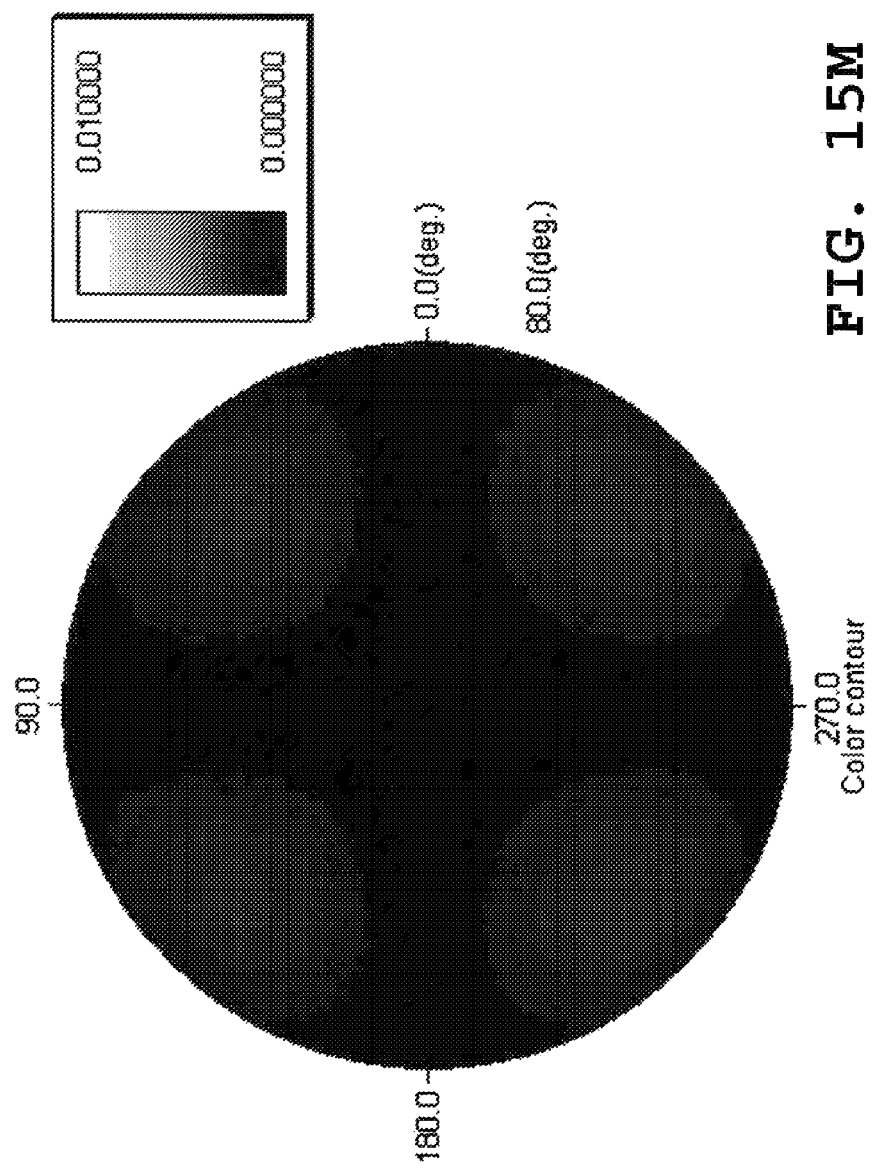
Figure 15N:
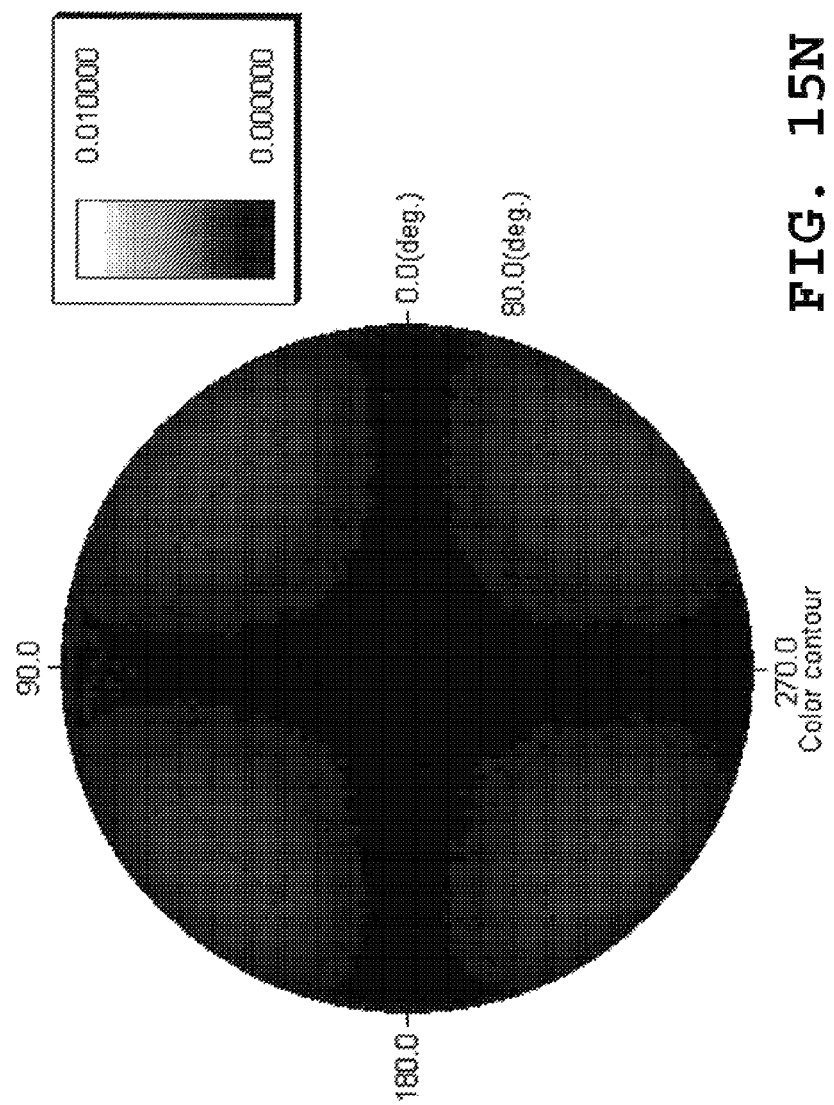
Figure 15O:
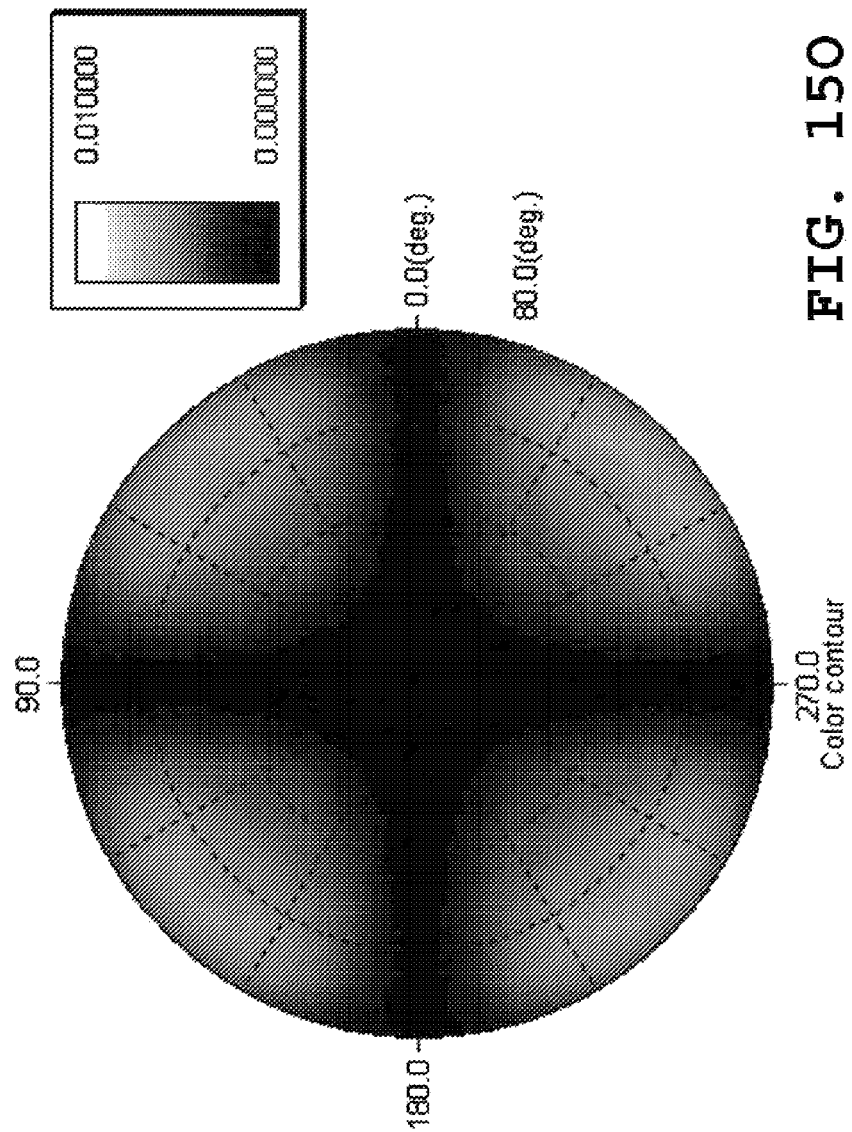
Figure 15P:
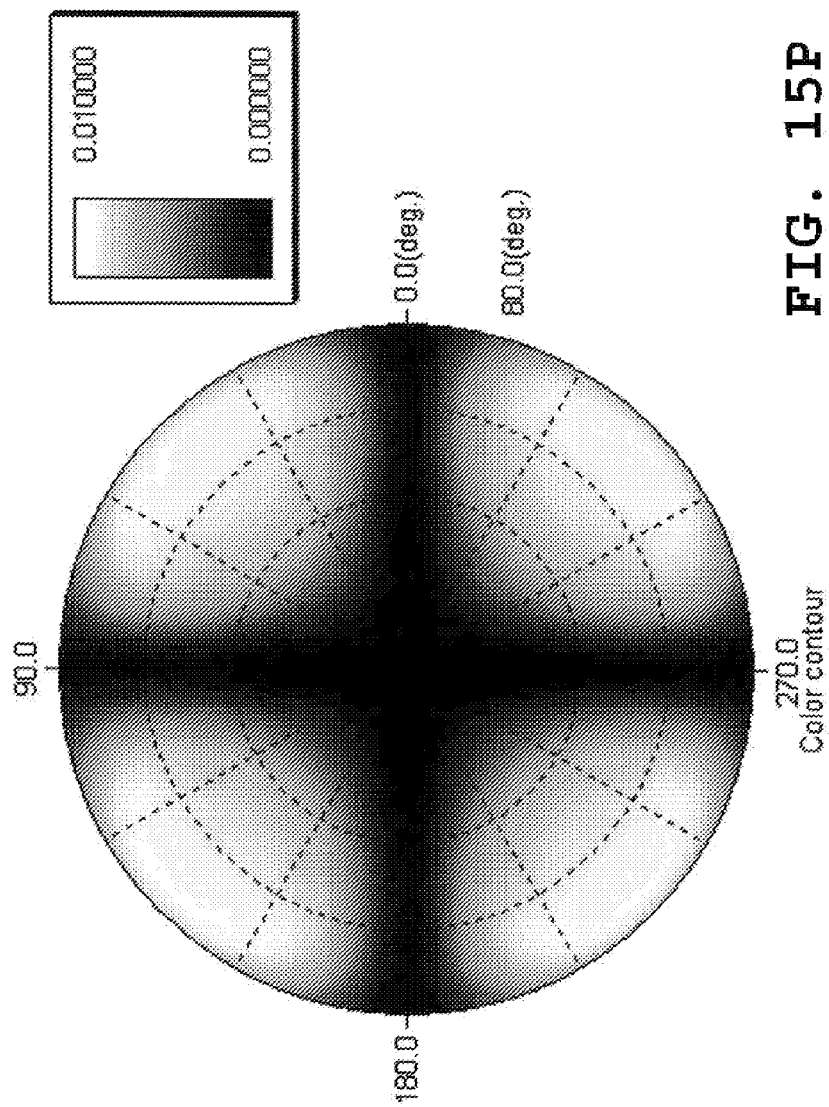
Figure 16A:
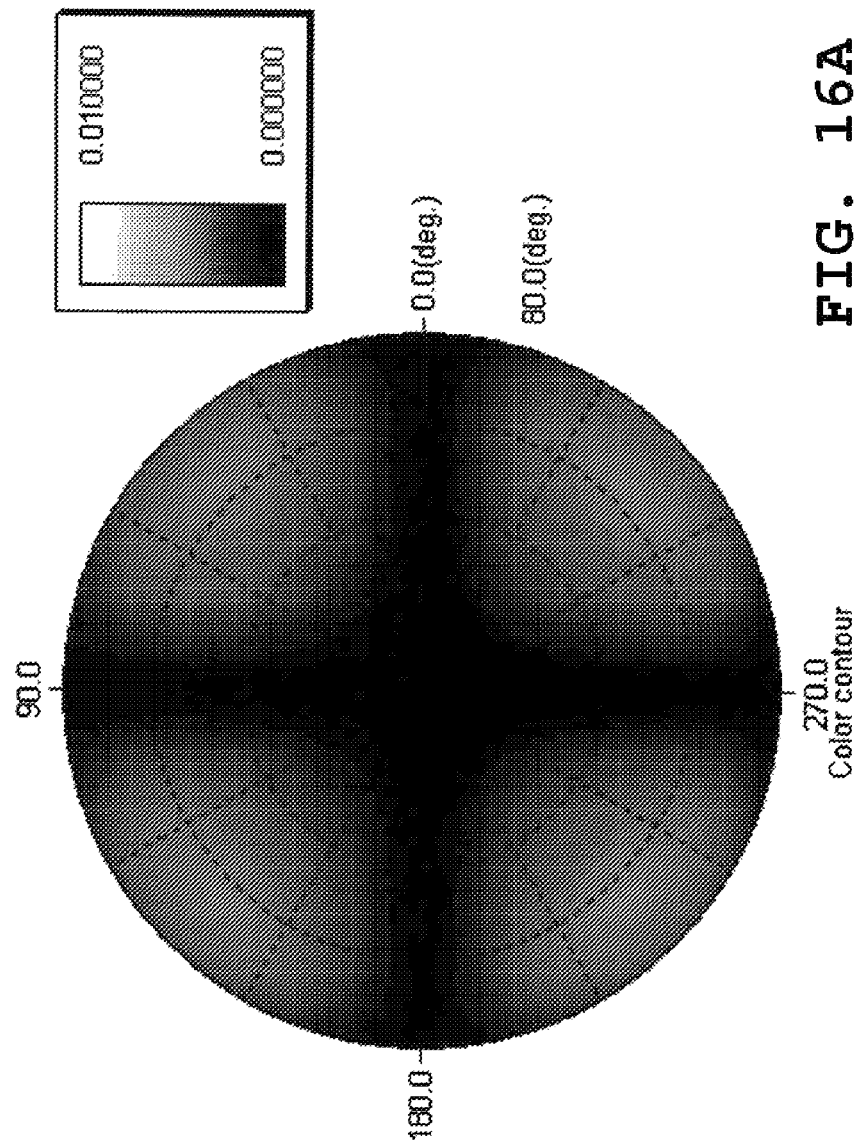
FIGS. 16A-16P are characteristic diagrams illustrating a hue in a polar angle direction in black display of each of liquid crystal display panels of experimental examples 1-17 to 1-32.
Figure 16B:
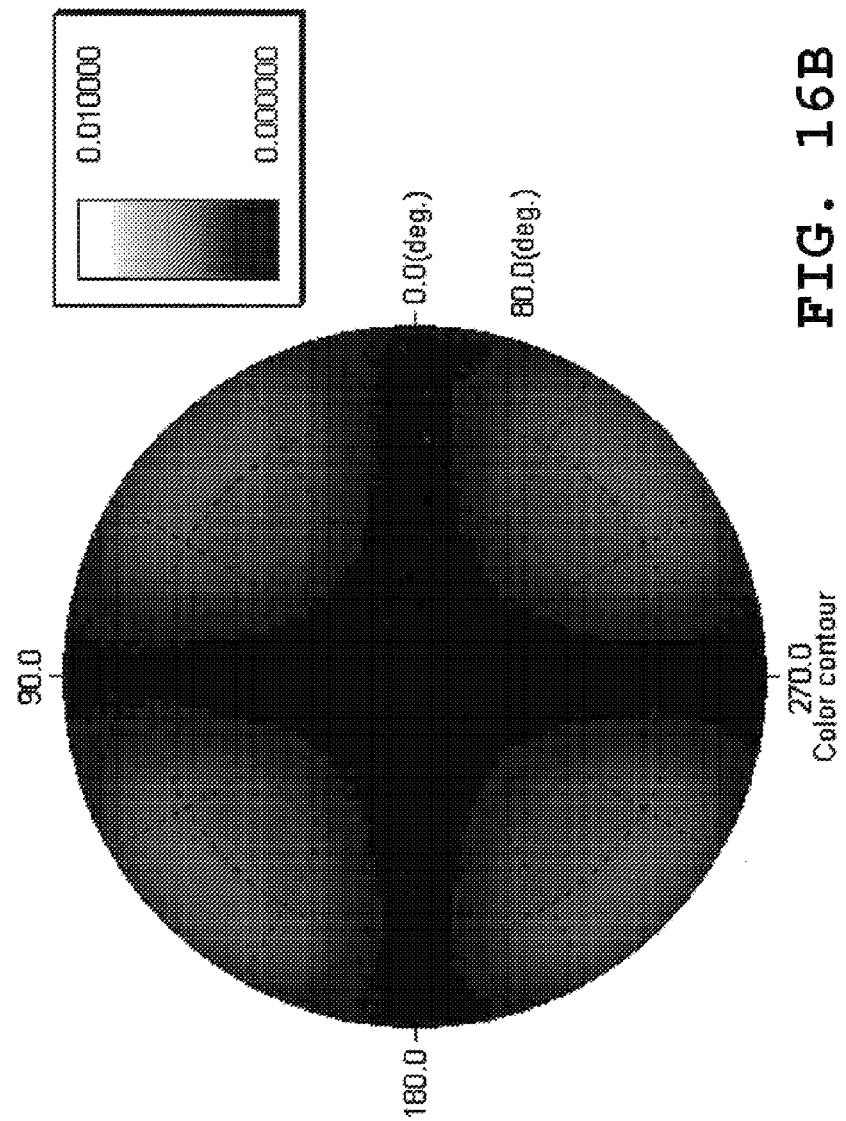
Figure 16D:
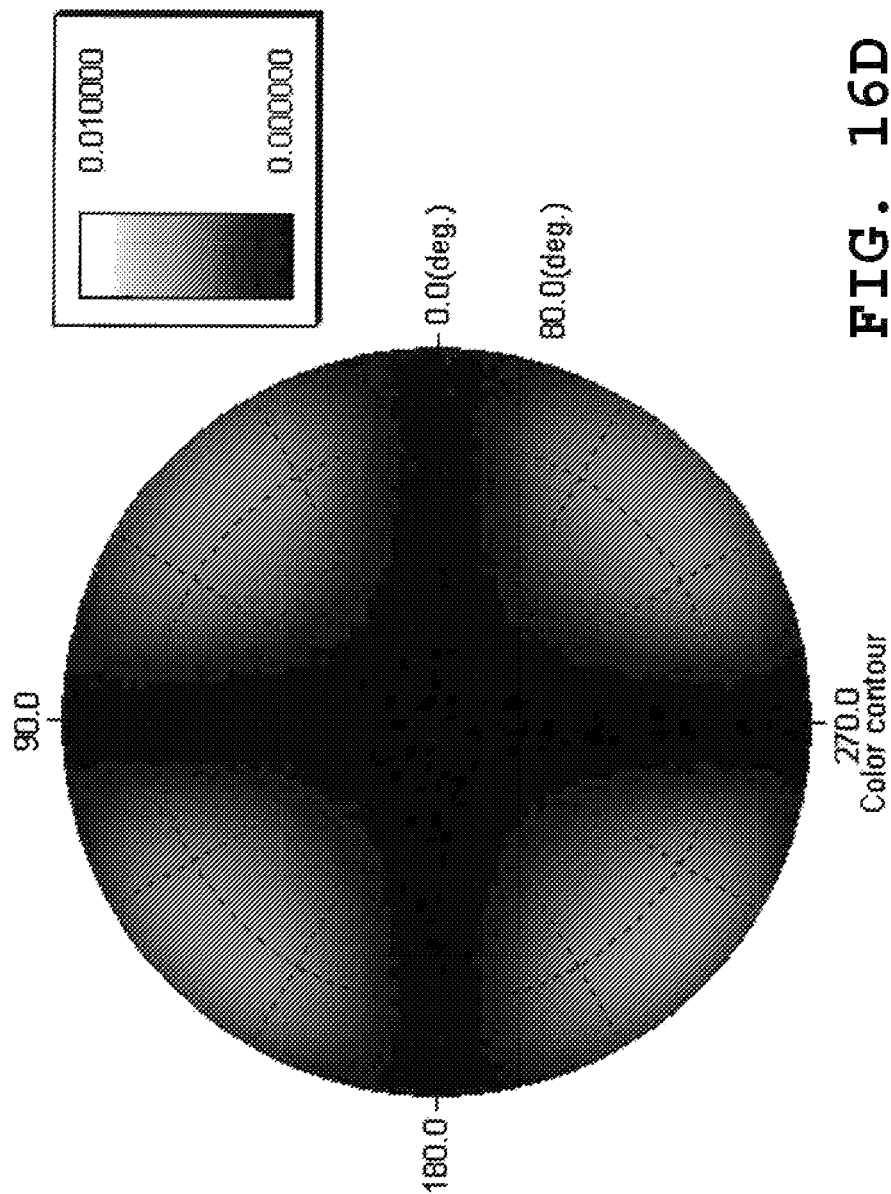
Figure 16E:
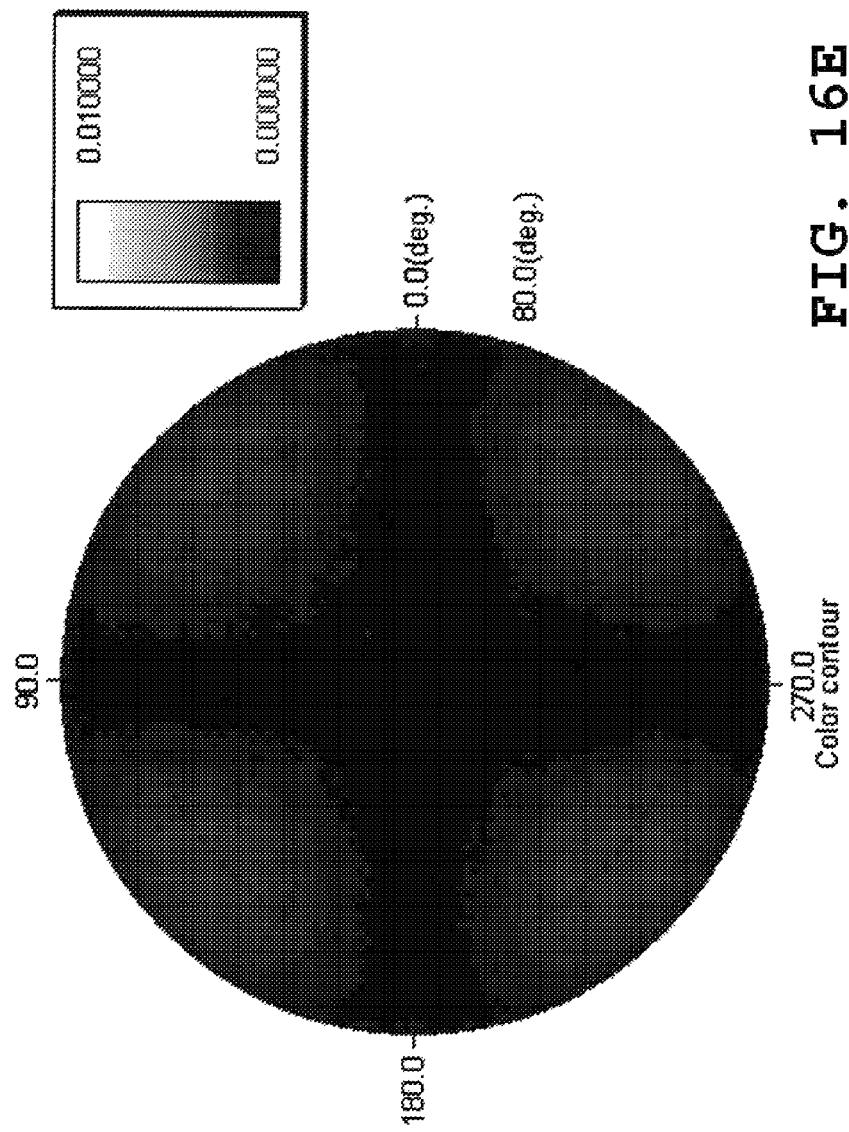
Figure 16F:
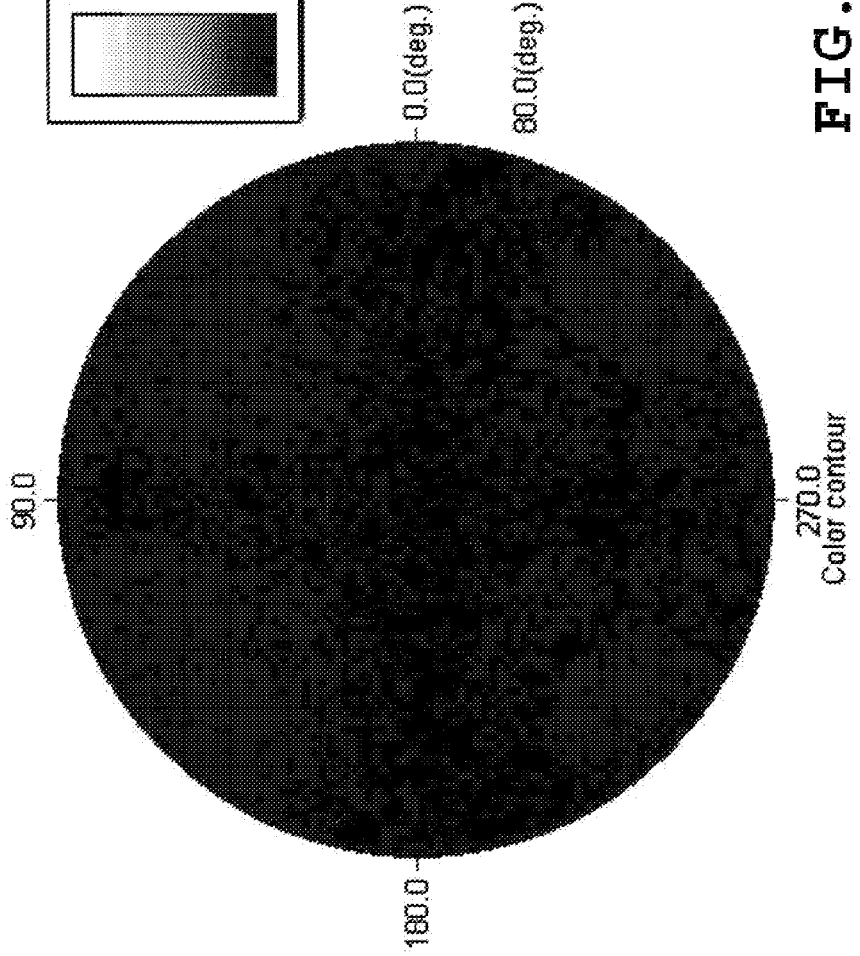
Figure 16G:
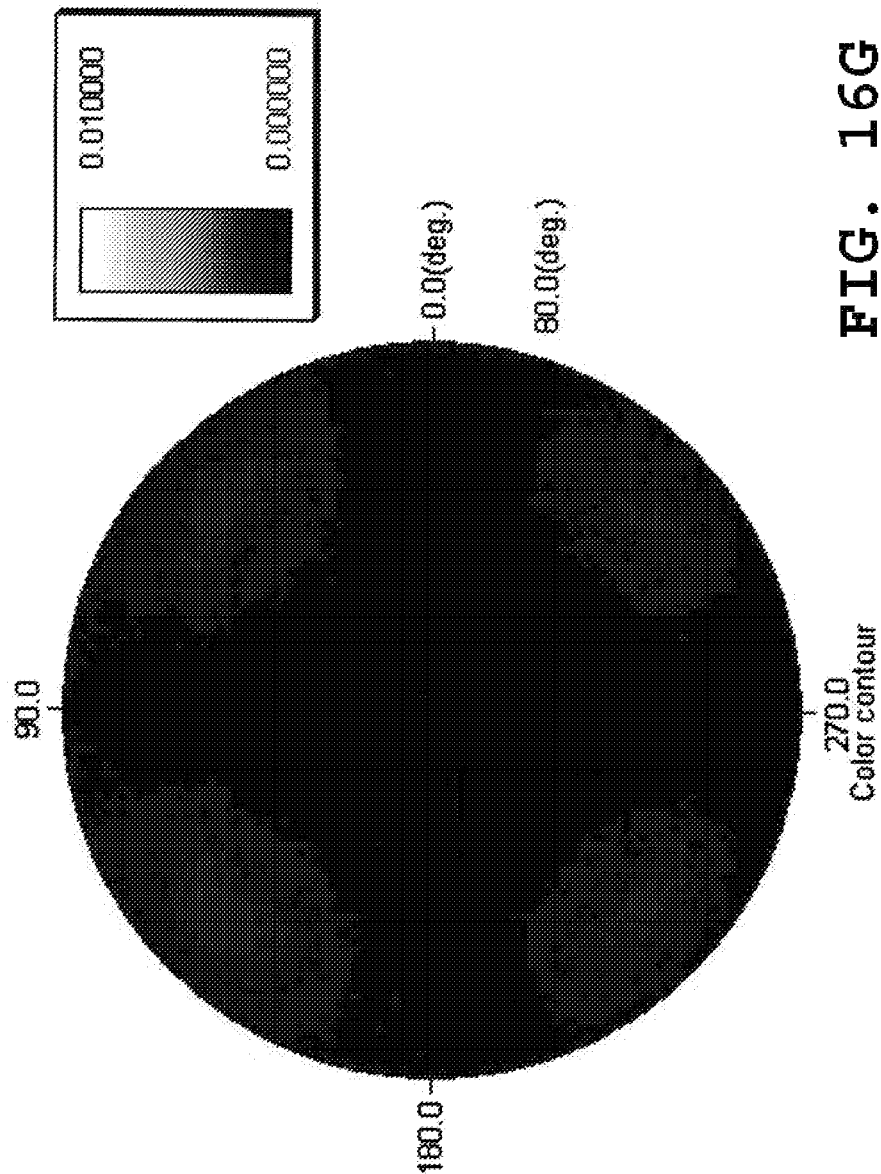
Figure 16H:
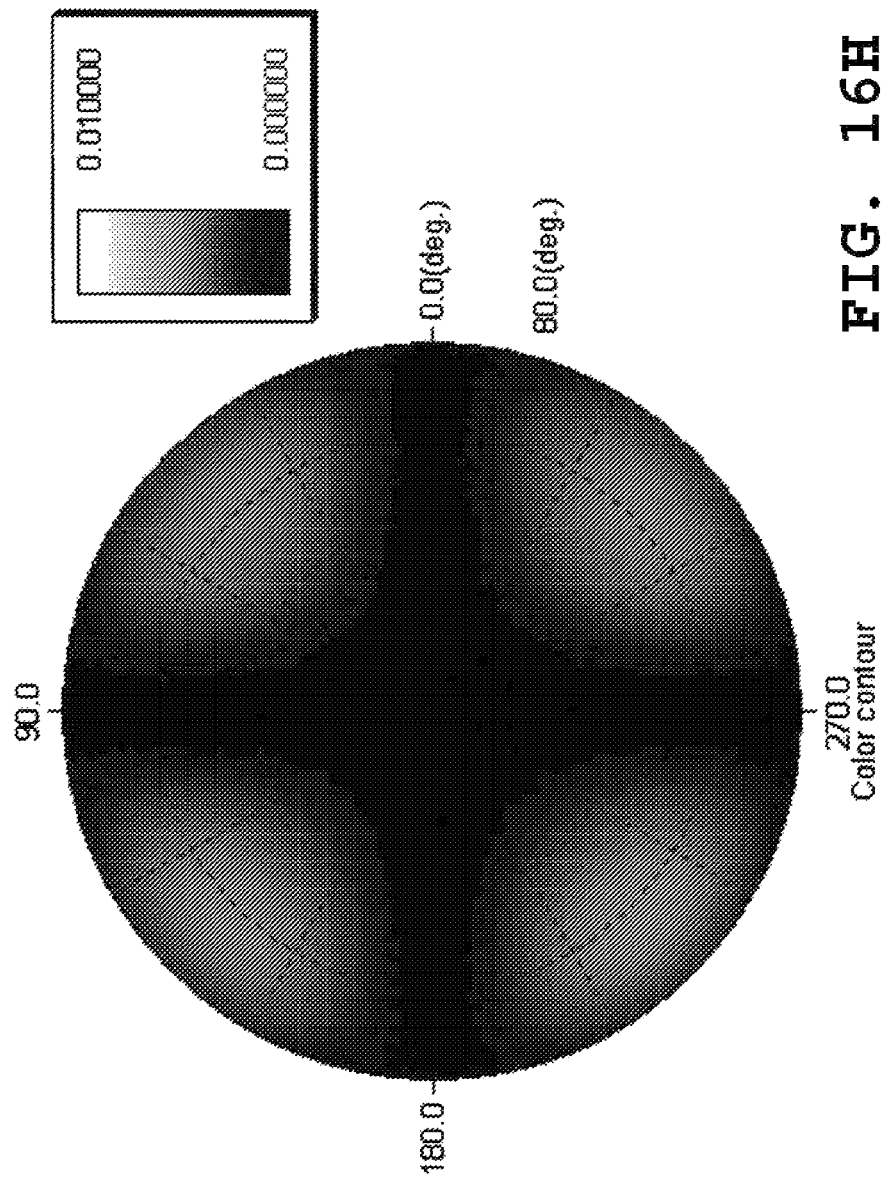
Figure 16I:
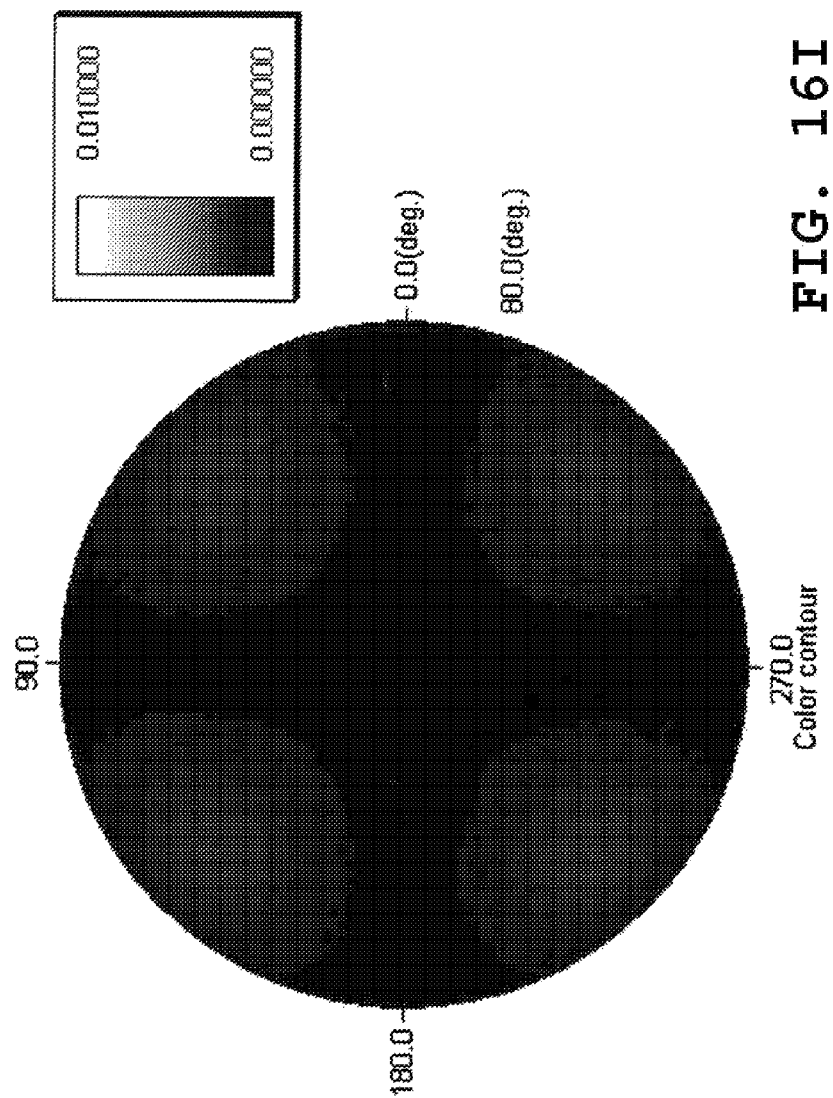
Figure 16J:
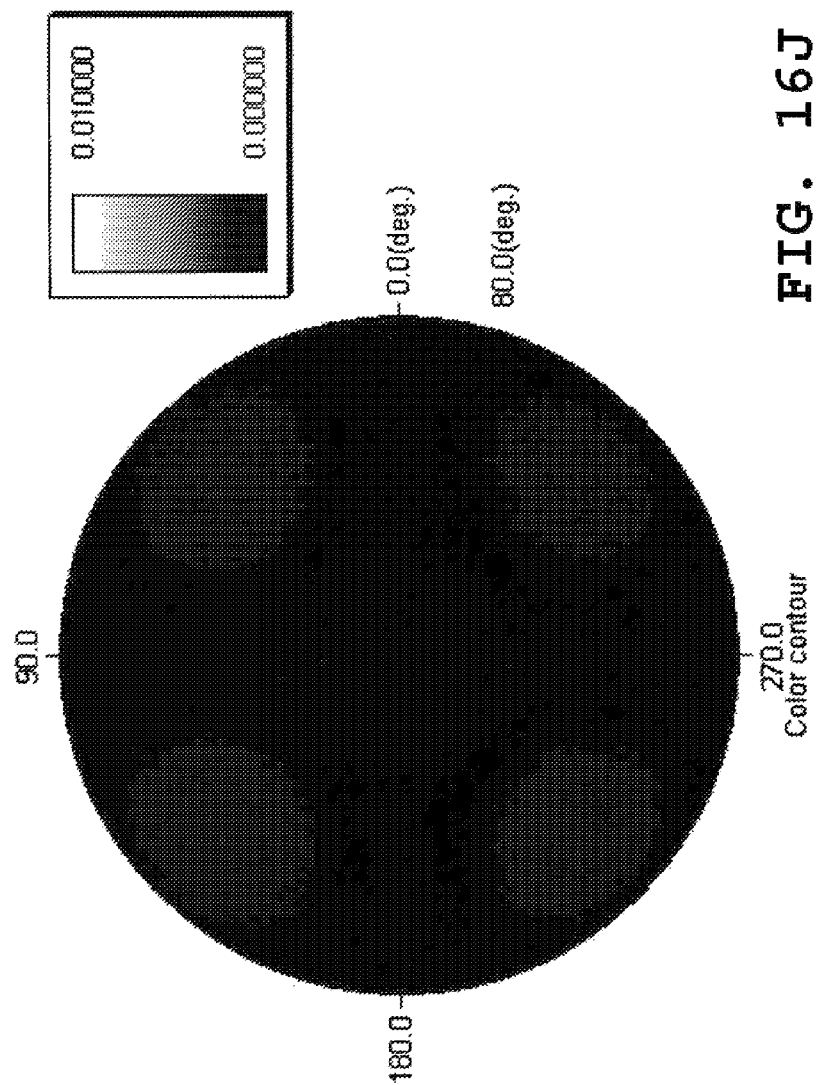
Figure 16K:
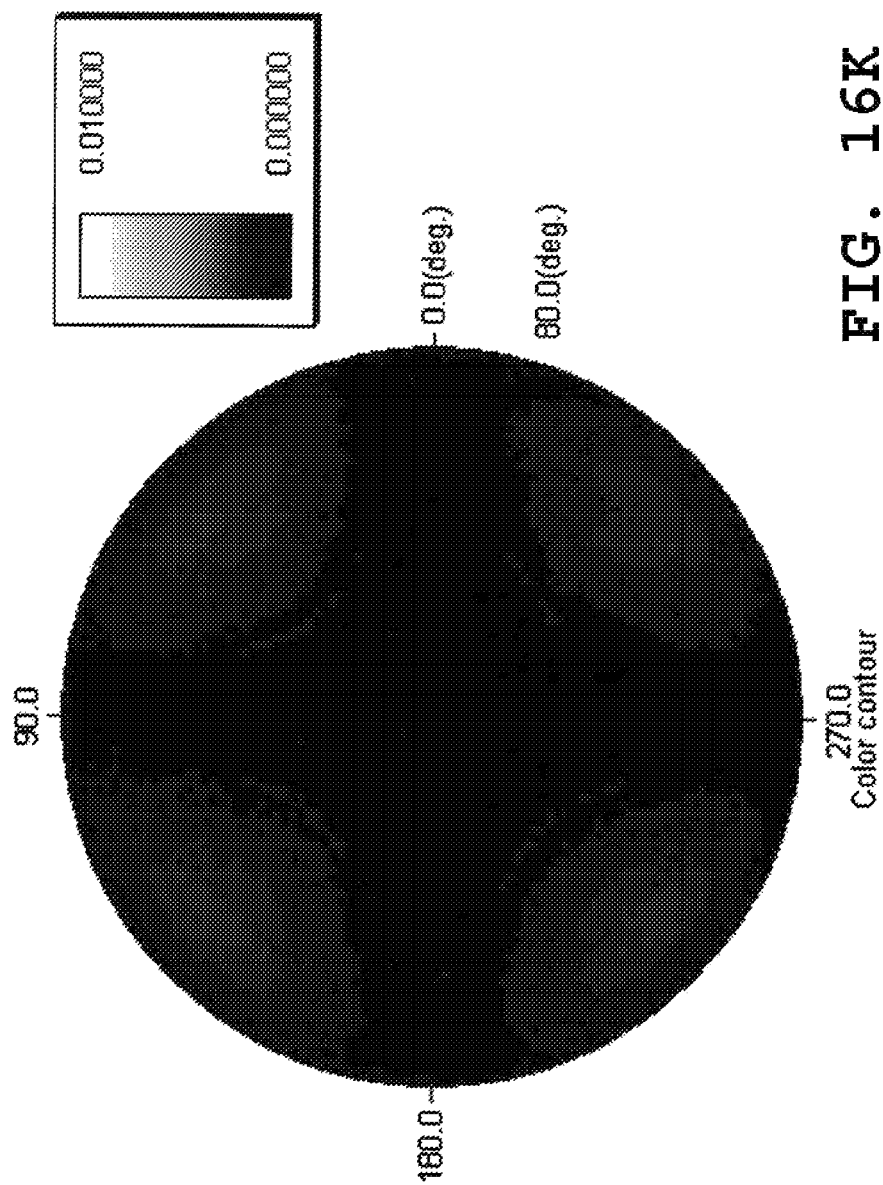
Figure 16L:
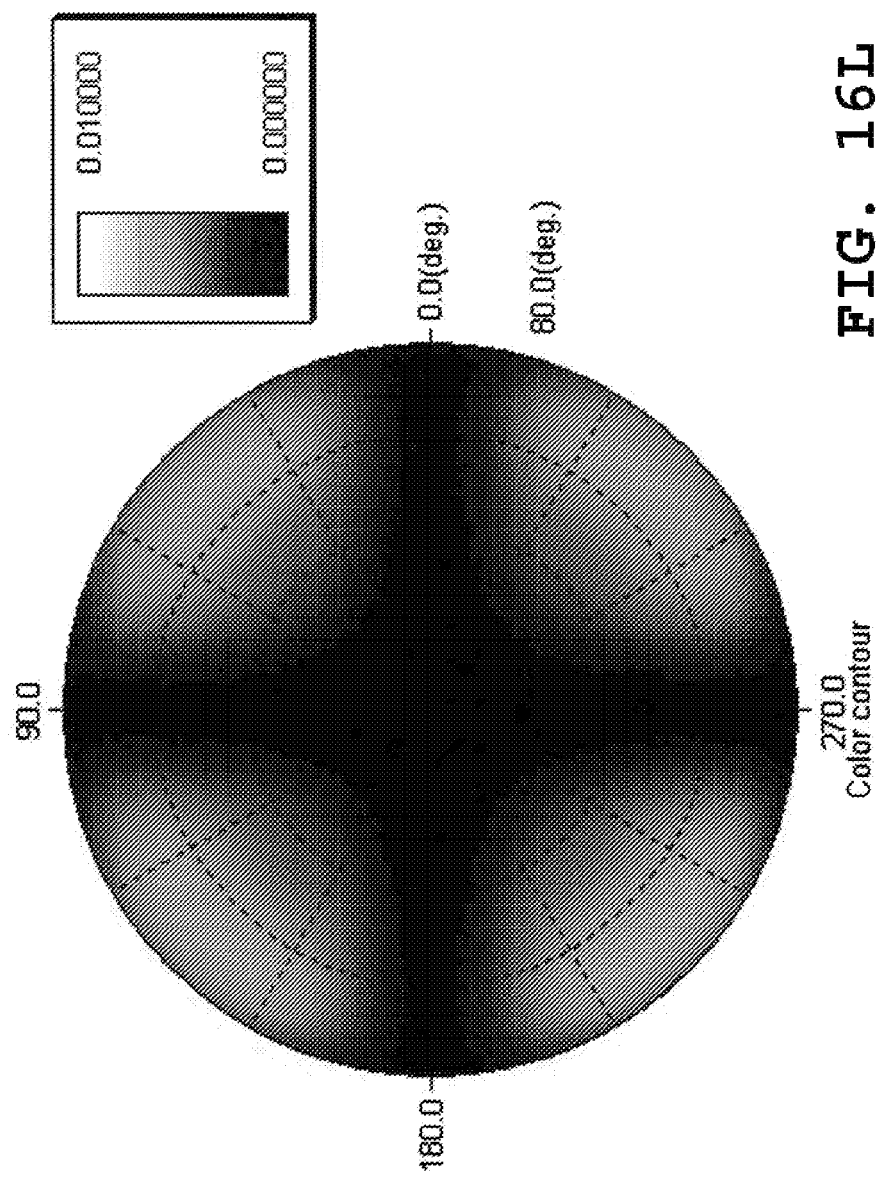
Figure 16M:
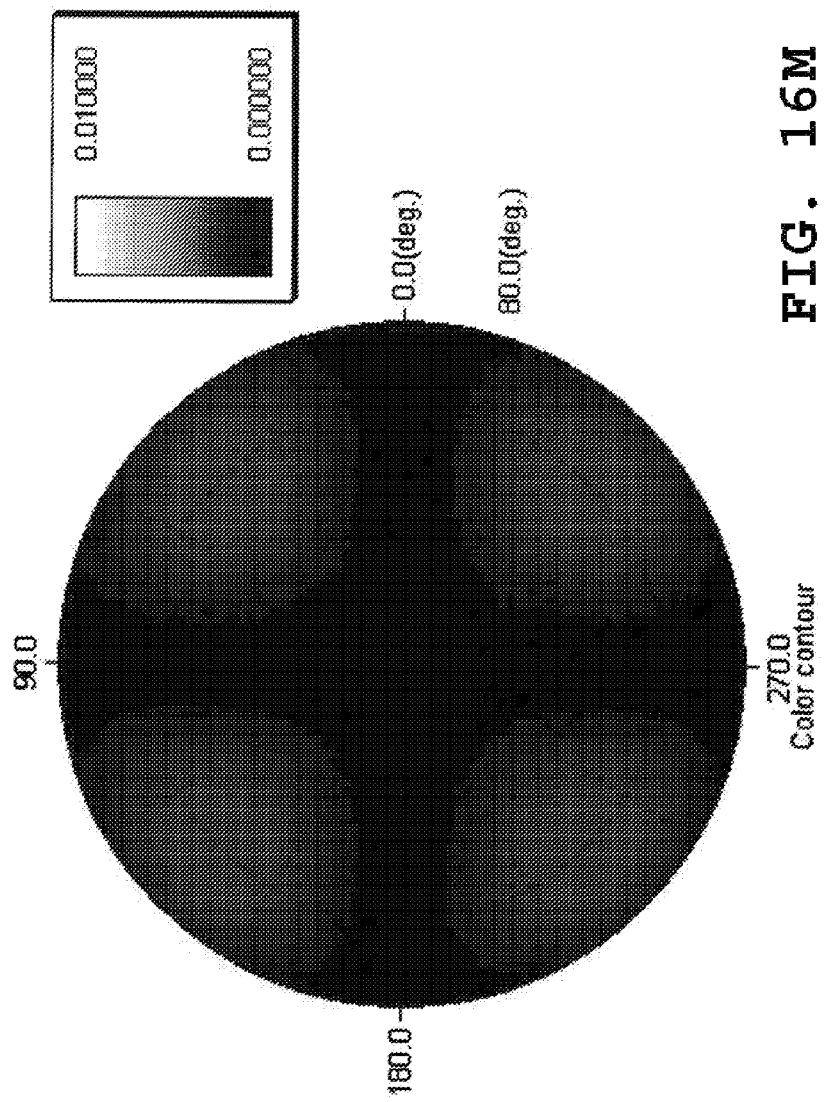
Figure 16N:
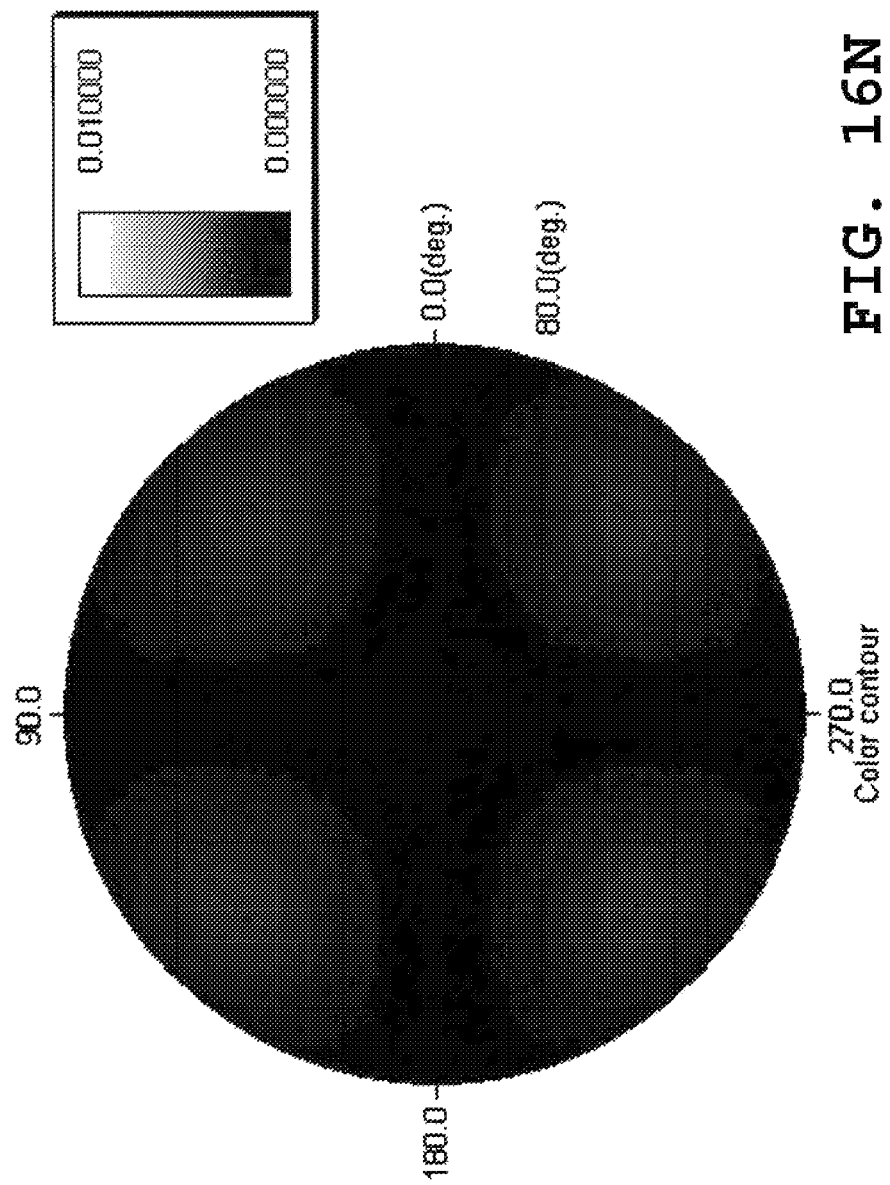
Figure 160:
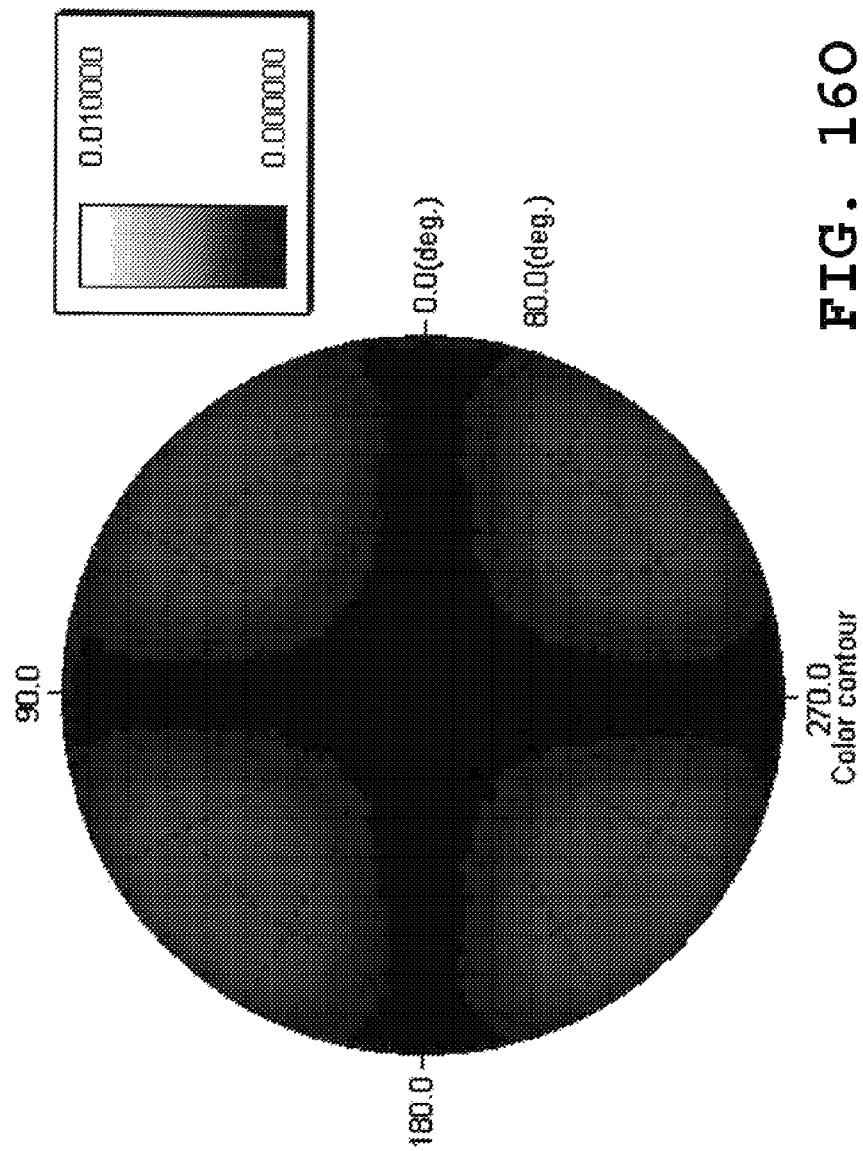
Figure 17A:
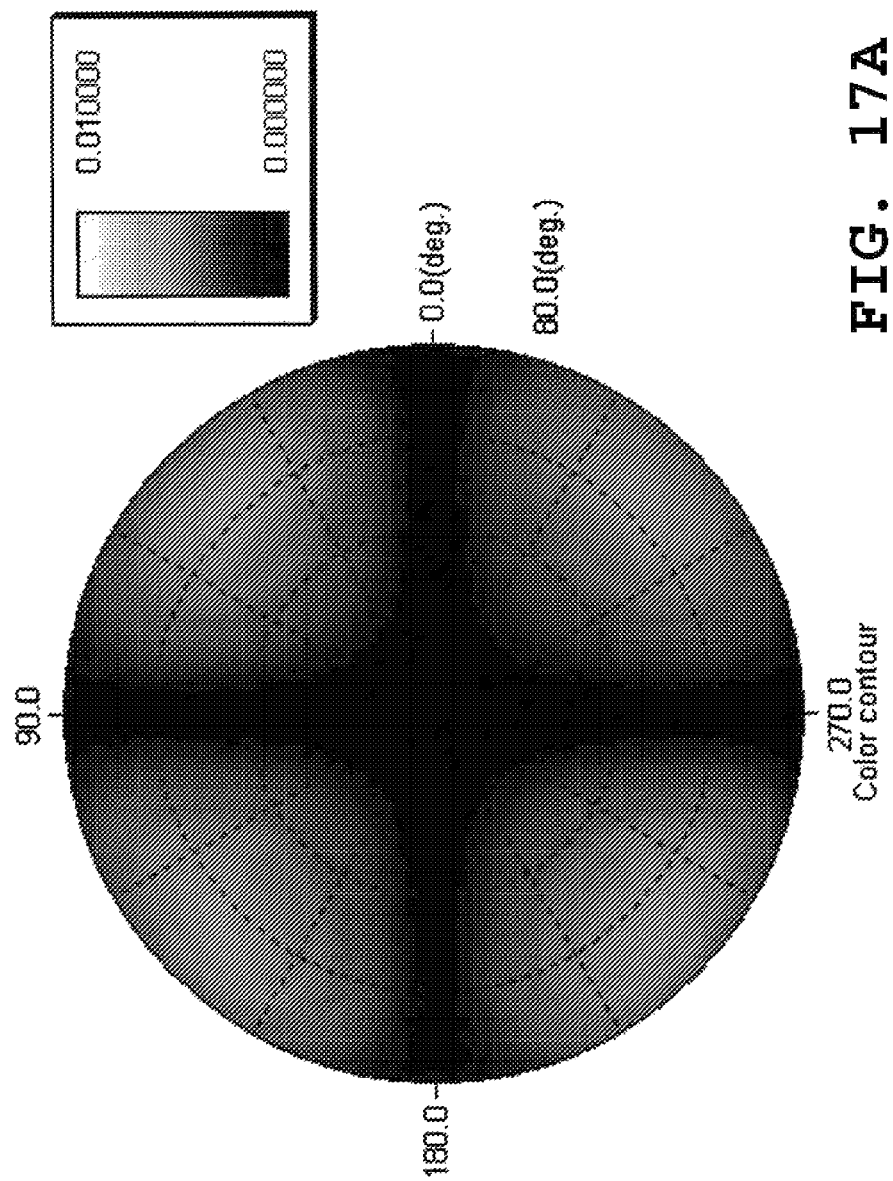
FIGS. 17A-17P are characteristic diagrams illustrating a hue in a polar angle direction in black display of each of liquid crystal display panels of experimental examples 1-33 to 1-48.
Figure 17B:
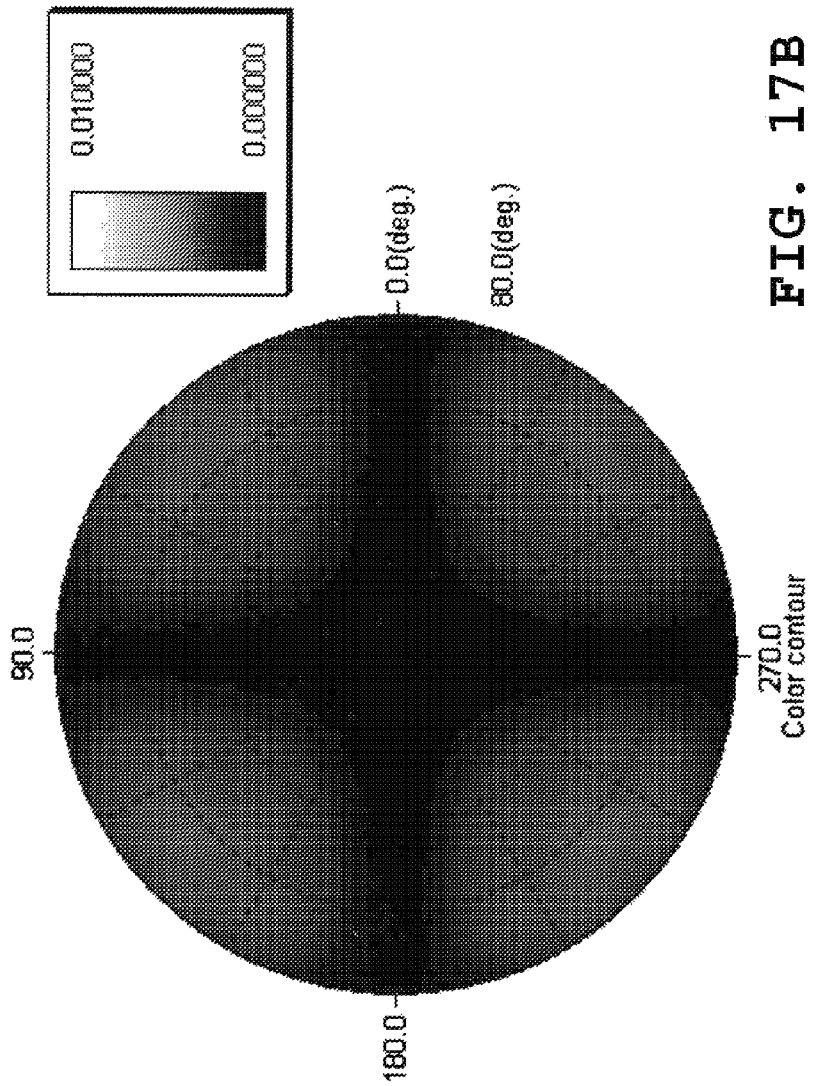
Figure 17C:
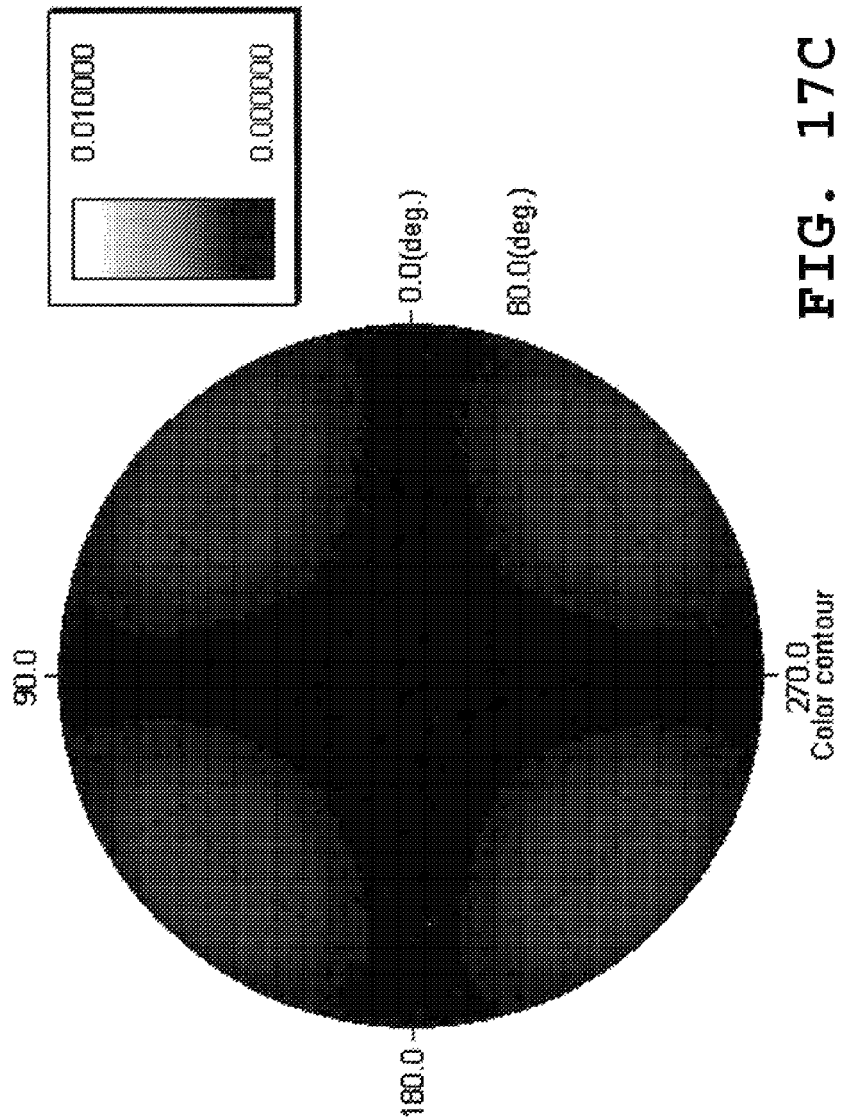
Figure 17D:
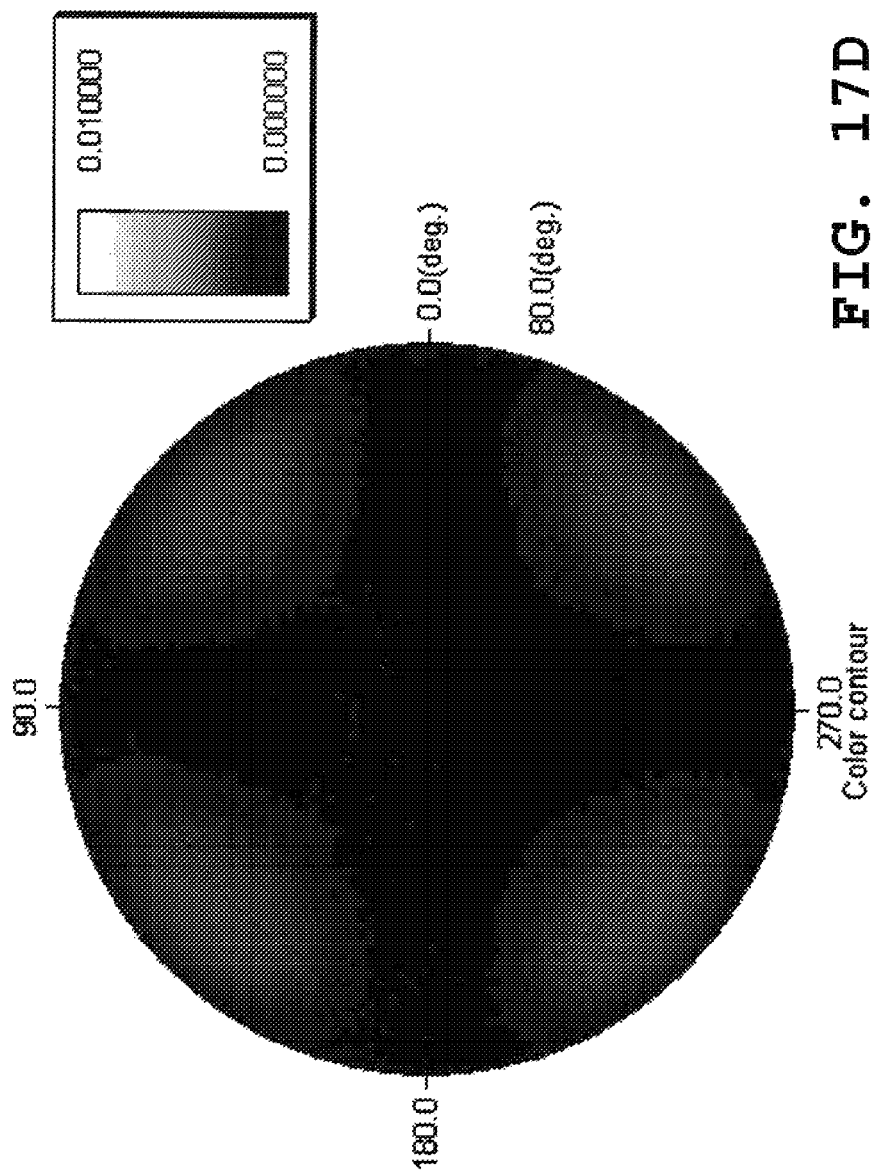
Figure 17E:
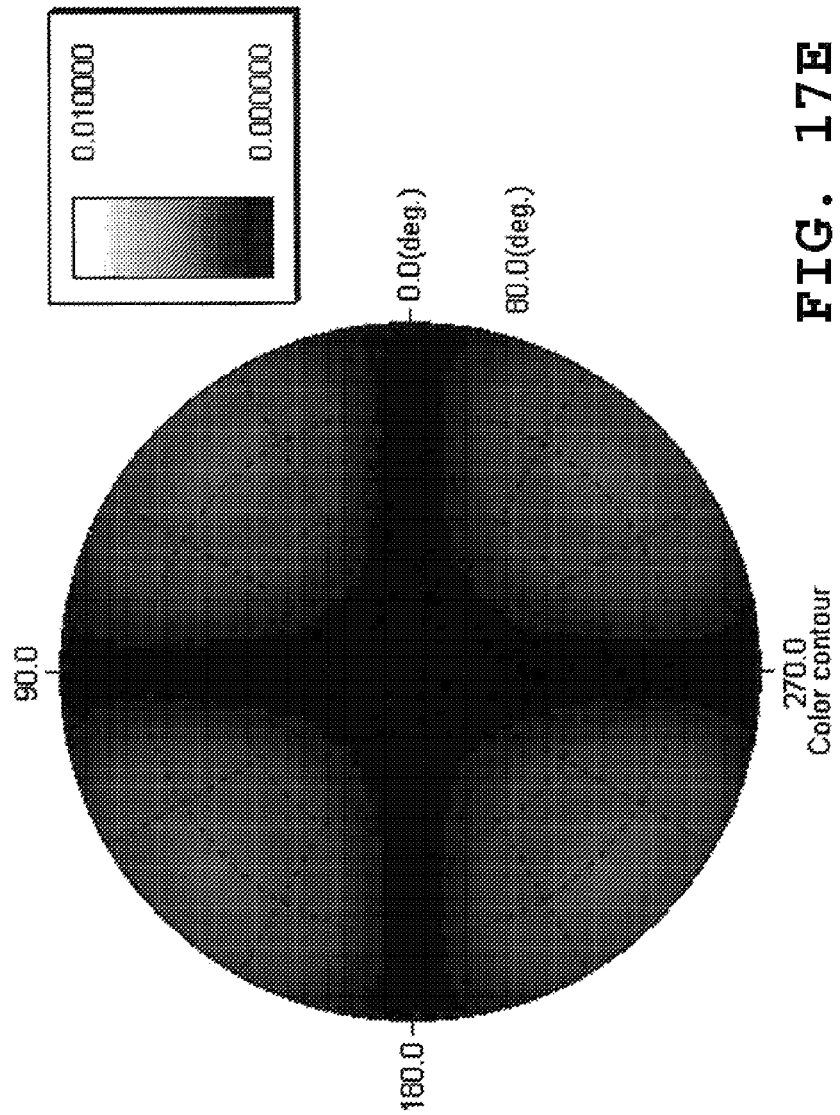
Figure 17F:
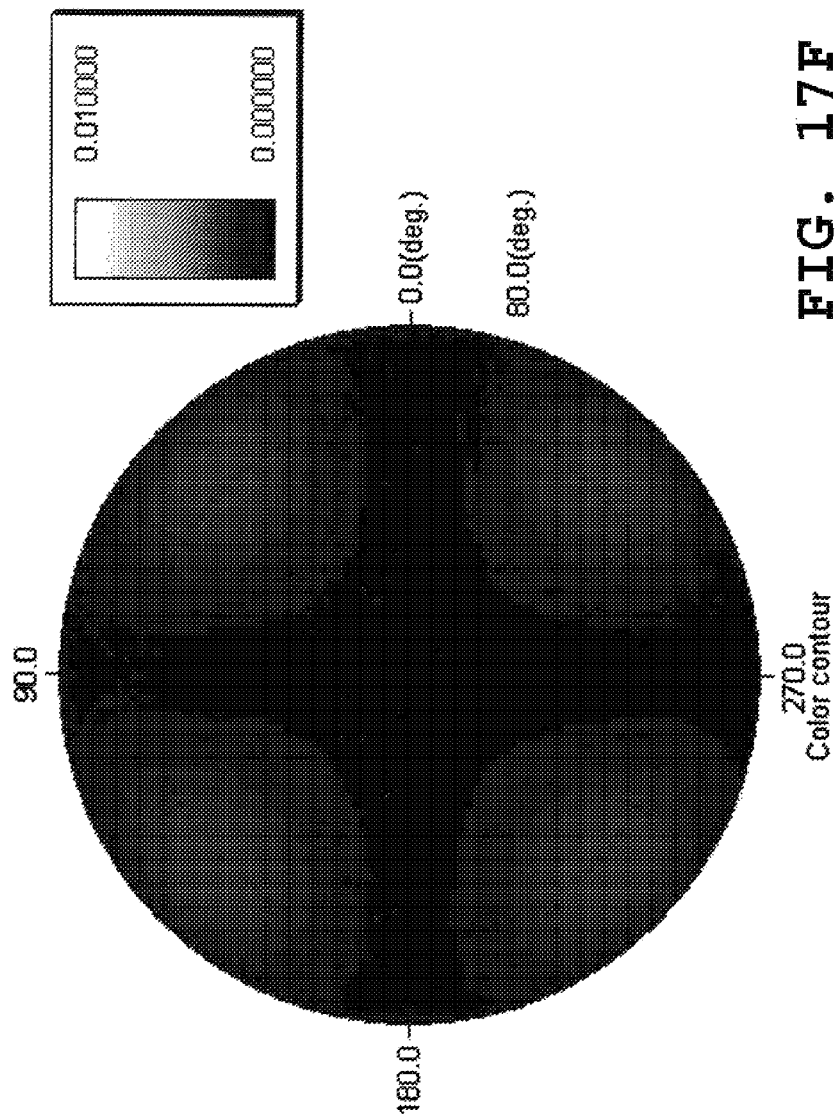
Figure 17G:
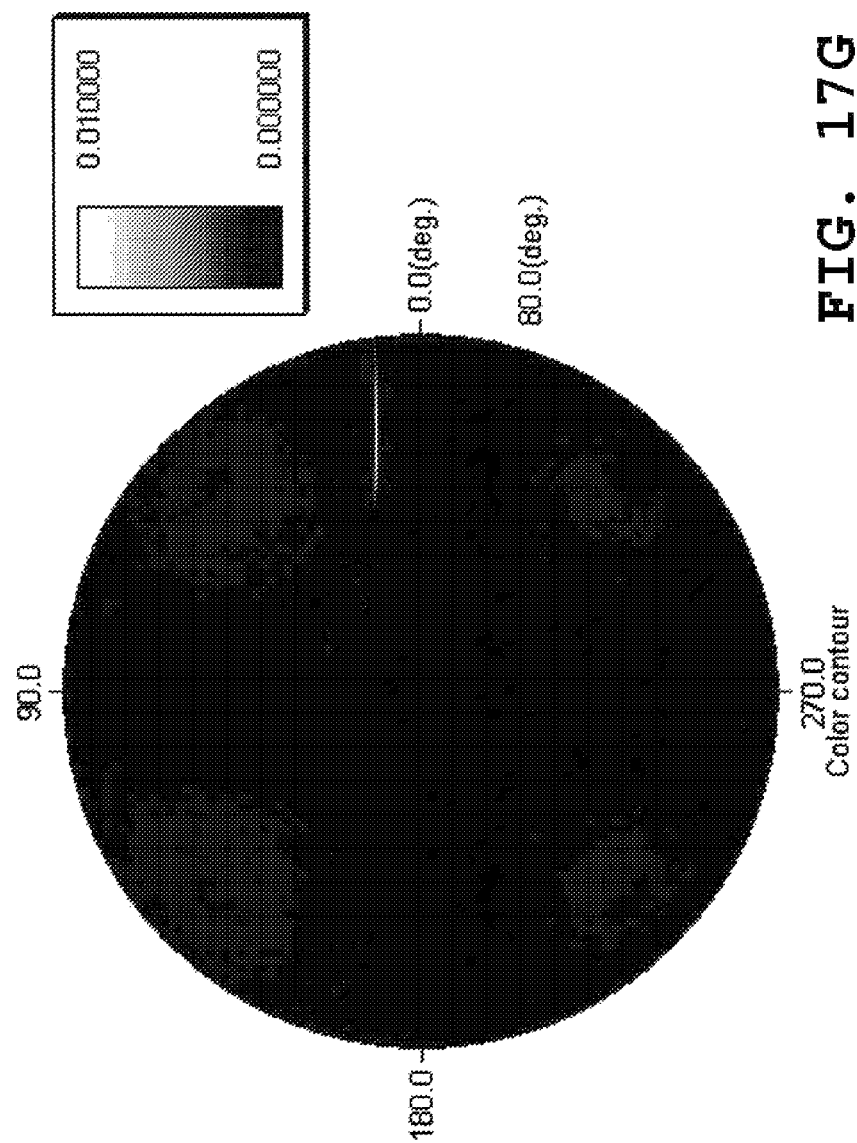
Figure 17I:
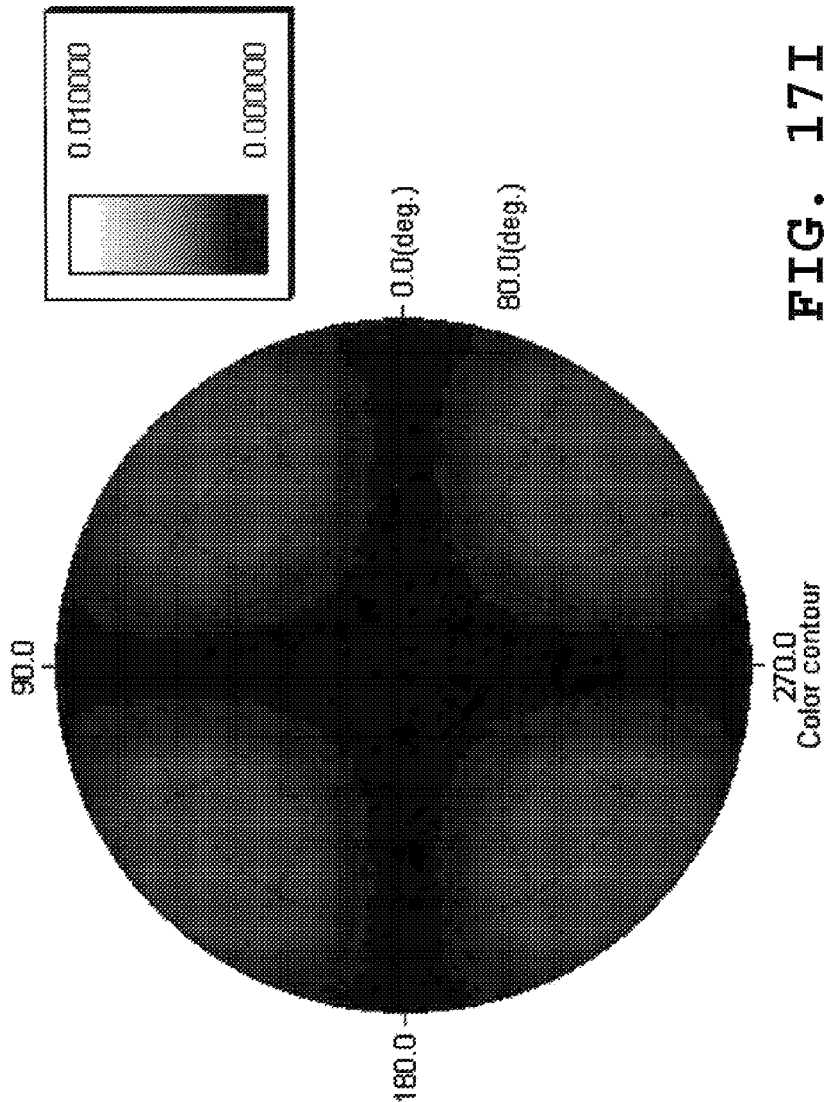
Figure 17K:
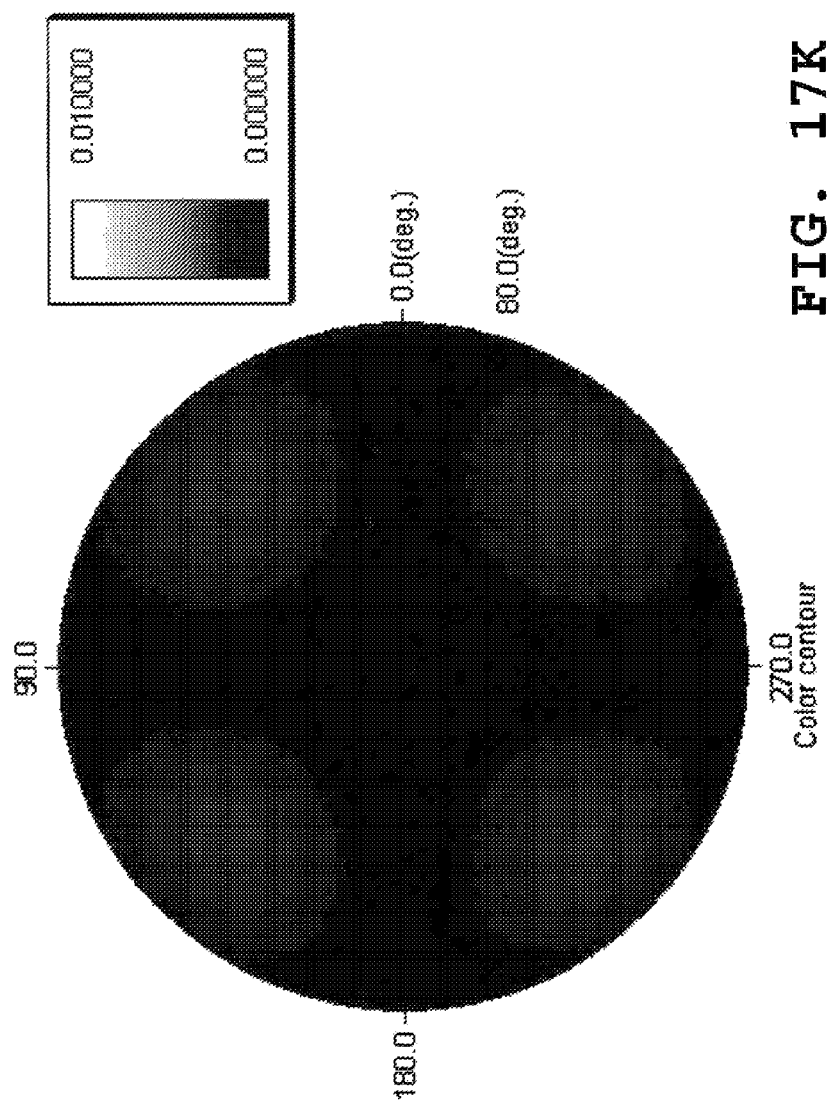
Figure 17L:
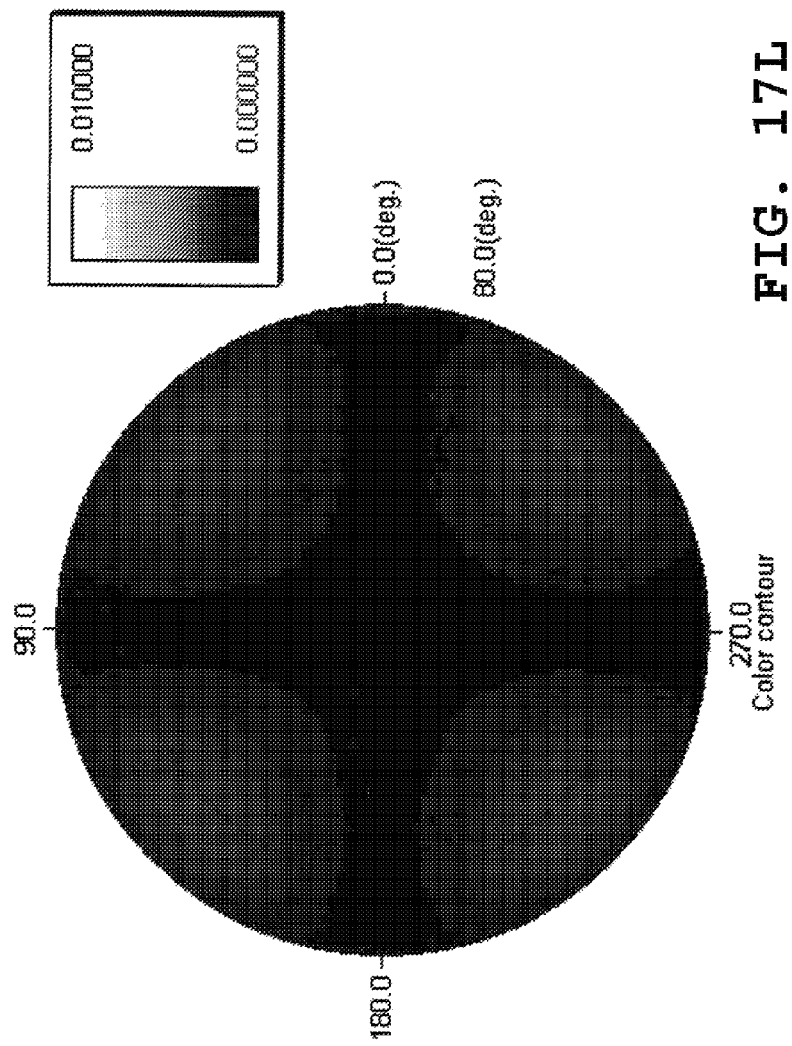
Figure 17M:
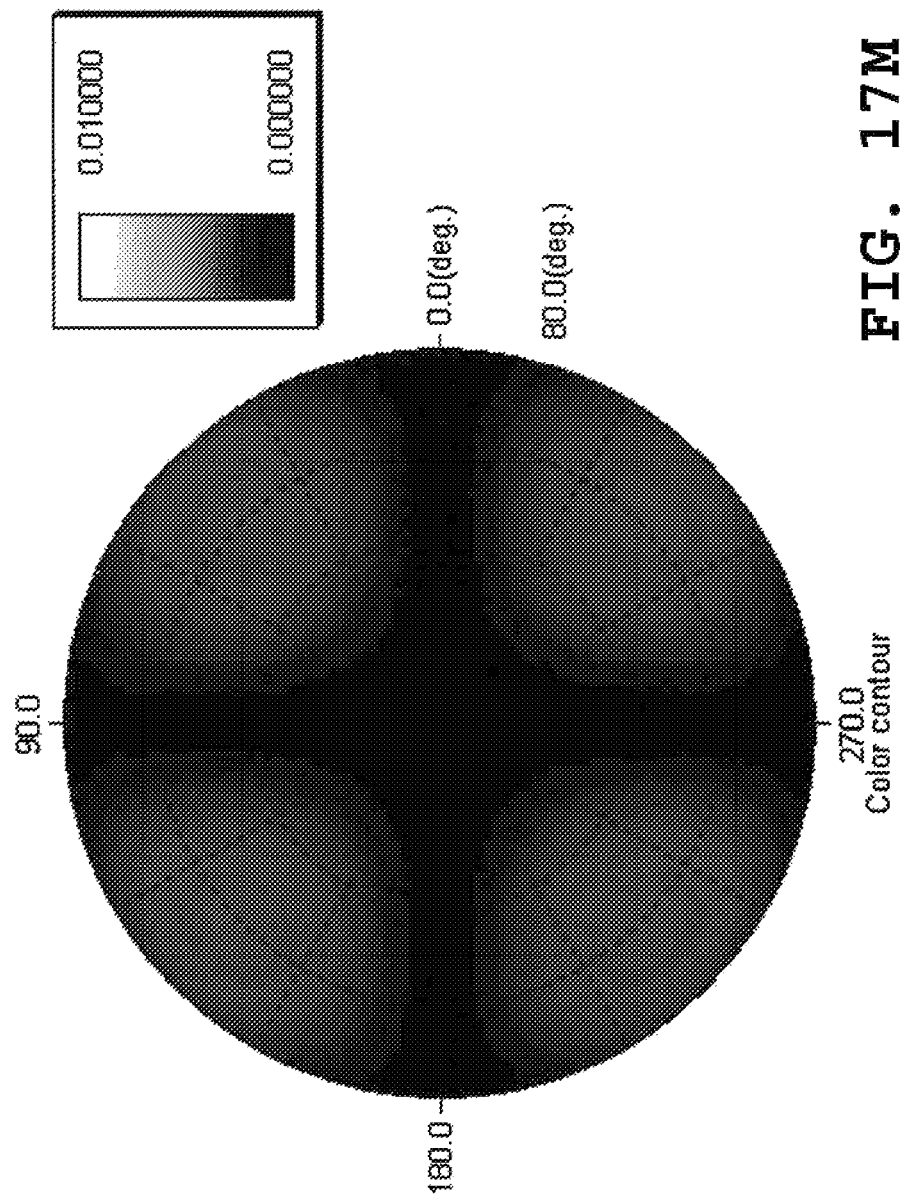
Figure 17N:
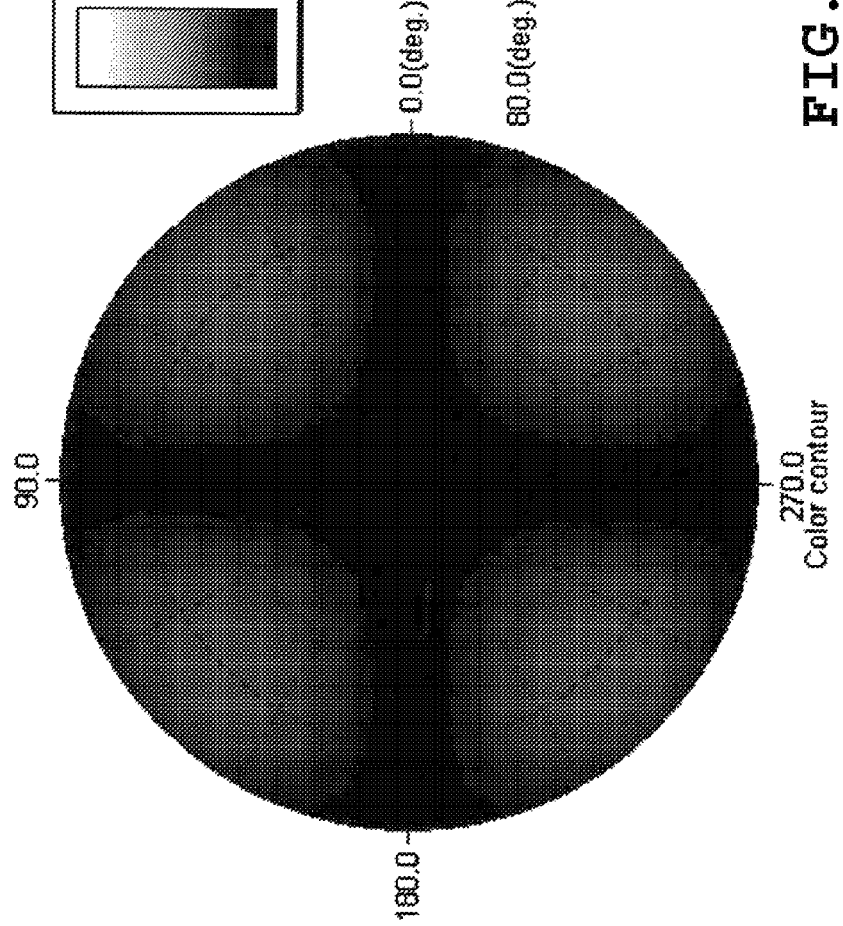
Figure 170:
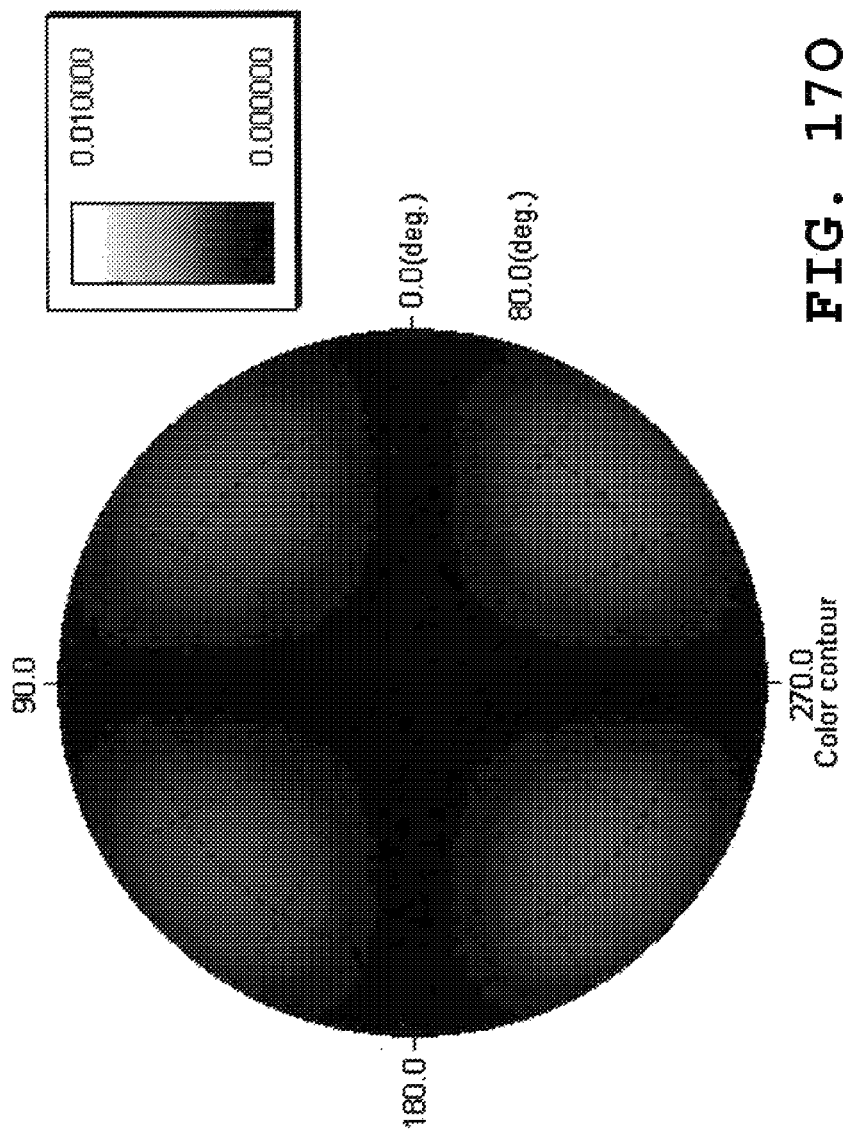
Figure 17P:
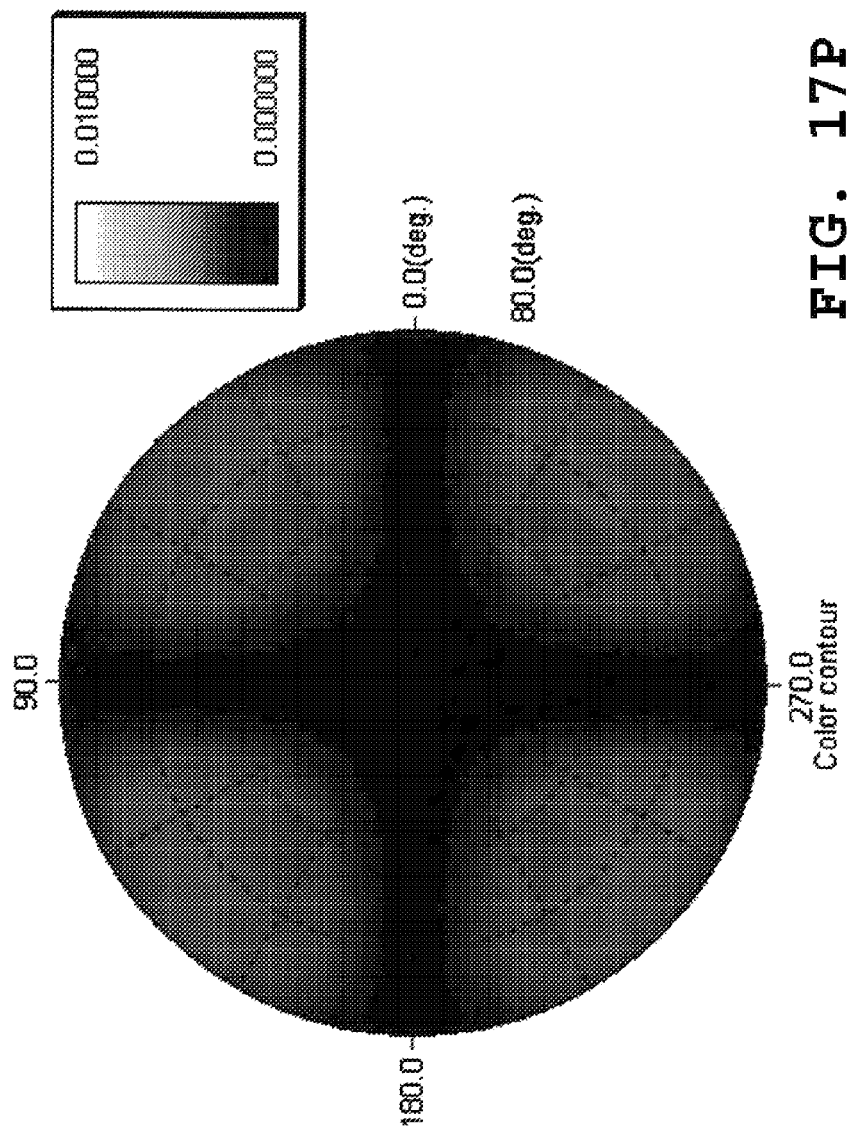

In the color correction filter 40 according to the modification, the unit coloring layer 42 has a rectangular shape, and the unit reflective layer 44 has a circular shape. However, each unit coloring layer 42 and unit reflective layer 44 may not necessarily have such a shape. For example, each unit coloring layer 42 and each unit reflective layer 44 may have the same shape, a circular shape, as illustrated in FIG. 12. Alternatively, each unit coloring layer 42 and each unit reflective layer 44 may have the same shape, a rectangular shape, as illustrated in FIG. 13. Furthermore, as illustrated in FIG. 14, each unit coloring layer 42 and each unit reflective layer 44 may have the rectangular shape and the circular shape, respectively, and the unit coloring layer 42 may be formed of a plurality of colored dots. In the unit coloring layer 42 illustrated in FIG. 14, dot density is high in the central portion 42A, and gradually decreased up to the periphery 42B, and shading distribution of coloring is thus expressed by dot density. Even in the color correction filter 40 having the unit coloring layers 42 and the unit reflective layers 44 as illustrated in each of FIGS. 12 to 14, the same advantages as in the above are obtained. It will be appreciated that each unit coloring layer 42 or each unit reflective layer 44 may have a linear shape, and the coloring layer 43 and the reflective layer 45 may have a shape in combination of the linear unit coloring layers 42 and unit reflective layers 44 as in the color correction filter 40 illustrated in each of FIGS. 7 to 9. Even in this case, the unit coloring layer 42 is colored dark in a laterally central portion of the linear shape, and is colored light in laterally edge portions.

EXAMPLES

Examples of the invention will be described in detail.

Experimental Examples 1-1 to 1-48

First, simulation was made on a view angle characteristic in black display of the liquid crystal display panel 10 mounted in the liquid crystal display device illustrated in FIG. 1. In this case, LCD MASTER manufactured by SHINTEC, Inc. was used as simulation software.

In simulation, phase difference $R_O$ in an in-plane direction and phase difference $R_{th}$ in a thickness direction of the phase difference layers 18A and 19A of the polarizing plate 18 and 19, and phase difference $\Delta nd$ at a wavelength 590 nm of the liquid crystal layer 14 including vertically-aligned liquid crystal were set as illustrated in Tables 1 and 2. In such setting, transmission axes of the polarizing plates 18 and 19 were assumed to be orthogonal to each other, and extend in a direction of an azimuth angle $\phi=0°$ (180° and in a direction of an azimuth angle 90° (270°). Based on the setting, hues seen in vertical and oblique directions were calculated on a display surface in black display. FIGS. 15A-15P, 16A-16P, and 17A-17P illustrate simulation results of liquid crystal display panels 10 of experimental examples 1-1 to 1-48. In the simulation results of the experimental examples in FIGS. 15A-15P, 16A-16P, and 17A-17P, an outer circumferential direction of a circle indicates an azimuth angle $\phi$, and a direction from the center of the circle to the outside indicates a polar angle $\theta$ (center of the circle: polar angle $\theta=0°$ (vertical direction), and outer circumference of the circle: polar angle $\theta=80°$).

TABLE 1

| 590 nm | Liquid crystal layer $\Delta nd$ (nm) | Phase difference layer | | Range of valley wavelength of leakage light (nm) |
|---|---|---|---|---|
| | | $R_{th}$ (nm) | $R_O$ (nm) | |
| Example 1-1 | 0.28 | 110 | 40 | 500 to 550 |
| Example 1-2 | | | 50 | 560 to 610 |
| Example 1-3 | | | 60 | 560 to 610 |
| Example 1-4 | | | 70 | 575 to 625 |
| Example 1-5 | | 120 | 40 | 500 to 550 |
| Example 1-6 | | | 50 | 500 to 550 |
| Example 1-7 | | | 60 | 575 to 625 |
| Example 1-8 | | | 70 | 575 to 625 |
| Example 1-9 | | 130 | 40 | 475 to 525 |
| Example 1-10 | | | 50 | 475 to 525 |
| Example 1-11 | | | 60 | 500 to 550 |

TABLE 1-continued

| 590 nm | Liquid crystal layer $\Delta nd$ (nm) | Phase difference layer | | Range of valley wavelength of leakage light (nm) |
|---|---|---|---|---|
| | | $R_{th}$ (nm) | $R_O$ (nm) | |
| Example 1-12 | | | 70 | 575 to 625 |
| Example 1-13 | | 140 | 40 | 450 to 500 |
| Example 1-14 | | | 50 | 450 to 500 |
| Example 1-15 | | | 60 | 475 to 525 |
| Example 1-16 | | | 70 | 560 to 610 |
| Example 1-17 | 0.30 | 110 | 40 | 575 to 625 |
| Example 1-18 | | | 50 | 575 to 625 |
| Example 1-19 | | | 60 | 575 to 625 |
| Example 1-20 | | | 70 | 575 to 625 |
| Example 1-21 | | 120 | 40 | 500 to 550 |
| Example 1-22 | | | 50 | 560 to 610 |
| Example 1-23 | | | 60 | 560 to 610 |
| Example 1-24 | | | 70 | 575 to 625 |
| Example 1-25 | | 130 | 40 | 500 to 550 |
| Example 1-26 | | | 50 | 500 to 550 |
| Example 1-27 | | | 60 | 575 to 625 |
| Example 1-28 | | | 70 | 575 to 625 |
| Example 1-29 | | 140 | 40 | 475 to 525 |
| Example 1-30 | | | 50 | 475 to 525 |

TABLE 2

| 590 nm | Liquid crystal layer $\Delta nd$ (nm) | Phase difference layer | | Range of valley wavelength of leakage light (nm) |
|---|---|---|---|---|
| | | $R_{th}$ (nm) | $R_O$ (nm) | |
| Example 1-31 | 0.30 | 140 | 60 | 560 to 610 |
| Example 1-32 | | | 70 | 575 to 625 |
| Example 1-33 | 0.32 | 110 | 40 | 575 to 625 |
| Example 1-34 | | | 50 | 575 to 625 |
| Example 1-35 | | | 60 | 575 to 625 |
| Example 1-36 | | | 70 | 575 to 625 |
| Example 1-37 | | 120 | 40 | 575 to 625 |
| Example 1-38 | | | 50 | 575 to 625 |
| Example 1-39 | | | 60 | 575 to 625 |
| Example 1-40 | | | 70 | 575 to 625 |
| Example 1-41 | | 130 | 40 | 500 to 550 |
| Example 1-42 | | | 50 | 560 to 610 |
| Example 1-43 | | | 60 | 575 to 625 |
| Example 1-44 | | | 70 | 575 to 625 |
| Example 1-45 | | 140 | 40 | 500 to 550 |
| Example 1-46 | | | 50 | 500 to 550 |
| Example 1-47 | | | 60 | 575 to 625 |
| Example 1-48 | | | 70 | 575 to 625 |

Next, the liquid crystal display panels 10 of the experimental examples 1-1 to 1-48 were produced. Specifically, first, pixel electrodes 12 were formed in a matrix pattern on a surface of the TFT substrate 11, and the RGB color filters 16R, 16G and 16B were patterned on a surface of the counter substrate 15, and then the counter electrodes 17 were formed. Then, a vertical alignment agent was coated so as to cover respective surfaces of the pixel electrodes 12 and the counter electrodes 17, so that alignment films 13A and 13B were formed, respectively.

Next, spacers for ensuring a cell gap, for example, plastic beads were dispersed onto a surface having the alignment film 13A formed thereon of the TFT substrate 11, and the seal portion was printed with an epoxy adhesive or the like by a screen printing method onto the surface of the TFT substrate 11. Then, the TFT substrate 11 and the counter substrate 15 were attached to each other with the spacers and the seal portion in between so that the alignment films 13A and 13B were opposed to each other, and a liquid crystal material including vertically-aligned liquid crystal was injected. Phase difference $\Delta nd$ at a wavelength 590 nm of the liquid crystal layer 14 in each experimental example was adjusted to be a value as illustrated in Tables 1 and 2 by adjusting thickness of the liquid crystal layer 14. Then, the seal portion was heated to be cured, thereby the liquid crystal layer 14 was enclosed between the TFT substrate 11 and the counter substrate 15. Finally, the polarizing plate 18 having the phase difference layer 18A and the polarization layer 18B and the polarizing plate 19 having the phase difference layer 19A and the polarization layer 19B were attached to a bottom of the TFT substrate 11 and a top of the counter substrate 15, respectively. Phase difference ($R_0$ and $R_{th}$) of the phase difference layers 18A and 19A in each experimental example was adjusted to be a value as illustrated in Tables 1 and 2 by selecting the polarizing plate 18 and 19 to be used. Thus, the liquid crystal display panels 10 were completed.

Figure 18A:
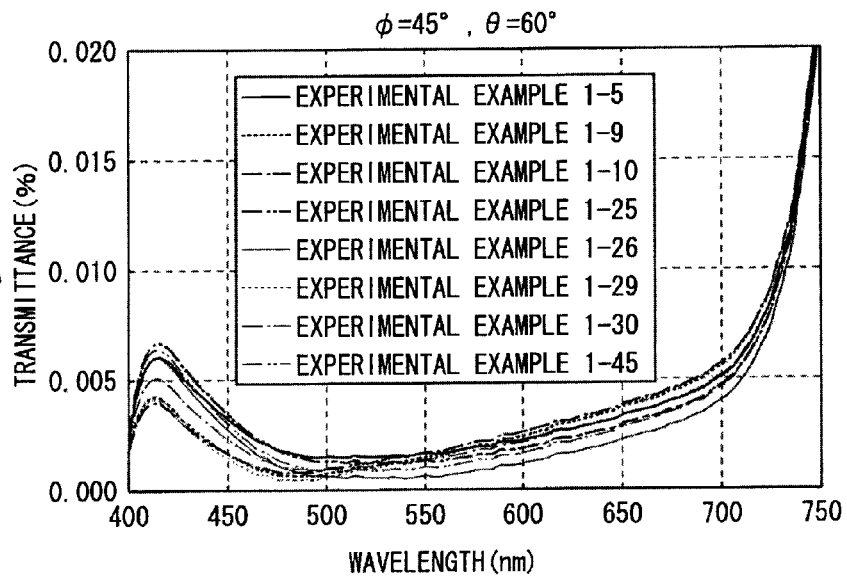
FIGS. 18A and 18B are characteristic diagrams illustrating transmission spectra in black display of liquid crystal display panels of experimental examples 1-5, 1-6, 1-9, 1-10, 1-25, 1-26, 1-29, 1-30 and 1-45.
Figure 18B:
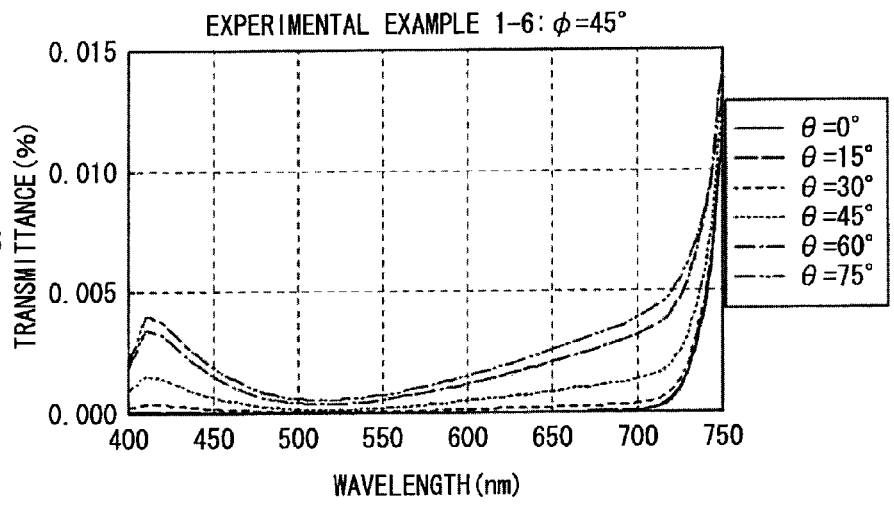
Figure 19:
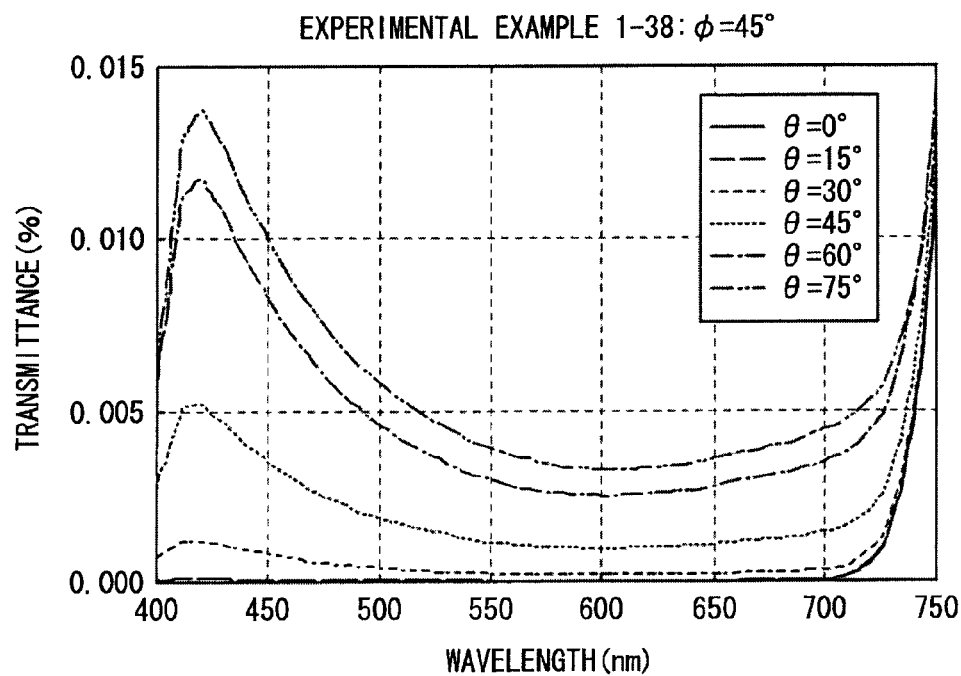
FIG. 19 is a characteristic diagram illustrating transmission spectra in black display of a liquid crystal display panel of experimental example 1-38.

The liquid crystal display panels 10 of the experimental examples 1-1 to 1-48 produced in this way were subjected to measurement of transmission spectra in a black display mode in order to examine a range of a valley wavelength of leakage light leaking in an oblique direction. As a result, results as illustrated in Tables 1 and 2 were obtained. FIGS. 18A and 18B and FIG. 19 illustrate spectra of leakage light in black display of experimental examples 1-5, 1-6, 1-9, 1-10, 1-25, 1-26, 1-29, 1-30, 1-38 and 1-45 on behalf of the experimental examples 1-1 to 1-48. FIG. 18A illustrates a transmission spectrum at an azimuth angle $\phi=45°$ and a polar angle $\theta=60°$ of each of the liquid crystal display panels 10 in a black display mode of the experimental examples 1-5, 1-9, 1-10, 1-25, 1-26, 1-29, 1-30 and 1-45. FIG. 18B illustrates transmission spectra at an azimuth angle $\phi=45°$ and a polar angle $\theta=0°$, 15°, 30°, 45°, 60° or 75° of the liquid crystal display panel 10 in a black display mode of the experimental example 1-6. FIG. 19 illustrates transmission spectra at an azimuth angle $\phi=45°$ and a polar angle $\theta=0°$, 15°, 30°, 45°, 60° or 75° of the liquid crystal display panel 10 in a black display mode of the experimental example 1-38.

As illustrated in Tables 1 and 2 and FIGS. 18A and 18B, it was known that leakage light leaking in an oblique direction had a valley wavelength in a wavelength range from 450 nm to 550 nm both inclusive in the experimental examples 1-1, 1-5, 1-6, 1-9 to 1-11, 1-13 to 1-15, 1-21, 1-25, 1-26, 1-29, 1-30, 1-41, 1-45 and 1-46. In the experimental examples 1-1 and the like, simulation results of FIGS. 15A-15P, 16A-16P, and 17A-17P suggested that leakage light in a black display mode had a reddish or yellowish hue. In contrast, in the experimental examples 1-2 and the like, results of FIGS. 15A-15P, 16A-16P, 17A-17P, and 19 suggested that leakage light leaking in an oblique direction in a black display mode had a valley wavelength in a wavelength range longer than 550 nm, and thus had a violet-base or blue-base hue. In this case, the quantity of leakage light was likely to be small in the experimental examples 1-1 and the like having the valley wavelength in the wavelength range from 450 nm to 550 nm both inclusive compared with the experimental examples 1-2 and the like having the valley wavelength in the wavelength range longer than 550 nm. From this, it was confirmed that in the case of the liquid crystal display panel 10, leakage light leaking in an oblique direction had a hue having a local minimum value in the wavelength range from 450 nm to 550 nm both inclusive in a black display mode, thereby light leakage was controlled to be low.

Experimental Example 2-1

The liquid crystal display device as illustrated in FIG. 1 was produced.

Figure 20:
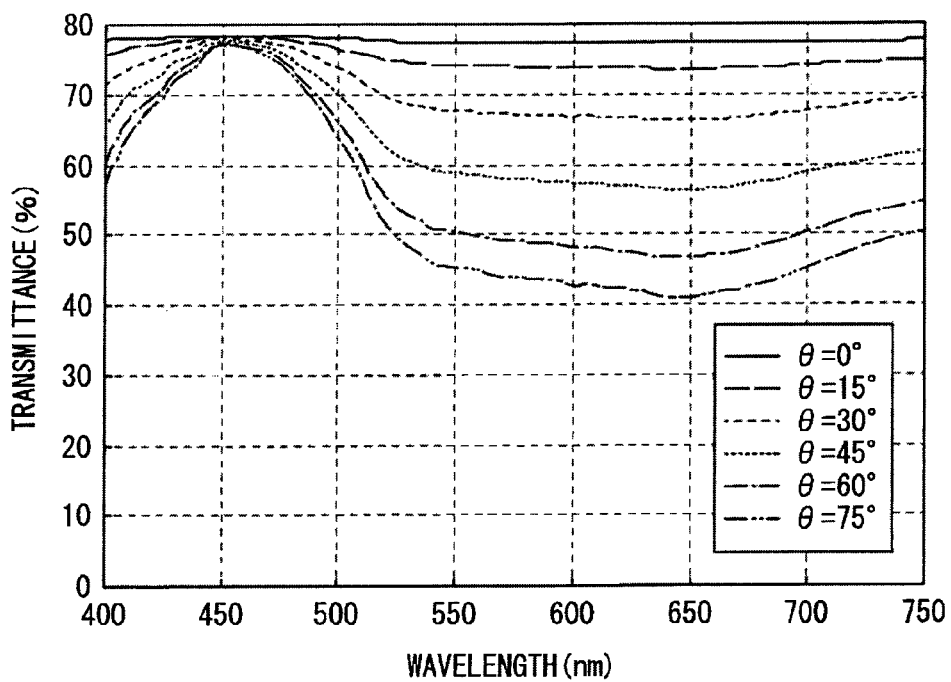
FIG. 20 is a characteristic diagram illustrating transmission spectra of a color correction filter of experimental example 2-1.

First, a light diffusion layer was formed on a quarter-wavelength film to be the quarter-wavelength layer 31B, and then the cholesteric liquid crystal polymer layer 31A was formed, so that the color correction filter 30 was produced. The color correction filter 30 was irradiated with white light from a side of the cholesteric liquid crystal polymer layer 31A so that a spectrum of transmitted light outputted from a side of the quarter-wavelength layer 31B was measured. As a result, a result as illustrated in FIG. 20 was obtained. FIG. 20 illustrates each transmission spectrum in a direction of a polar angle $\theta=0°$, 15°, 30°, 45°, 60° or 75° of the color correction filter 30. From the result of FIG. 20, it was known that in the case of the color correction filter 30, light transmitted in a vertical direction ($\theta=0°$) had the same hue as that of white light, and light transmitted in an oblique direction (for example, $\theta=15°$ to 75°) had a peak wavelength of transmittance in a wavelength range from 400 nm to less than 550 nm. Furthermore, it was known that light transmitted in the oblique direction had a blue hue, and was deeper in blue with increase in polar angle $\theta$.

Next, the color correction filter 30 having a hue change characteristic as illustrated in FIG. 20 was disposed between the liquid crystal display panel 10 and the backlight unit 20 such that a surface on a quarter-wavelength layer 31B side of the color correction filter 30 faced the liquid crystal display panel 10 side. A liquid crystal display panel 10 of the experimental example 1-6 was used as the liquid crystal display panel 10. Thus, the liquid crystal display panel 10 illustrated in FIG. 1 was completed.

Experimental Example 2-2

The same procedure as in the experimental example 2-1 was taken except that the color correction filter 30 was not used.

Experimental Example 2-3

The same procedure as in the experimental example 2-1 was taken except that a liquid crystal display panel 10 of the experimental example 1-38 was used as the liquid crystal display panel 10 in place of the liquid crystal display panel 10 of the experimental example 1-6.

Experimental Example 2-4

The same procedure as in the experimental example 2-3 was taken except that the color correction filter 30 was not used.

Figure 21A:
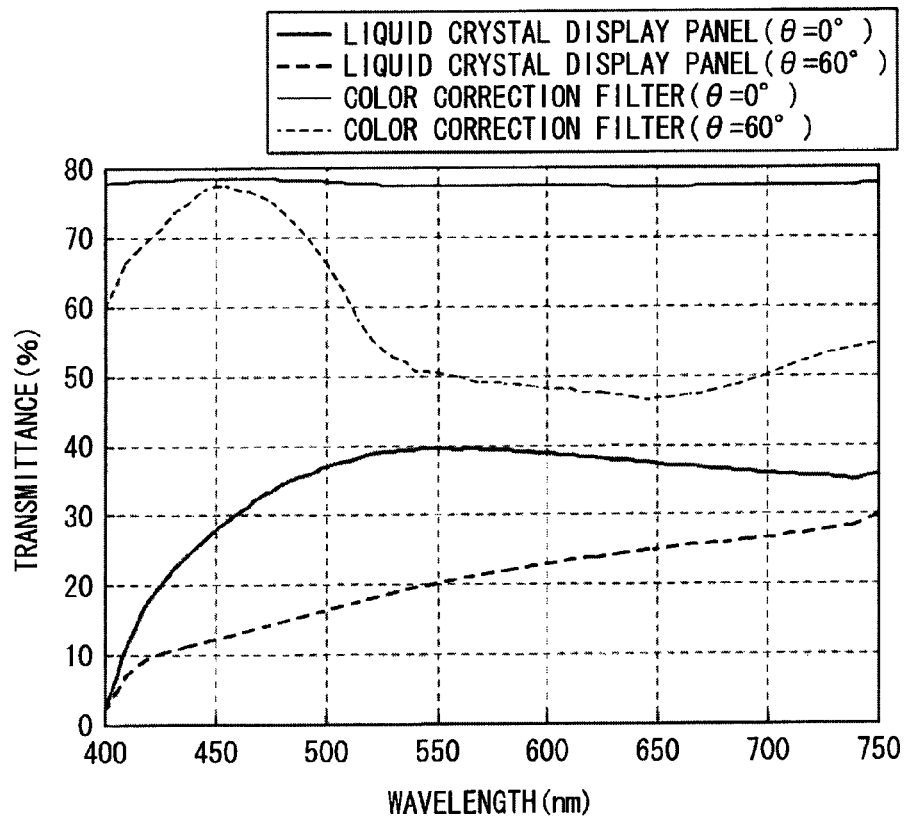
FIGS. 21A and 21B are characteristic diagrams illustrating a relationship of change in hue to a polar direction in white display of a liquid crystal display device of the experimental example 2-1.
Figure 21B:
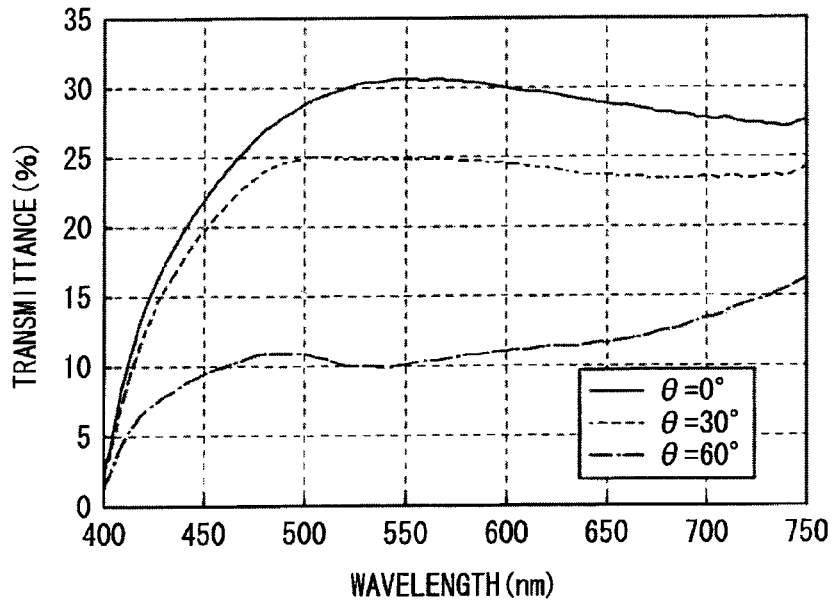
Figure 22:
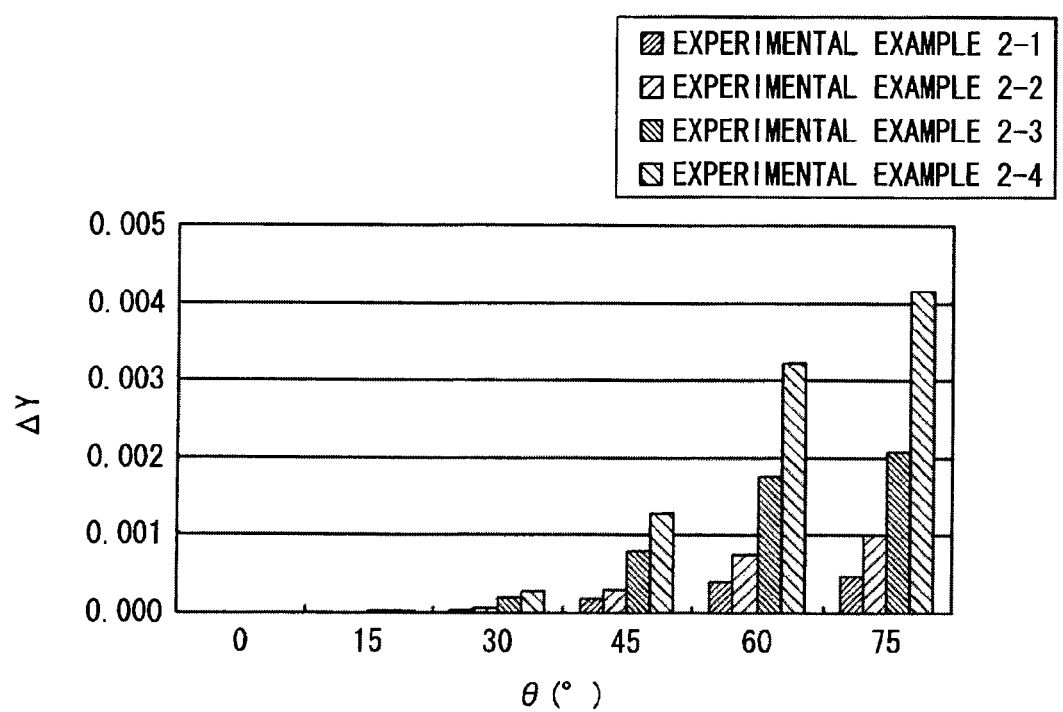
FIG. 22 is a characteristic diagram illustrating a correlation of luminance in a polar direction to luminance in a vertical direction to a display surface in black display of each of liquid crystal display devices of experimental examples 2-1 to 2-4.

Among the liquid crystal display devices of the experimental examples 2-1 to 2-4, the liquid crystal display device of the experimental example 2-1 was examined in angle dependence of a hue in the case of white display. As a result, results as illustrated in FIGS. 21A and 21B were obtained. In addition, the liquid crystal display devices of the experimental examples 2-1 to 2-4 were examined in angle dependence of light leakage in the case of black display. As a result, a result as illustrated in FIG. 22 was obtained. Furthermore, the liquid crystal display devices of the experimental examples 2-1 and 2-2 were measured in front luminance to obtain a rate of increase in luminance of the experimental example 2-1 to the experimental example 2-2.

In the case of examining angle dependence of a hue in white display, measurement was made on a spectrum in a vertical direction (polar angle $\theta=0°$) to a display surface, and on a spectrum at a polar angle $\theta=30°$ (not illustrated in FIG. 21A) or $\theta=60°$ at an azimuth angle $\phi=45°$. FIG. 21A illustrates transmission spectra of a single color correction filter 30 and transmission spectra of a single liquid crystal display panel 10, and FIG. 21B illustrates spectra on a display surface of the liquid crystal display device.

In the case of examining angle dependence of light leakage in black display, measurement was made on the amount of light leakage (front luminance) in a vertical direction (polar angle θ=0°) to a display surface, and on the amount of light leakage (luminance in an oblique direction) at a polar angle θ=15°, 30°, 45°, 60° or 75° at an azimuth angle φ=45°. From such light leakage amount, variation in light leakage ΔY (cd/m$^2$)=(luminance in an oblique direction-front luminance) was calculated.

As illustrated in FIGS. 21A and 21B, in the experimental example 2-1 where the color correction filter 30 was provided between the liquid crystal display panel 10 and the backlight unit 20, approximately constant transmittance was given in a range of 500 nm to 750 nm both inclusive at the polar angle θ=0°, 30° or 60° in white display. That is, in the case of the liquid crystal display device illustrated in FIG. 1, it was confirmed that change in hue depending on viewing angles in white display was able to be suppressed by using the color correction filter 30.

As illustrated in FIG. 22, in the experimental example 2-1 using a combination of the liquid crystal display panel 10 of the experimental example 1-6 and the color correction filter 30, variation in light leakage ΔY in each polar angle direction was small in black display compared with the experimental examples 2-2 to 2-4 without using the combination. That is, the result of FIG. 22 illustrates the following. A spectrum of leakage light in an oblique direction in a black display mode of a single liquid crystal display panel 10 has a valley wavelength in a range of 450 nm to 550 nm both inclusive. Thus, the amount of light leakage is reduced compared with a case where a spectrum of the leakage light has a valley wavelength in a range longer than 550 nm. In this case, when the color correction filter 30 is used, the amount of light leakage is reduced independently of a position of a valley wavelength of leakage light in black display. However, the amount of light leakage in black display is particularly reduced by using a liquid crystal display panel 10 in which a valley wavelength of leakage light is in the wavelength range from 450 nm to 550 nm both inclusive.

Furthermore, luminance was increased about 30% in the experimental example 2-1 compared with in the experimental example 2-2. The result shows that the color correction filter 30 acts as a reflection polarizer.

From these, the following was confirmed in the VA-mode liquid crystal display device. The liquid crystal display panel 10, in which leakage light in black display has a hue having a local minimum value in the wavelength range from 450 nm to 550 nm both inclusive, is combined with the color correction filter 30, in which oblique light emitted in an oblique direction has a hue having a local maximum value in the wavelength range from 400 nm to less than 550 nm. Thus, change in hue depending on viewing angles is suppressed, and light leakage in black display is suppressed, and consequently a wide view angle may be achieved. In this case, in particular, the color correction filter 30 acting as a reflection polarizer is used, so that use efficiency of light may be improved by recycle of light from the light source 21.

While the invention has been described with the embodiments, the modification, and the examples hereinbefore, the invention is not limited to the embodiments and the like, and variously modified or altered. For example, another filter may be used in place of the above-described color correction filter. Another filter includes a filter which is formed by using substantially rod-like dichromatic dye, a liquid-crystalline substance such as polymeric liquid crystal or liquid crystal molecules, and ultraviolet curing resin so that major axis directions of the dichromatic dye are arranged (aligned) at a predetermined angle to a substrate surface of a liquid crystal display panel.

In addition, while the embodiments and the like have been described with the VA-mode liquid crystal display device, as an example, having a liquid crystal layer using vertically-aligned liquid crystal, the invention is not limited to this, and the invention may be applied to another mode, for example, a TN mode, an IPS mode, or an OCB mode. Even in this case, the advantages of the invention may be obtained.

In addition, while the embodiments have been described with a configuration of a full-color-display liquid crystal display device, as an example, in which color filters of RGB three colors are provided, and each pixel is allocated for each corresponding color filter layer, the invention is not limited to this. For example, the invention may be applied to a configuration having no color filter, for example, a monochromatic-display liquid crystal display device. Even in this case, the advantages of the invention may be obtained.

The present application contains subject matter related to that disclosed in Japanese Priority Patent Application JP 2009-116863 filed in the Japan Patent Office on May 13, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalent thereof.

What is claimed is:

1. A liquid crystal display device comprising:
   a light source;
   a liquid crystal display panel for modulating light from the light source for picture display, the liquid crystal display panel having a liquid crystal layer and a pair of polarizing plates; and
   an optical filter provided between the light source and the liquid crystal display panel and configured to change a hue of light entering the liquid crystal display panel in an oblique direction to a display surface to compensate a hue change in the liquid crystal display panel,
   wherein the liquid crystal display panel is configured such that, when the liquid crystal display panel is in a black display mode without using the optical filter, leakage light from the liquid crystal display panel in the oblique direction has a hue having a local minimum value in a wavelength range from 450 nm to 550 nm both inclusive,
   wherein the optical filter is configured such that normal incident light entering into the liquid crystal display panel in a normal direction through the optical filter has a hue same as that of light before passing through the optical filter, and oblique incident light entering into the liquid crystal display panel in an oblique direction through the optical filter has a hue having a local maximum value in a wavelength range from 400 nm to less than 550 nm,
   wherein the optical filter comprises a color correction filter having a coloring layer and a reflective layer, the coloring layer comprising a plurality of rectangular unit coloring layers provided on a surface of a transparent base, the reflective layer having a plurality of circular unit reflective layers provided on an opposite surface of the transparent base, and each of the plurality of rectangular unit coloring layers corresponding to one of the plurality of circular unit reflective layers, wherein each of the pair of polarizing plates comprises a phase difference layer and is configured to adjust a phase difference of the phase difference layer to adjust the local minimum value of leakage light, and wherein each phase difference layer comprises a bidirectional phase-difference film, wherein for each film, a refractive index in the x-axis direction ($n_x$) is greater than a refractive index in the y-axis direction ($n_y$), which is greater than a refractive index in a thickness direction ($n_z$) of the film.

2. The liquid crystal display device according to claim 1, wherein the optical filter includes a cholesteric liquid crystal polymer layer.

3. The liquid crystal display device according to claim 2, further comprising a quarter-wavelength layer provided between the cholesteric liquid crystal polymer layer and an incident-side polarizing plate of the pair of polarizing plates.

4. The liquid crystal display device according to claim 3, further comprising a light diffusion layer provided between the cholesteric liquid crystal polymer layer and the liquid crystal layer.

5. The liquid crystal display device according to claim 1, wherein the leakage light has a hue having a local minimum value in a wavelength range from 475 nm to 550 nm both inclusive, and the oblique incident light has a hue having a local maximum value in a wavelength range from 475 nm to less than 550 nm.

6. The liquid crystal display device according to claim 1, wherein the pair of polarizing plates are disposed on both sides of the liquid crystal layer, respectively, in such a manner that transmission axes of the polarizing plates are perpendicular to each other.

7. The liquid crystal display device according to claim 1, wherein liquid crystal molecules of the liquid crystal layer are aligned in the normal direction to the display surface when the liquid crystal display panel is in the black display mode.

* * * * *